United States Patent
Chang et al.

(10) Patent No.: US 9,366,916 B2
(45) Date of Patent: Jun. 14, 2016

(54) LIQUID CRYSTAL DISPLAY DEVICE

(71) Applicant: SAMSUNG DISPLAY CO., LTD., Yongin, Gyeonggi-do (KR)

(72) Inventors: Hak Sun Chang, Yongin-Si (KR); Jang Wi Ryu, Seoul (KR); Jae-Soo Jang, Suwon-Si (KR); Ki Chul Shin, Suwon-Si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 211 days.

(21) Appl. No.: 14/017,685

(22) Filed: Sep. 4, 2013

(65) Prior Publication Data

US 2014/0168582 A1 Jun. 19, 2014

(30) Foreign Application Priority Data

Dec. 17, 2012 (KR) .......................... 10-2012-0147635

(51) Int. Cl.
  *G02F 1/1343* (2006.01)
  *G02F 1/1337* (2006.01)
  *G02F 1/1362* (2006.01)

(52) U.S. Cl.
  CPC .... *G02F 1/134309* (2013.01); *G02F 1/133707* (2013.01); *G02F 1/134336* (2013.01); *G02F 2001/133742* (2013.01); *G02F 2001/134318* (2013.01); *G02F 2001/134345* (2013.01); *G02F 2001/136222* (2013.01)

(58) Field of Classification Search
  CPC ............... G02F 1/134309; G02F 1/134336; G02F 1/133707; G02F 2001/134318; G02F 2001/134345; G02F 2001/133742; G02F 2001/136222

See application file for complete search history.

(56) References Cited

U.S. PATENT DOCUMENTS

| | | |
|---|---|---|
| 7,561,240 B2 | 7/2009 | Yoon et al. |
| 7,671,952 B2 | 3/2010 | Su et al. |
| 8,059,243 B2 | 11/2011 | Kim et al. |
| 8,189,153 B2 | 5/2012 | Ting et al. |
| 2008/0094558 A1 | 4/2008 | Wang et al. |
| 2008/0143911 A1 | 6/2008 | Jin et al. |

(Continued)

FOREIGN PATENT DOCUMENTS

| | | |
|---|---|---|
| EP | 2 447 934 A1 | 5/2012 |
| EP | 2 639 634 A1 | 9/2013 |

(Continued)

OTHER PUBLICATIONS

English Abstract for Publication No. 2003-186017.

(Continued)

*Primary Examiner* — Charles Chang
(74) *Attorney, Agent, or Firm* — F. Chau & Associates, LLC

(57) ABSTRACT

A liquid crystal display device includes a lower panel having a lower substrate. A pixel electrode is formed on the lower substrate and includes a partial plate electrode and a plurality of minute branch electrodes extending from the partial plate electrode. A lower layer is formed on the lower substrate and below the pixel electrode and includes an inclined portion. An upper panel includes an upper substrate facing the lower substrate and a common electrode formed on the upper substrate. A liquid crystal layer is positioned between the lower panel and the upper panel, in which a part of the inclined portion is overlapped with a part of the minute branch electrode.

42 Claims, 34 Drawing Sheets

(56) References Cited

U.S. PATENT DOCUMENTS

| | | | |
|---|---|---|---|
| 2010/0053519 A1* | 3/2010 | Kimura | G02F 1/133371 349/114 |
| 2011/0032435 A1* | 2/2011 | Kimura | 349/1 |
| 2011/0141420 A1 | 6/2011 | Chen et al. | |
| 2011/0222004 A1 | 9/2011 | Kim | |
| 2011/0242443 A1 | 10/2011 | Choi et al. | |
| 2011/0242468 A1 | 10/2011 | Choi et al. | |
| 2013/0242239 A1 | 9/2013 | Chang et al. | |

FOREIGN PATENT DOCUMENTS

| | | |
|---|---|---|
| JP | 2003-186017 | 7/2003 |
| JP | 2006-084518 | 3/2006 |
| JP | 2007-249243 | 9/2007 |
| JP | 2011-039519 | 2/2011 |
| JP | 2011-085738 | 4/2011 |
| KR | 10-2012-0074967 | 7/2012 |

OTHER PUBLICATIONS

English Abstract for Publication No. 2006-084518.
English Abstract for Publication No. 2007-249243.
English Abstract for Publication No. 2011-039519.
English Abstract for Publication No. 2011-085738.
English Abstract for Publication No. 10-2012-0074967.
European Search Report Dated Oct. 13, 2013.

* cited by examiner

LIQUID CRYSTAL DISPLAY DEVICE

CROSS-REFERENCE TO RELATED APPLICATION

This application claims priority to and the benefit of Korean Patent Application No. 10-2012-0147635 filed in the Korean Intellectual Property Office on Dec. 17, 2012, the entire contents of which are incorporated by reference herein.

BACKGROUND (a) Technical Field

The present disclosure relates to a liquid crystal display device.

(b) Discussion of the Related Art

A liquid crystal display device which is one of the most common types of flat panel displays currently in use, includes two sheets of display panels with field generating electrodes such as a pixel electrode, a common electrode, and the like and a liquid crystal layer interposed therebetween. The liquid crystal display device applies an electric field in the liquid crystal layer by applying voltage to the field generating electrodes, and determines the direction of liquid crystal molecules of the liquid crystal layer by the applied electric field, thus controlling polarization of incident light so as to display images.

Among the liquid crystal display devices, a vertically aligned mode liquid crystal display device of which liquid crystal molecules are aligned so that long axes thereof are vertical to the display panel while the electric field is not applied has been developed.

In the vertically aligned mode liquid crystal display device, the securing of a wide viewing angle is important, and for securing the wide viewing angle, a method of forming a cutout such as a minute slit at the field generating electrode is used. Since cutouts and protrusions determine tilt directions of the liquid crystal molecules, the tilt directions of the liquid crystal molecules are dispersed in various directions by properly locating the cutouts and the protrusions, thereby increasing the viewing angle.

In the case of a method of forming minute slits in the pixel electrode so as to have a plurality of branch electrodes, the response speed of the liquid crystal molecules is decreased due to a relationship with another liquid crystal control force in addition to the minute slits of the liquid crystal molecules, and as a result, there is a problem in that the texture is displayed for a predetermined time.

SUMMARY

Exemplary embodiments of the present invention have been made to provide a liquid crystal display device that reduces a texture occurring due to decrease of response speed of liquid crystal molecules.

An exemplary embodiment of the present invention provides a liquid crystal display device that includes: a lower panel including a lower substrate, a pixel electrode that is formed on the lower substrate and includes a partial plate electrode and a plurality of minute branch electrodes extending from the partial plate electrode, and a lower layer that is formed on the lower substrate and below the pixel electrode and includes an inclined portion; an upper panel including an upper substrate facing the lower substrate and a common electrode formed on the upper substrate; and a liquid crystal layer positioned between the lower panel and the upper panel, in which a part of the inclined portion is overlapped with a part of the minute branch electrode.

The lower layer including the inclined portion may be a color filter or a passivation layer including an organic insulator.

The partial plate electrode may have a rhombus shape, the inclined portion may have a rhombus shape, and the rhombus shape of the inclined portion may be larger than the rhombus shape of the partial plate electrode.

The liquid crystal display device may further include an extension extending from the partial plate electrode in a vertical or horizontal direction, in which the plurality of minute branch electrodes may protrude even in the extension.

The longest electrode of the minute branch electrodes may have a length of between 50 μm and 68 μm.

The length of the longest electrode of the minute branch electrodes may have a value of between 25% and 35% of an oblique length of a region occupied by the pixel electrode.

An overlapped length of the inclined portion and the minute branch electrode may have a value of between 0% and 10% of the oblique length.

The common electrode may be constituted by a cutout or a protrusion and may have a liquid crystal control means having a cross structure.

A cross point of the cross structure of the liquid crystal control means may coincide with the center of the partial plate electrode or the inclined portion.

The common electrode may further include an additional liquid crystal control means constituted by a cutout or a protrusion.

The additional liquid crystal control means may be a rhombus cutout pattern or a rhombus protrusion pattern that is positioned at the cross point portion of the cross structure.

The liquid crystal control means may include a disconnected portion in the middle of the cross structure.

The additional liquid crystal control means may be an X-shaped pattern that is positioned at the cross point portion of the cross structure.

The liquid crystal control means may include a disconnected portion in the middle of the cross structure.

Ends of the plurality of minute branch electrodes may not be connected to each other to protrude outwards.

The inclined portion may have an inclination throughout the entire region.

The inclined portion may have an inclination only in a partial region.

The pixel electrode may include a first subpixel electrode and a second subpixel electrode, and the first subpixel electrode and the second subpixel electrode may include the partial plate electrode and the plurality of minute branch electrodes, respectively.

The first subpixel electrode may be formed in a square region, and the second subpixel electrode may be formed in a rectangular region.

The second subpixel electrode may include a total of two partial plate electrodes.

The rectangular region may be divided into two square regions, and the two partial plate electrodes may be formed in the two square regions, respectively.

The second subpixel electrode may include a total of one partial plate electrode.

The liquid crystal display device may further include an alignment layer aligning liquid crystal molecules of the liquid crystal layer, in which the liquid crystal layer or the alignment layer may include a pretilt providing polymer polymerized by light such as ultraviolet light.

An exemplary embodiment of the present invention also provides a liquid crystal display device that includes: a lower panel including a lower substrate, a pixel electrode that is formed on the lower substrate and includes a partial plate electrode and a plurality of minute branch electrodes extending from the partial plate electrode, and a lower layer that is formed on the lower substrate and below the pixel electrode and includes an inclined portion; an upper panel including an upper substrate facing the lower substrate and a common electrode formed on the upper substrate, in which the common electrode has a liquid crystal control means that is constituted by a cutout or a protrusion and has a cross structure; and a liquid crystal layer positioned between the lower panel and the upper panel, in which ends of the plurality of minute branch electrodes are not connected to each other to protrude outwards.

A part of the inclined portion may be overlapped with a part of the minute branch electrode.

A cross point of the cross structure of the liquid crystal control means may coincide with the center of the partial plate electrode or the inclined portion.

The common electrode may further include an additional liquid crystal control means constituted by a cutout or a protrusion.

The additional liquid crystal control means may be a rhombus cutout pattern or a rhombus protrusion pattern that is positioned at the cross point portion of the cross structure.

The liquid crystal control means may include a disconnected portion in the middle of the cross structure.

The additional liquid crystal control means may be an X-shaped pattern that is positioned at the cross point portion of the cross structure.

The liquid crystal control means may include a disconnected portion in the middle of the cross structure.

The inclined portion may have an inclination throughout the entire region.

The inclined portion may have an inclination only in a partial region.

The lower layer including the inclined portion may be a color filter or a passivation layer including an organic insulator.

The partial plate electrode may have a rhombus shape, the inclined portion may have a rhombus shape, and the rhombus shape of the inclined portion may be larger than the rhombus shape of the partial plate electrode.

The liquid crystal display device may further include an extension extending from the partial plate electrode in a vertical or horizontal direction, in which the plurality of minute branch electrodes may protrude even in the extension.

The pixel electrode may include a first subpixel electrode and a second subpixel electrode, and the first subpixel electrode and the second subpixel electrode may include the partial plate electrode and the plurality of minute branch electrodes, respectively.

The first subpixel electrode may be formed in a square region, and the second subpixel electrode may be formed in a rectangular region.

The second subpixel electrode may include a total of two partial plate electrodes.

The rectangular region may be divided into two square regions, and the two partial plate electrodes may be formed in the two square regions, respectively.

The second subpixel electrode may include a total of one partial plate electrode.

The liquid crystal display device may further include an alignment layer aligning liquid crystal molecules of the liquid crystal layer, in which the liquid crystal layer or the alignment layer may include a pretilt providing polymer polymerized by light such as ultraviolet light.

An exemplary embodiment of the present invention further provides a liquid crystal control apparatus for a liquid crystal display device having a lower panel and an upper panel substantially parallel to each other with a liquid crystal layer positioned between the upper panel and the lower panel. The liquid crystal control apparatus includes: a color filter between the liquid crystal layer and the lower panel and having an inclined color filter portion oblique to the upper and lower panels; a plate electrode layered on the inclined color filter portion; a plurality of branch electrodes extending away from an edge of the plate electrode proximal to the upper panel in a direction substantially parallel to the upper and lower panels, ends of the branch electrodes distal from the plate electrode not being connected to each other, and ends of the branch electrodes proximal to the plate electrode overlapping an edge of the inclined color filter portion.

The liquid crystal control apparatus may further include a common electrode between a substrate of the upper panel and the liquid crystal layer, the common electrode having cutouts and/or protrusions located above the inclined color filter portion.

According to the exemplary embodiments of the present invention, by forming a partial plate electrode together with a minute pattern in a pixel electrode, a viewing angle and side visibility of a liquid crystal display device is widened and a response speed is increased, and a control force of liquid crystal molecules is improved by forming a step providing means and a minute pattern which are positioned on a lower layer so as to be overlapped with each other at a predetermined section and thus the response speed of the liquid crystal molecules is improved, and as a result, a texture is reduced. Further, the response speed of the liquid crystal molecules is improved by additionally using a structure for improving the control force of liquid crystal molecules.

DETAILED DESCRIPTION OF THE EMBODIMENTS

Figure 1:
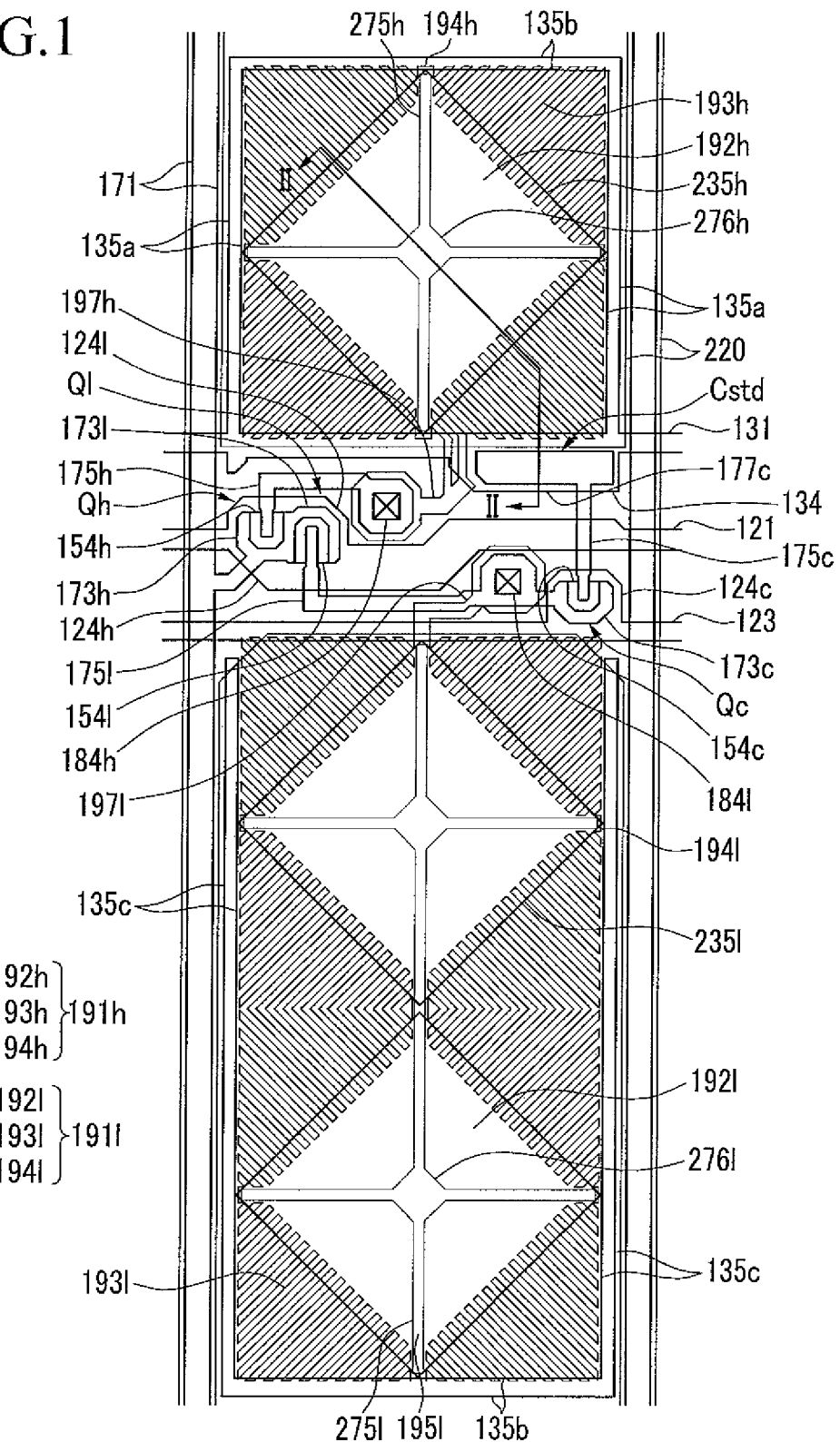
FIG. 1 is a layout view of a liquid crystal display device according to an exemplary embodiment of the present invention.

Exemplary embodiments of the present invention will be described more fully hereinafter with reference to the accompanying drawings. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a liquid crystal display device according to an exemplary embodiment of the present invention will be described in detail with reference to FIGS. 1 to 3.

Figure 2:
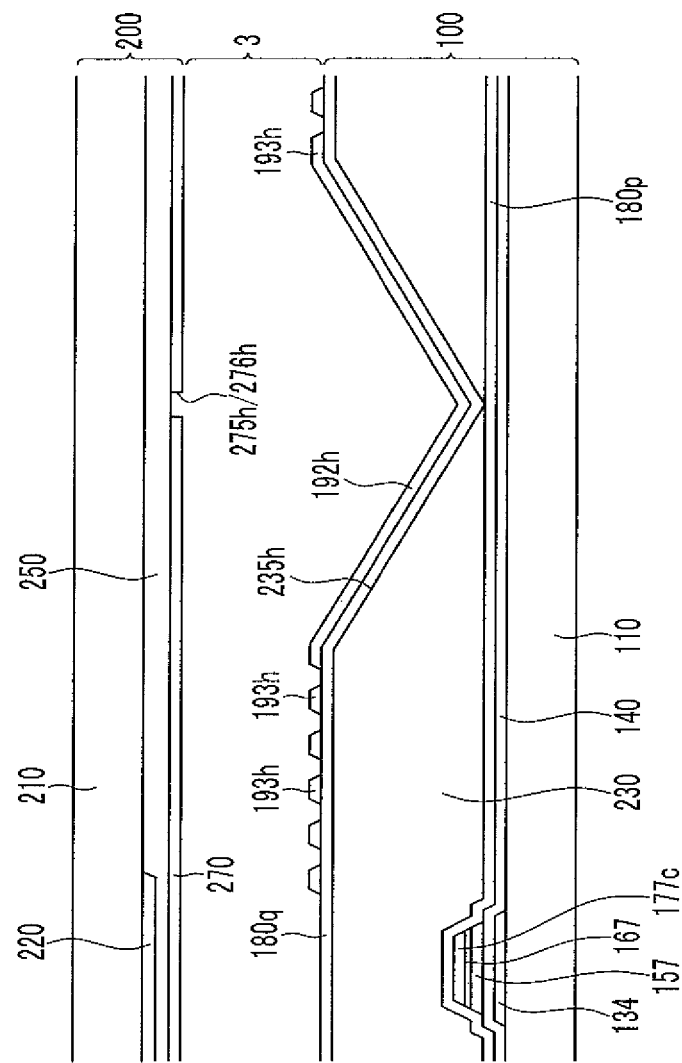
FIG. 2 is a cross-sectional view taken along line II-II of FIG. 1.
Figure 3:
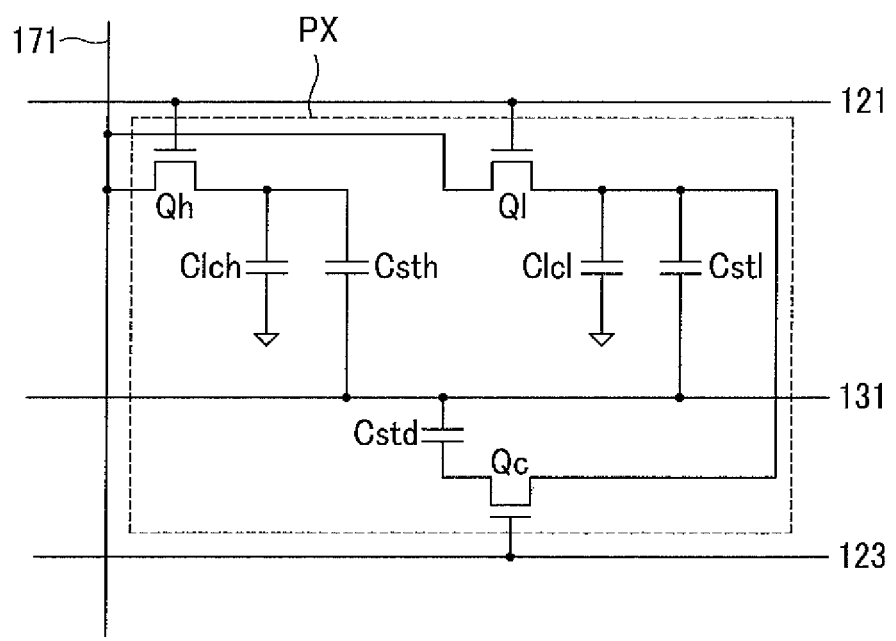
FIG. 3 is an equivalent circuit diagram of one pixel of the liquid crystal display device of FIG. 1.

FIG. 1 is a layout view of a liquid crystal display device according to an exemplary embodiment of the present invention, FIG. 2 is a cross-sectional view taken along line II-II of FIG. 1, and FIG. 3 is an equivalent circuit diagram of one pixel of the liquid crystal display device of FIG. 1.

Referring to FIGS. 1 and 2, a liquid crystal display device according to the exemplary embodiment includes a lower panel 100 and an upper panel 200 facing each other, a liquid crystal layer 3 interposed between the two panels 100, 200, and a pair of polarizers (not illustrated) attached to outer sides of the panels 100, 200.

First, the lower panel 100 will be described.

A plurality of gate conductors including a plurality of gate lines 121, a plurality of step-down gate lines 123, and a plurality of storage electrode lines 131 is formed on an insulation substrate 110.

The gate line 121 and the step-down gate line 123 mainly extend in a horizontal direction to transfer gate signals. The gate line 121 includes a first gate electrode 124h and a second gate electrode 124I protruding upwards and downwards. The step-down gate line 123 includes a third gate electrode 124c protruding upwards. In the exemplary embodiment of FIG. 1, the first gate electrode 124h and the second gate electrode 124l are connected to each other to form one protrusion.

The storage electrode line 131 also mainly extends in a horizontal direction to transfer a predetermined voltage such as common voltage Vcom. The storage electrode line 131 includes storage electrodes 135a, 135b, 135c, and includes a capacitor electrode 134 expanded downwards. The storage electrode line 131 includes two first vertical storage electrode parts 135a extending upwards, a horizontal storage electrode part 135b connecting the two first vertical storage electrode parts 135a, and two second vertical storage electrode parts 135c extending upwards from the horizontal storage electrode part 135b.

The first vertical storage electrode part 135a is formed along a vertical edge of a first pixel electrode 191h formed at the upper portion, and the second vertical storage electrode part 135c is formed along a vertical edge of a second subpixel electrode 191I. The horizontal storage electrode part 135b is positioned between a horizontal edge of the previous second subpixel electrode 191l and a horizontal edge of the current first pixel electrode 191h and formed along the two horizontal edges.

As a result, the first vertical storage electrode part 135a and the horizontal storage electrode part 135b are formed along an edge of the first pixel electrode 191h to be at least partially overlapped with the first pixel electrode 191h, and the second vertical storage electrode part 135c and the horizontal storage electrode part 135b are formed along the edge of the second subpixel electrode 191l to be at least partially overlapped with the second subpixel electrode 191l.

FIG. 1 illustrates as if the horizontal storage electrode part 135b positioned at the upper portion and the horizontal storage electrode part 135b positioned at the lower portion are separated from each other, but actually, the horizontal storage electrode parts 135b formed at upper and lower pixels PX which are adjacent to each other are electrically connected with each other.

A gate insulating layer 140 is formed on the gate conductor 121, 123, 131.

A plurality of semiconductors made of amorphous or crystalline silicon or the like is formed on the gate insulating layer 140. The semiconductors mainly extend in a vertical direction, and include first and second semiconductors 154h, 154l extending toward the first and second gate electrodes 124h, 124l and connected with each other, and a third semiconductor 154c connected with the second semiconductor 154l. The third semiconductor 154c extends to form a fourth semiconductor 157.

A plurality of ohmic contacts (not illustrated) is formed on the semiconductors 154h, 154l, 154c, a first ohmic contact (not illustrated) is formed on the first semiconductor 154h, and a second ohmic contact 164b and a third ohmic contact (not illustrated) are formed on the second semiconductor 154l and the third semiconductor 154c, respectively. The third ohmic contact extends to form a fourth ohmic contact 167.

Data conductors including a plurality of data lines 171, a plurality of first drain electrodes 175h, a plurality of second drain electrodes 175l, and a plurality of third drain electrodes 175c are formed on the ohmic contacts 164b, 167.

The data lines 171 transfer data signals and mainly extend in a vertical direction to cross the gate lines 121 and the step-down gate lines 123. Each data line 171 extends toward the first gate electrode 124h and the second gate electrode 124l and includes a first source electrode 173h and a second source electrode 173l which are connected with each other.

A first drain electrode 175h, a second drain electrode 175l, and a third drain electrode 175c include one wide end portion and a rod-shaped end portion, respectively. The rod-shaped end portions of the first drain electrode 175h and the second drain electrode 175l are partially surrounded by the first source electrode 173h and the second source electrode 173l. One wide end portion of the second drain electrode 175l extends to form a third source electrode 173c that is bent in a 'U'-lettered shape. A wide end portion 177c of the third drain electrode 175c is overlapped with the capacitor electrode 134 to form a step-down capacitor Cstd, and the rod-shaped end portion is partially surrounded by the third source electrode 173c.

The first, second, third gate electrodes 124h, 124l, 124c, the first, second, third source electrodes 173h, 173l, 173c, and the first, second, third drain electrodes 175h, 175l, 175c form first, second, third thin film transistors (TFTs) Qh, Ql, Qc together with the first, second, third semiconductors 154h, 154l, 154c, respectively, and channels of the thin film transistors are formed in the respective semiconductors 154h, 154*l*, 154*c* between the respective source electrodes 173*h*, 173*l*, 173*c* and the respective drain electrodes 175*h*, 175*l*, 175*c*.

The semiconductors 154*h*, 154*l*, 154*c* have substantially the same plane shape as the data conductors 171, 175*h*, 175*l*, 175*c* and the ohmic contacts 164*b*, 167 therebelow, except for channel regions between the source electrodes 173*h*, 173*l*, 173*c* and the drain electrodes 175*h*, 175*l*, 175*c*. That is, exposed portions which are not covered by the data conductors 171, 175*h*, 175*l*, 175*c* in addition to a space between the source electrodes 173*h*, 173*l*, 173*c* and the drain electrodes 175*h*, 175*l*, 175*c* are present at the semiconductors 154*h*, 154*l*, 154*c*.

A lower passivation layer 180*p* made of an inorganic insulator such as silicon nitride or silicon oxide is formed on the data conductors 171, 175*h*, 175*l*, 175*c* and the exposed portions of the semiconductors 154*h*, 154*l*, 154*c*.

A color filter 230 is positioned on the lower passivation layer 180*p*. The color filter 230 is elongated in a vertical direction along a space between the adjacent data lines 171 and has inclined portions 235*h*, 235*l* of which heights are changed in a partial region of a portion of the color filter 230 overlapped with the first and second subpixel electrodes 191*h*, 191*l*. The inclined portions 235*h*, 235*l* have rhombus structures as illustrated in FIG. 1. The rhombus structure of the first inclined portion 235*h* is formed so that a vertex is in contact with a boundary of a square region occupied by a first partial plate electrode 192*h*. Further, the rhombus structure of the second inclined portion 235*l* is formed one by one in two square regions by dividing a rectangular region occupied by the second partial plate electrode 192*l* into two square regions, and the rhombus structure of one second inclined portion 235*l* is formed so that a vertex is in contact with a boundary of the corresponding square region. However, according to an exemplary embodiment, the boundary of the corresponding region and the vertex may be spaced apart from each other at a predetermined distance. Further, according to an exemplary embodiment, the region in which the rhombus structure is positioned may have a rectangular region. The inclined portions 235*h*, 235*l* have structures in which heights are gradually decreased toward the center from a side of the rhombus structure. The inclined portions 235*h*, 235*l* have structures (see FIG. 2) in which heights are decreased at a predetermined slope from one side to the center, and as the heights are decreased, the widths are decreased. A color filter may not be formed at the centers of the inclined portions 235*h*, 235*l* having the rhombus structure, and according to an exemplary embodiment, an opening in which the color filter is not formed may be disposed in a predetermined region near the center. Each color filter 230 may display one of primary colors such as three primary colors of red, green and blue, and each color filter 230 may be overlapped with each other on the data line 171.

An upper passivation layer 180*q* is formed on the color filter 230. The upper passivation layer 180*q* may prevent the color filter 230 from being lifted and prevent defects such as an afterimage which may be caused when a screen is driven by suppressing contamination of the liquid crystal layer 3 by an organic material such as a solvent flowing into from the color filter 230, and may be made of an inorganic insulator such as silicon nitride or silicon oxide or an organic material.

A plurality of first contact holes 184*h* and a plurality of second contact holes 184*l* which expose the wide end portion of the first drain electrode 175*h* and the wide end portion of the second drain electrode 175*l*, respectively are formed in the lower passivation layer 180*p*, the color filter 230, and the upper passivation layer 180*q*.

A plurality of pixel electrodes 191 is formed on the upper passivation layer 180*q*. The pixel electrode 191 includes the first subpixel electrode 191*h* and the second subpixel electrode 191*l* which are separated from each other with two gate lines 121 and 123 therebetween to be disposed above and below a pixel area and adjacent to each other in a column direction.

The first subpixel electrode 191*h* and the second subpixel electrode 191*l* include partial plate electrodes 192*h*, 192*l* positioned at the centers thereof, extensions 194*h*, 194*l* extending from the partial plate electrodes 192*h*, 192*l* in a vertical or horizontal direction, and a plurality of minute branch electrodes 193*h*, 193*l* protruding from the partial plate electrodes 192*h*, 192*l* and the extensions 194*h*, 194*l* in an oblique direction, respectively.

The first subpixel electrode 191*h* includes the first partial plate electrode 192*h*, the first extension 194*h*, and a plurality of first minute branch electrodes 193*h* which are positioned in the square region, and is connected with the wide end portion of the first drain electrode 175*h* by a first connecting portion 197*h* extended outside the square region.

The first partial plate electrode 192*h* has a rhombus shape, a center thereof is positioned at the center of the square region, and each vertex of the rhombus shape is formed at a predetermined distance from a boundary of the square region. Further, the first partial plate electrode 192*h* covers a part from the center of the first inclined portion 235*h* of the color filter 230. As a result, the first partial plate electrode 192*h* has an inclination provided by the first inclined portion 235*h* of the color filter 230 as it is. (see FIG. 2)

The first subpixel electrode 191*h* has a first extension 194*h* extended in a vertical or horizontal direction from each vertex of the rhombus shape of the first partial plate electrode 192*h* (in a parallel or vertical direction to the gate line 121 or the data line 171). The first extension 194*h* extends in the vertical or horizontal direction to meet a boundary of the square region occupied by the first subpixel electrode 191*h*. As a result, the first extension 194*h* meets the vertex of the rhombus structure of the first inclined portion 235*h* of the color filter 230 on the plan view so as to be vertically overlapped with each other.

The plurality of first minute branch electrodes 193*h* extend from an oblique side of the first partial plate electrode 192*h* and the first extension 194*h*. The plurality of first minute branch electrodes 193*h* fills the rest of the square region, forms an angle of 45 degrees with the first extension 194*h* (or the gate line 121 or the data line 171), and forms an angle of 90 degrees with the oblique side of the first partial plate electrode 192*h*. Further, ends of the first minute branch electrodes 193*h* are not connected to each other to have a structure protruding outwards. However, if the ends of the first minute branch electrodes 193*h* are connected to each other to be closed, directions of liquid crystal molecules of the liquid crystal layer 3 to be aligned by an electric field are different from directions of the liquid crystal molecules to be aligned by the closed ends, and as a result, a response speed of the liquid crystal molecules may be delayed. Therefore, in the exemplary embodiment of the present invention, the ends of the first minute branch electrodes 193*h* are not connected to each other but protrude outwards to have a structure in which opening regions between the first minute branch electrodes 193*h* are opened. As a result, the liquid crystal molecules may be aligned in the directions to be aligned by the electric field without other resistance, and as a result, the response speed of the liquid crystal molecules is improved and textures are decreased.

Further, a connecting terminal connected with the oblique side of the first partial plate electrode 192h and the first extension 194h is positioned above the first inclined portion 235h of the color filter 230 to be overlapped with the first inclined portion 235h of the color filter 230 in the plurality of first minute branch electrodes 193h. That is, the connecting terminal of the first minute branch electrode 193h is overlapped with the first inclined portion 235h of the color filter 230 by a predetermined distance. Therefore, the vicinity of the connecting terminal of the first minute branch electrode 193h has the inclination provided by the first inclined portion 235h of the color filter 230 as it is, and a flat structure is formed up to the end from the vicinity of the connecting terminal (see FIG. 2). The end portion of the first minute branch electrode 193h and the first inclined portion 235h of the color filter 230 overlap each other and thus a liquid crystal control force of the corresponding portion is further increased, and as a result, the liquid crystal molecules may rapidly operate by the electric field. As a result, the response speed of the liquid crystal molecules is improved. However, when a length of the first minute branch electrode 193h is overly increased and thus an overlapped distance is too large, a texture due to a slit structure may occur, and as a result, the overlapped distance needs to be set at a predetermined level or less. In the exemplary embodiment, the longest electrode of the first minute branch electrodes 193h may have a length of more than 50 μm and 68 μm or less, and a size of the pixel is determined according to a characteristic of the display device. When a size of the square region is determined according to the size of the pixel, the length of the longest electrode of the first minute branch electrodes 193h may be selected and used within the range of more than 50 μm and 68 μm or less. However, according to an exemplary embodiment, an exemplary embodiment beyond the above range may also exist. The length of the longest electrode of the first minute branch electrodes 193h may have a value of between 25% and 35% of an oblique length of the entire square region, and a length of the longest electrode of the first minute branch electrodes 193h that is overlapped with the first inclined portion 235h may have a value of between 0% and 10% of the oblique length of the entire square region. This will be described with reference to FIGS. 10 to 17 to be described below.

A vertically long rectangular region occupied by the second subpixel electrode 191I is divided into two square regions and structures of the first subpixel electrode 191h are formed in the two square regions, respectively to form the second subpixel electrode 191I.

That is, the second subpixel electrode 191I formed in one of square regions acquired by dividing the vertically long rectangular region occupied by the second subpixel electrode 191I has the following characteristics.

The second subpixel electrode 191I includes a second partial plate electrode 192l, a second extension 194I, and a plurality of second minute branch electrodes 193l which are positioned in the two-divided square regions.

The second partial plate electrode 192l has a rhombus shape, a center thereof is positioned at the center of the square region, and each vertex of the rhombus shape is formed at a predetermined distance from a boundary of the square region. Further, the second partial plate electrode 192I covers a part from the center of the second inclined portion 235I of the color filter 230. As a result, the second partial plate electrode 192I has an inclination provided by the second inclined portion 235I of the color filter 230 as it is.

The second subpixel electrode 191I has a second extension 194l extended in a vertical or horizontal direction from each vertex of the rhombus shape of the second partial plate electrode 192l (in a parallel or vertical direction to the gate line 121 or the data line 171). The second extension 194l extends in the vertical or horizontal direction to meet a boundary of the two-divided square regions. As a result, the second extension 194l meets the vertex of the rhombus structure of the second inclined portion 235I of the color filter 230 on the plan view so as to be vertically overlapped with each other.

The plurality of second minute branch electrodes 193l extends from an oblique side of the second partial plate electrode 192l and the second extension 194l. The plurality of second minute branch electrodes 193I fills the rest of the square region, forms an angle of 45 degrees with the second extension 194l (or the gate line 121 or the data line 171), and forms an angle of 90 degrees with the oblique side of the second partial plate electrode 192l. Further, ends of the second minute branch electrodes 193I are not connected to each other to have a structure protruding outwards. However, if the ends of the second minute branch electrodes 193I are connected to each other to be closed, directions of liquid crystal molecules of the liquid crystal layer 3 to be aligned by an electric field are different from directions of the liquid crystal molecules to be aligned by the closed ends, and as a result, a response speed of the liquid crystal molecules may be delayed. Therefore, in the exemplary embodiment of the present invention, the ends of the second minute branch electrodes 193I are not connected to each other but protrude outwards to have a structure in which opening regions between the second minute branch electrodes 193I are opened. As a result, the liquid crystal molecules may be aligned in the directions to be aligned by the electric field without other resistance, and as a result, the response speed of the liquid crystal molecules is improved and textures are decreased.

Further, a connecting terminal connected with the oblique side of the second partial plate electrode 192I and the second extension 194I is positioned above the second inclined portion 235I of the color filter 230 to be overlapped with the second inclined portion 235I of the color filter 230 in the plurality of second minute branch electrodes 193I. That is, the connecting terminal of the second minute branch electrode 193I is overlapped with the second inclined portion 235I of the color filter 230 by a predetermined distance. Therefore, the vicinity of the connecting terminal of the second minute branch electrode 193I has the inclination provided by the second inclined portion 235I of the color filter 230 as it is, and a flat structure is formed up to the end from the vicinity of the connecting terminal. The end portion of the second minute branch electrodes 193I and the second inclined portion 235I of the color filter 230 overlap each other and thus a liquid crystal control force of the corresponding portion is further increased, and as a result, the liquid crystal molecules may rapidly operate by the electric field. As a result, the response speed of the liquid crystal molecules is improved. However, when a length of the second minute branch electrodes 193I is overly increased and thus an overlapped distance is too large, a texture due to a slit structure may occur, and as a result, the overlapped distance needs to be set at a predetermined level or less. In the exemplary embodiment, the longest electrode of the second minute branch electrodes 193I may have a length of more than 50 μm and 68 μm or less, and a size of the pixel is determined according to a characteristic of the display device. When a size of the square region is determined according to the size of the pixel, the length of the longest electrode of the second minute branch electrodes 193I may be selected and used within the range of more than 50 μm and 68 μm or less. However, according to an exemplary embodiment, an exemplary embodiment beyond the above range may also exist. The length of the longest electrode of the second minute branch electrodes 193l may have a value of between 25% and 35% of an oblique length of the entire square region, and a length of the longest electrode of the second minute branch electrodes 193l that is overlapped with the second inclined portion 235l may have a value of between 0% and 10% of the oblique length of the entire square region. This will be described with reference to FIGS. 10 to 17 to be described below.

The second extensions 194l which are adjacent to each other in a vertical direction among the second extensions 194l positioned in two vertically adjacent square regions are connected to each other. Further, the electrodes adjacent to each other among the plurality of second minute branch electrodes 193l may also be connected to each other. According to an exemplary embodiment, the second minute branch electrodes 193l are not directly connected to each other and may be connected to each other through a horizontal connection structure disposed therebetween.

Further, the square region positioned at the upper portion is connected with the wide end portion of the second drain electrode 175l by a second connecting portion 197l extended outside the square region.

The first subpixel electrode 191h and the second subpixel electrode 191l receive data voltage from the first drain electrode 175h and the second drain electrode 175l through the first contact hole 184h and the second contact hole 184l, respectively. The first subpixel electrode 191h and the second subpixel electrode 191l to which the data voltage is applied generate an electric field together with a common electrode 270 of the upper panel 200 to determine directions of the liquid crystal molecules of the liquid crystal layer 3 between two electrodes 191, 270. Luminance of light passing through the liquid crystal layer 3 varies depending on the determined directions of the liquid crystal molecules.

The first subpixel electrode 191h and the common electrode 270 form a first liquid crystal capacitor Clch together with the liquid crystal layer 3 therebetween, and the second subpixel electrode 191l and the common electrode 270 form a second liquid crystal capacitor Clcl together with the liquid crystal layer 3 therebetween. As a result, even after the first and second thin film transistors Qh, Ql are turned off, the applied voltage is maintained.

The first and second subpixel electrodes 191h, 191l are overlapped with the storage electrode line 131 in addition to the storage electrode 135 to form the first and second storage capacitors Csth, Cstl, and the first and second storage capacitors Csth, Cstl reinforce a voltage maintaining capacity of the first and second liquid crystal capacitors Clch, Clcl, respectively.

The capacitor electrode 134 and an expansion 177c of the third drain electrode 175c overlap each other with the gate insulating layer 140, the semiconductor layer, and ohmic contacts 157, 167 interposed therebetween to form the step-down capacitor Cstd. In another exemplary embodiment of the present invention, the semiconductor layer and the ohmic contacts 157, 167 disposed between the capacitor electrode 134 and the expansion 177c of the third drain electrode 175c which form the step-down capacitor Cstd may be removed.

A lower alignment layer (not illustrated) is formed on the pixel electrode 191 and the exposed upper passivation layer 180q. The lower alignment layer may be a vertical alignment layer and may be an alignment layer containing a photoreaction material.

Next, the upper panel 200 will be described.

A light blocking member 220 is positioned below an insulation substrate 210. The light blocking member 220 is called a black matrix and blocks light leakage. The light blocking member 220 extends along the gate line 121 and the step-down gate line 123 to be expanded upwards and downwards, covers a region in which the first thin film transistor Qh, the second thin film transistor Ql, and the third thin film transistor Qc are positioned and extends along the data line 171, and covers the periphery of the data line 171. A region that is not covered by the light blocking member 220 becomes a region which displays an image by emitting light outside.

A planarization layer 250 made of an organic material and providing a planarized lower surface is formed below the light blocking member 220. In the exemplary embodiment of FIG. 2, the light blocking member 220 is formed at the upper panel 200, but according to an exemplary embodiment, the light blocking member 220 may be formed at the lower panel 100.

The common electrode 270 made of a transparent conductive material is formed on the lower surface of the planarization layer 250. Cutouts 275h, 275l as a liquid crystal control means are formed in a cross shape at the common electrode 270. A cross point in the cross structure of the first cutout 275h is overlapped with the center of the rhombus shape of the first partial plate electrode 192h of the lower panel 100 or the center of the rhombus shape of the first inclined portion 235h of the color filter 230. Further, two cross structures of the second cutout 275l are formed up and down, and is overlapped with the centers of the rhombus shapes of the two second partial plate electrodes 192l of the lower panel 100 or the centers of the rhombus shapes of the two second inclined portions 235l of the color filter 230, respectively. Further, the cutouts 275h, 275l positioned at the adjacent pixels extend to be connected with each other. The cutouts 275h, 275l serve to improve the control force of the liquid crystal molecules.

Further, an additional liquid crystal control means is positioned near the cross point of the cross structures of the cutouts 275h, 275l in the common electrode 270. In the exemplary embodiment of FIG. 1, rhombus cutout patterns 276h, 276l are formed as an additional liquid crystal control means. The rhombus cutout patterns 276h, 276l have sides which are parallel to the rhombus shapes of the partial plate electrodes 192h, 192l of the lower panel 100 or the rhombus shapes of the inclined portions 235h, 235l of the color filter 230 on the plan view. The sizes of the rhombus cutout patterns 276h and 276l may be various according to an exemplary embodiment. If the sizes are too small, a role as the liquid crystal control means is slight, and, if the sizes are too large, transmittance deteriorates, and as a result, the rhombus cutout patterns 276h, 276l may be formed with appropriate sizes according to an exemplary embodiment. According to the rhombus cutout patterns 276h, 276l which are the additional liquid crystal control means, the cutouts 275h, 275l positioned at the common electrode 270 extend only in the vertical or horizontal direction, and as a result, the liquid crystal control force of a direction of 45 degrees with the direction deteriorates. Accordingly, the liquid crystal control force of the direction of 45 degrees is improved by forming an additional rhombus-shaped liquid crystal control means (rhombus cutout patterns 276h, 276l), and as a result, the liquid crystal molecules are rapidly aligned by the electric field and thus the response speed is improved.

An upper alignment layer (not illustrated) is formed below the common electrode 270, the cutouts 275h, 275l, and the rhombus cutout patterns 276h, 276l. The upper alignment layer may be a vertical alignment layer and may be an alignment layer photo-aligned by using a photopolymerization material.

Polarizers (not illustrated) are provided on outer sides of the two panels 100, 200, and transmissive axes of the two polarizers are perpendicular to each other and one transmissive axis thereof may be parallel to the gate line 121. However, the polarizer may be disposed only on an outer side of any one of the two panels 100, 200.

The liquid crystal layer 3 has negative dielectric anisotropy, and the liquid crystal molecules of the liquid crystal layer 3 are aligned so that long axes thereof are vertical to the surfaces of the two panels 100, 200 while an electric field is not applied. Accordingly, incident light does not pass through an orthogonal polarizer but is blocked while the electric field is not applied.

Figure 34:
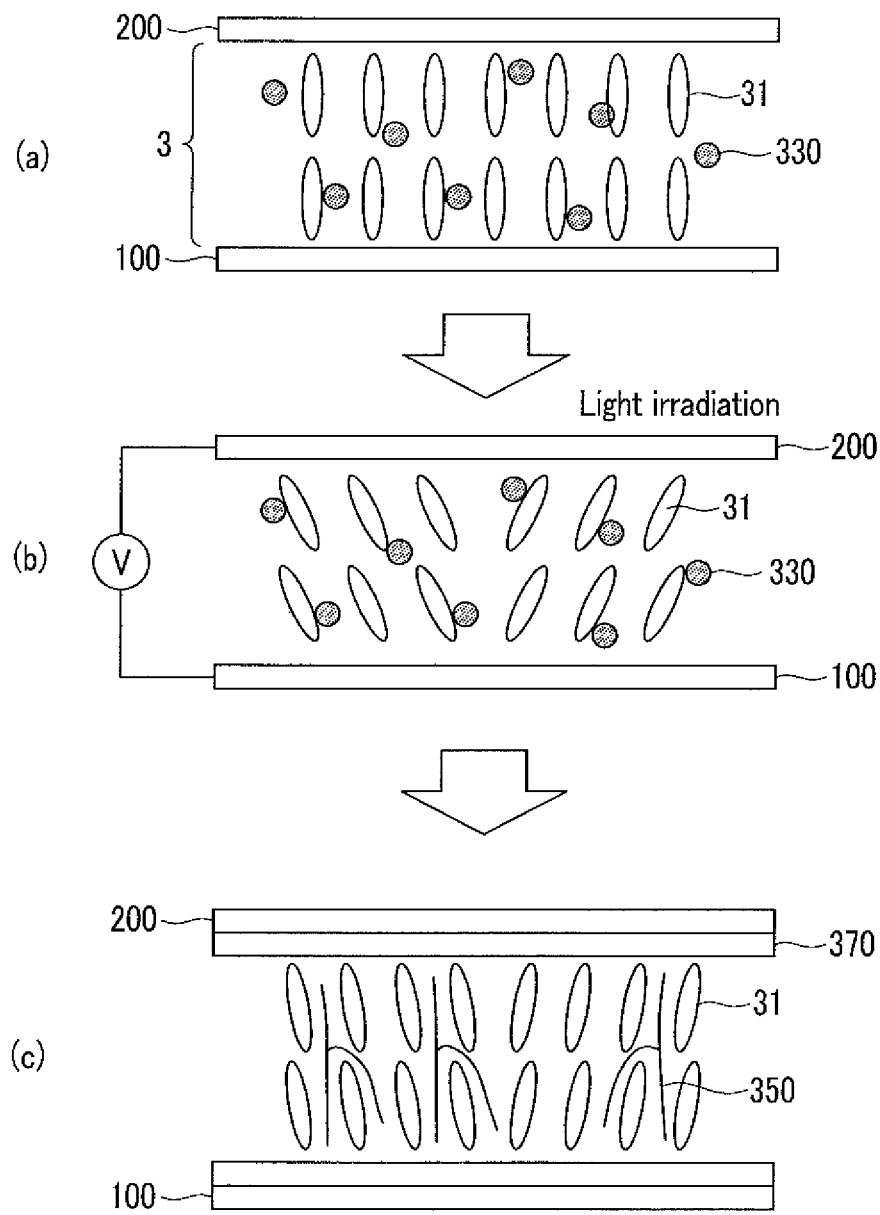
FIG. 34 is a diagram illustrating a process through which liquid crystal molecules have pretilts by using prepolymers polymerized by light such as ultraviolet light.

A polymer polymerized by light such as ultraviolet light is not included in the liquid crystal layer 3 according to the exemplary embodiment of FIG. 1. However, according to an exemplary embodiment, a polymer polymerized by light such as ultraviolet light may be further included. That is, the liquid crystal layer 3 may not include a polymer in the case where an alignment direction is sufficiently controlled without the polymer providing a pretilt angle. According to an exemplary embodiment, the polymer polymerized by light such as ultraviolet light may be included in the alignment layer formed on the upper panel 200 and the lower panel 100, and the polymer may be included by a method as illustrated in FIG. 34. In this case, the polymer may not be included in the liquid crystal layer 3. This will be described with reference to FIG. 34.

As described above, the first subpixel electrode 191*h* and the second subpixel electrode 191*l* to which the data voltage is applied generate an electric field together with a common electrode 270 of the upper panel 200, and as a result, the liquid crystal molecules of the liquid crystal layer 3 which are aligned so as to be vertical to the surfaces of the two electrodes 191, 270 while the electric field is not applied are inclined in a horizontal direction to the surfaces of the two electrodes 191, 270 and luminance of light passing through the liquid crystal layer 3 varies depending on an inclined degree of the liquid crystal molecules.

The liquid crystal display device may further include a spacer (not illustrated) for maintaining a cell gap between two panels 100, 200, and the spacer is attached to the upper panel 200 to be positioned below the common electrode 270.

In the exemplary embodiment of FIG. 1, the liquid crystal display device includes the upper passivation layer 180*q* and the lower passivation layer 180*p*. That is, the upper passivation layer 180*q* and the lower passivation layer 180*p* are formed above and below the color filter 230, and according to an exemplary embodiment, both the upper passivation layer 180*q* and the lower passivation layer 180*p* may be removed, or one passivation layer thereof may be removed.

According to an exemplary embodiment, the color filter 230 may be formed at a position (another portion of a lower substrate or an upper substrate) different from that of FIGS. 1 and 2, and in this case, an organic layer may be formed at a position of the color filter 230 of FIG. 2, and an inclined portion may be formed at the corresponding organic layer. In this case, the upper passivation layer 180*q* may be omitted.

According to an exemplary embodiment, protrusion structures instead of the cutouts may be formed as the liquid crystal control means and the additional liquid crystal control means formed in the common electrode 270. This will be described with reference to FIG. 33.

Hereinafter, only structures of a color filter, a pixel electrode, and a common electrode which include features in the liquid crystal display device of FIG. 1 will be separately described in detail with reference to FIG. 4.

Figure 4:
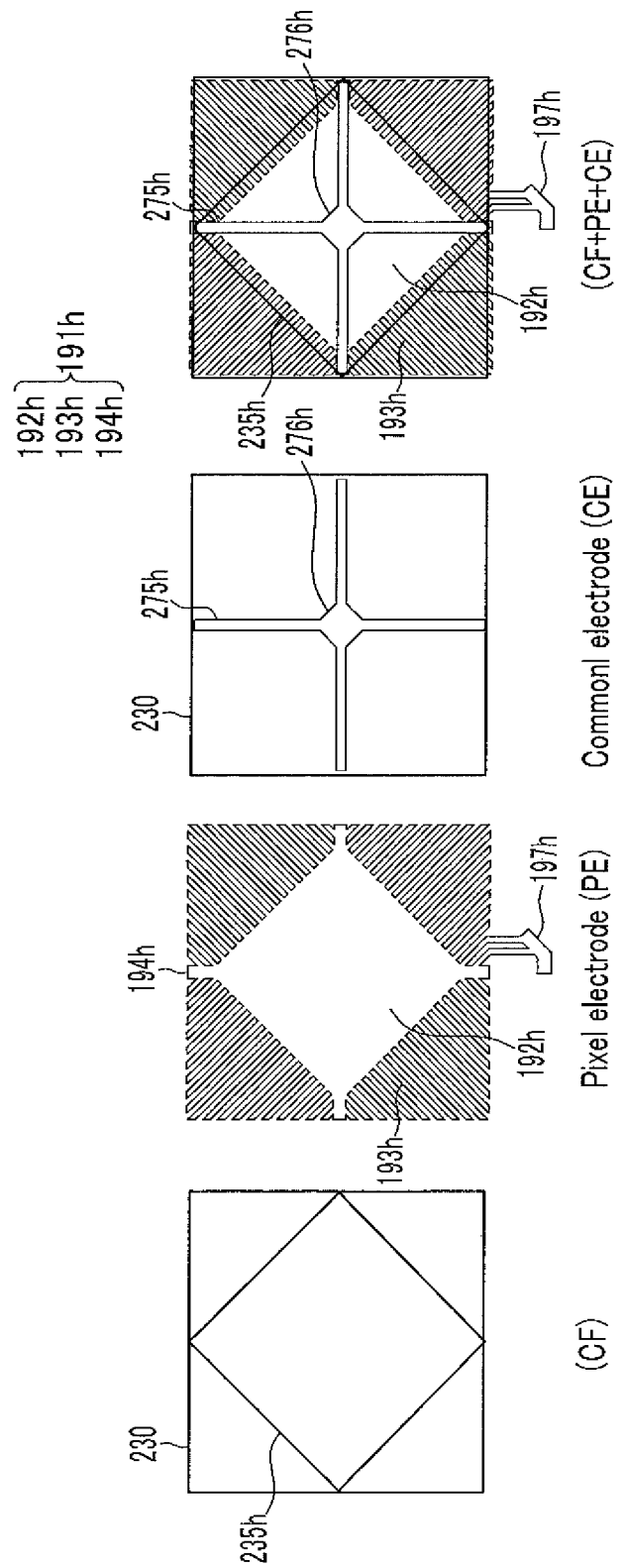
FIG. 4 is a layout view separately illustrating only a color filter, a pixel electrode, and a common electrode of the liquid crystal display device of FIG. 1.

FIG. 4 is a layout view separately illustrating only a color filter, a pixel electrode, and a common electrode of the liquid crystal display device of FIG. 1.

First, in FIG. 4, only subpixels positioned at the upper portion of the pixel of FIG. 1 are illustrated, and CF represents a color filter, PE represents a pixel electrode, and CE represents a common electrode.

The color filter illustrated in FIG. 4 has a first inclined portion 235*h*. The first inclined portion 235*h* has a structure in which a height is changed in a partial region of a portion overlapped with the first subpixel electrode 191*h*. The first inclined portion 235*h* has a rhombus structure as illustrated in FIG. 4. The rhombus structure of the first inclined portion 235*h* is formed so that a vertex is in contact with a boundary of a square region occupied by a first partial plate electrode 192*h*. The first inclined portion 235*h* has a structure in which a height is gradually decreased toward the center from a side of the rhombus structure. The first inclined portion 235*h* has a structure in which the height is decreased at a predetermined slope from one side to the center, and as the height is decreased, the width is decreased.

The pixel electrode PE illustrated in FIG. 4 has the following features.

A first subpixel electrode 191*h*, which includes a first partial plate electrodes 192*h*, a first extension 194*h* extended in a vertical or horizontal direction from the first partial plate electrodes 192*h*, and a plurality of minute branch electrodes 193*h* protruding from the first partial plate electrodes 192*h* and the first extension 194*h* in an oblique direction, is formed on the color filter 230. The first subpixel electrode 191*h* further includes a first connecting portion 197*h* which extends outside the square region to be connected with a wide end portion of the first drain electrode 175*h*.

The first partial plate electrode 192*h* has a rhombus shape, a center thereof is positioned at the center of the square region, and each vertex of the rhombus shape is formed at a predetermined distance from a boundary of the square region. Further, the first partial plate electrode 192*h* covers a part from the center of the first inclined portion 235*h* of the color filter 230. As a result, the first partial plate electrode 192*h* has an inclination provided by the first inclined portion 235*h* of the color filter 230 as it is.

The first subpixel electrode 191*h* has a first extension 194*h* extended in a vertical or horizontal direction from each vertex of the rhombus shape of the first partial plate electrode 192*h*. The first extension 194*h* extends in the vertical or horizontal direction to meet a boundary of the square region occupied by the first subpixel electrode 191*h*. As a result, the first extension 194*h* meets the vertex of the rhombus structure of the first inclined portion 235*h* of the color filter 230 on the plan view so as to be vertically overlapped with each other.

The plurality of first minute branch electrodes 193*h* extends from the oblique side of the first partial plate electrode 192*h* and the first extension 194*h*. The plurality of first minute branch electrodes 193*h* fills the rest of the square region, forms an angle of 45 degrees with the first extension 194*h*, and forms an angle of 90 degrees with the oblique side of the first partial plate electrode 192*h*. Further, ends of the first minute branch electrodes 193*h* are not connected to each other to protrude outwards.

Further, a connecting terminal connected with the oblique side of the first partial plate electrode 192*h* and the first extension 194*h* is positioned above the first inclined portion 235*h* of the color filter 230 to be overlapped with the first inclined portion 235*h* of the color filter 230 in the plurality of first minute branch electrodes 193*h*. That is, the connecting terminal of the first minute branch electrode 193*h* is overlapped with the first inclined portion 235*h* of the color filter 230 by a predetermined distance. Therefore, the vicinity of the connecting terminal of the first minute branch electrode 193h has the inclination provided by the first inclined portion 235h of the color filter 230 as it is, and a flat structure is formed up to the end from the vicinity of the connecting terminal.

The common electrode CE illustrated in FIG. 4 has the following features.

The common electrode CE has a liquid crystal control means and an additional liquid crystal control means, and has a first cutout 275h as the liquid crystal control means and has a first rhombus cutout pattern 276h as the additional liquid crystal control means.

First, the first cutout 275h is formed in a cross shape and is a region where the common electrode CE is not formed. Further, the first rhombus cutout pattern 276h has a rhombus shape and is positioned to be centered around a cross point of the first cutout 275h.

In FIG. 4, a structure of combining the common electrode CE, the pixel electrode PE, and the color filter CF is illustrated, and actually has a step due to the first inclined portion 235h of the color filter 230. (see FIG. 2)

In the structure (CF+PE+CE) of combining the common electrode CE, the pixel electrode PE, and the color filter CF, it is verified that a rhombus-shaped side of the first partial plate electrode 192h and the a side of the first inclined portion 235h of the color filter 230 are parallel to each other and are not overlapped with each other on a plan view. That is, the rhombus structure of the first inclined portion 235h has a larger area, and the rhombus structure of the first partial plate electrode 192h has a smaller area. Further, the centers of the two rhombus structures coincide with each other. As a result, a part of the connecting terminal side of the first minute branch electrode 193h is overlapped with the first inclined portion 235h to have an inclined structure.

Further, a cross point in the cross structure of the first cutout 275h of the common electrode CE coincides with the center of the rhombus shape of the first partial plate electrode 192h of the lower panel 100 and the center of the rhombus shape of the first inclined portion 235h of the color filter 230. Further, a rhombus shape of the first rhombus cutout pattern 276h of the common electrode CE coincides with the center of the rhombus shape of the first partial plate electrode 192h and the center of the rhombus shape of the first inclined portion 235h of the color filter 230. Further, the rhombus structure of the first rhombus cutout pattern 276h has a smaller area than a rhombus area of the first partial plate electrode 192h and a rhombus area of the first inclined portion 235h of the color filter 230, and sides of the respective rhombus shapes are parallel to each other and are not overlapped with each other.

As such, according to the exemplary embodiment of FIG. 1, in order to improve the control force of the liquid crystal molecules, ends of the minute branch electrodes of the pixel electrode 191 are not connected to each other to have a protruding structure. Further, the inclined portion of the color filter and the minute branch electrode are partially overlapped with each other to improve the control force of the liquid crystal molecules in the corresponding region. In addition, the control force of the liquid crystal molecules is improved by forming the liquid crystal control means and the additional liquid crystal control means in the common electrode of the upper panel 200.

That is, in the exemplary embodiment of FIG. 1, the control force of the liquid crystal molecules is improved by the total four structures of the protruding structure of the ends of the minute branch electrodes, the overlapped structure of the inclined portion and the minute branch electrode, the formation of the liquid crystal control means of the common electrode, and the formation of the additional liquid crystal control means in the common electrode. However, even though only at least one of the four structures is formed, the liquid crystal control force is improved, and as a result, an exemplary embodiment having only at least one thereof belongs to the present invention. The liquid crystal alignment force may be improved by combining and using one or more of the four structures according to a liquid crystal alignment characteristic of the exemplary embodiment.

Hereinafter, a change of transmission and display characteristics in an exemplary embodiment using the four structures for reinforcing the liquid crystal alignment force as illustrated in FIG. 1 will be described with reference to FIG. 5.

Figure 5:
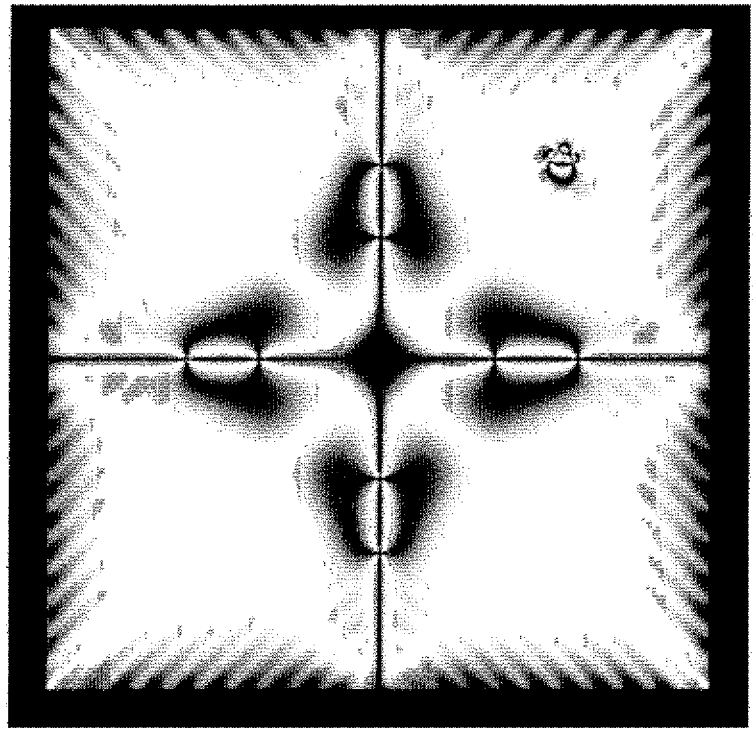
FIG. 5 is a diagram illustrating an experimental result using an Example embodiment of the present invention.

FIG. 5 is a diagram illustrating an experimental result by using Example embodiment of the present invention.

As illustrated in FIG. 5, it may be verified that a transmission characteristic of light in the rhombus cutout patterns 276h, 276l which are the additional liquid crystal control means formed in the common electrode 270 is bad. However, as a result, a liquid crystal alignment force in a direction of 45 degrees of the liquid crystal molecules around the rhombus cutout patterns is improved and thus the liquid crystal molecules are rapidly aligned, thereby improving the response characteristic.

Further, in FIG. 5, it may be verified that a texture occurs in the vicinity of a portion where four sides of the partial plate electrodes 192h, 192l and the cutouts 275h, 275l of the common electrode 270 meet each other. In this case, the sides of the partial plate electrodes 192h, 192l are inclined at angles of 45 degrees, but the cutouts 275h, 275l of the common electrode 270 are formed in a vertical/horizontal direction and thus a texture occurs due to a difference between the alignment directions of the liquid crystal molecules in the corresponding portion. However, the inclined portions 235h, 235l are formed at the portion, and the inclined portions 235h, 235l and the minute branch electrodes 193h, 193l overlap each other, and as a result, the control force of the liquid crystal molecules is improved, thereby reducing a region where the texture occurs and improving the response speed of the liquid crystal molecules.

Hereinafter, a change in a display characteristic according to a degree at which the inclined portions 235h, 235l and the minute branch electrodes 193h, 193l overlap each other will be described.

First, referring to FIGS. 6 to 9, a display characteristic when the inclined portions 235h, 235l and the minute branch electrodes 193h, 193l overlap each other will be described in comparison with a Comparative Example embodiment where the inclined portions 235h, 235l and the minute branch electrodes 193h, 193l are not overlapped with each other.

FIGS. 6 to 9 are diagrams illustrating experimental results in which Example embodiments of the present invention and a Comparative Example embodiment are compared.

Figure 6:
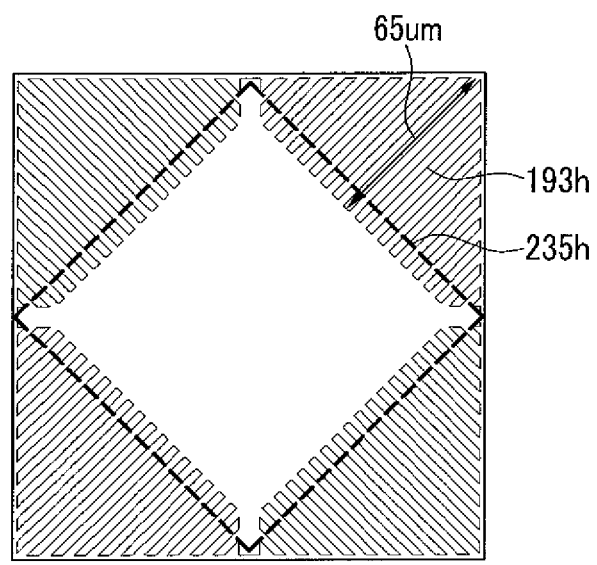
FIGS. 6 to 9 are diagrams illustrating experimental results in which an Example embodiment of the present invention and a Comparative Example embodiment of the present invention are compared.

FIG. 6 illustrates that an experiment was performed based upon an Example where a length of the longest electrode of the first minute branch electrodes 193h is 65 μm in the first subpixel electrode 191h. Here, a length of one side of the first inclined portion 235h is 100 μm, and the longest electrode of the first minute branch electrodes 193h is overlapped with the first inclined portion 235h by 15 μm.

Figure 7:
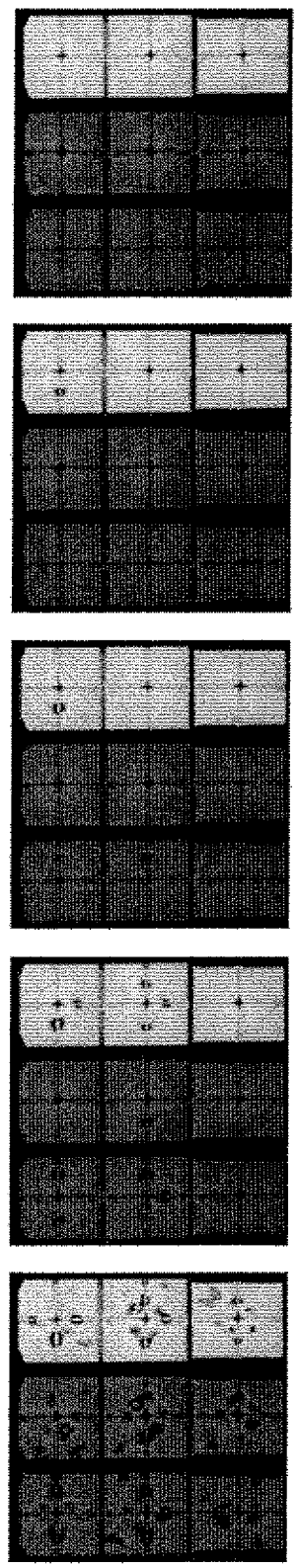

FIG. 7 illustrates a change of the texture with the passage of time with respect to a pixel having the overlapped structure as illustrated in FIG. 6. FIG. 7 illustrates a case where time passes for the figures moving from left to right, and it may be verified that as the time passes, the texture disappears.

Figure 8:
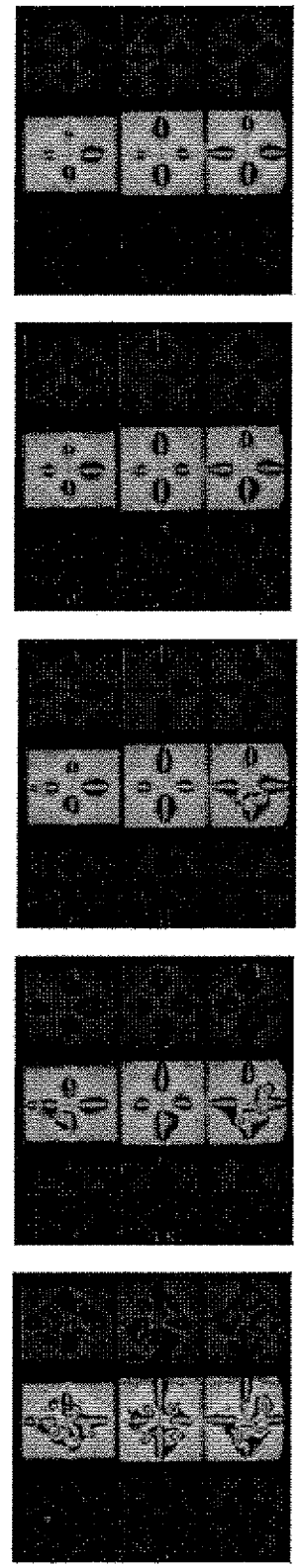

FIG. 8 illustrates a case where the minute branch electrode is not overlapped with the inclined portion in FIG. 6 as the Comparative Example embodiment. In this case, although the time passes, the change of the texture is small.

FIGS. 7 and 8 are diagrams photographed over the same time interval, and it may be verified that in FIG. 7, a time when the texture is removed is decreased as compared with the Comparative Example embodiment, and as a result, the response speed of the liquid crystal molecules is improved.

Figure 9:
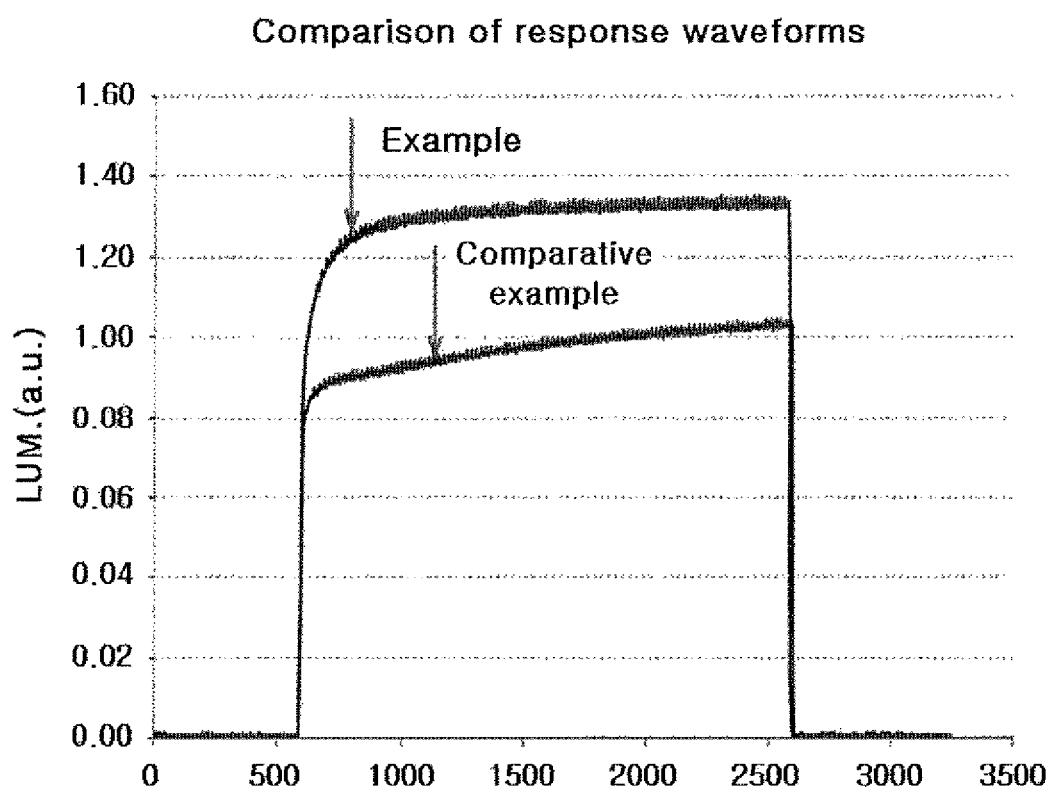

FIG. 9 illustrates this result by a table, and a horizontal axis represents a time and a vertical axis represents luminance.

As verified in FIG. 9, in the Example embodiment of FIG. 6, maximum luminance is shown within a short time and maintained, but in the Comparative Example embodiment, as time passes the luminance is constantly increased, and as a result, while the liquid crystal molecules are continuously aligned, the display luminance is increased. Therefore, as illustrated in FIG. 6, when the minute branch electrode is overlapped with the inclined portion, the control force of the liquid crystal molecules is reinforced, thereby improving the response speed of the liquid crystal molecules.

Further, FIG. 9 illustrates that the display luminance in the Example embodiment of FIG. 6 is also improved as compared with the Comparative Example embodiment. That is, in Example embodiment of FIG. 6, since the texture is less and rapidly removed, the display luminance is higher than that in the Comparative Example embodiment.

Hereinafter, a display characteristic according to an overlapped degree of the minute branch electrode and the inclined portion will be described with reference to FIGS. 10 to 17.

Figure 10:
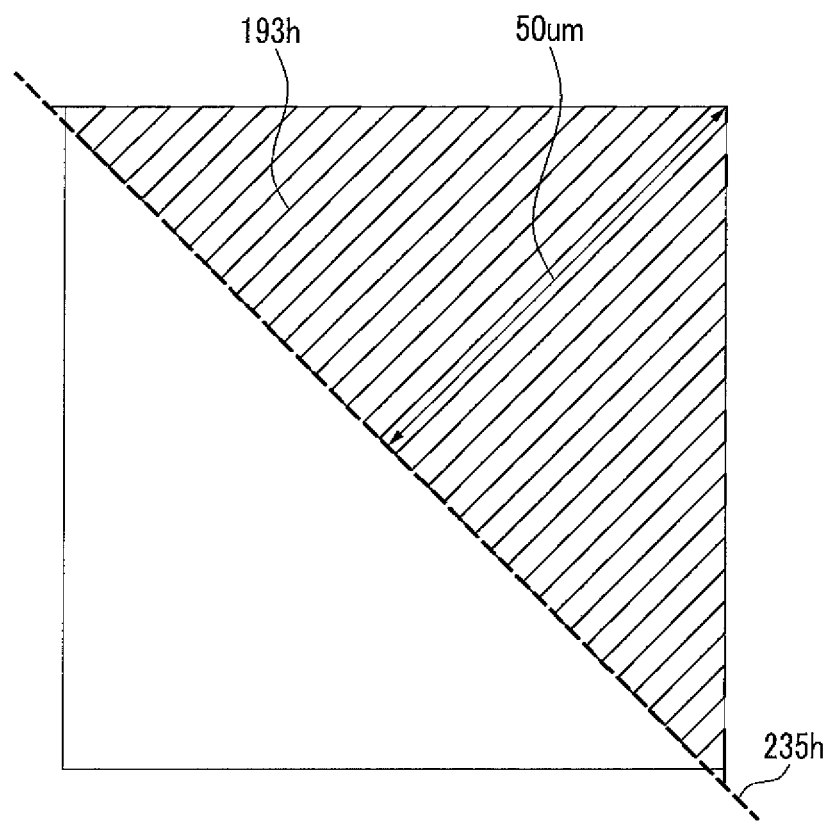
FIGS. 10 to 17 are diagrams illustrating textures according to an exemplary embodiment of the present invention.
Figure 11:
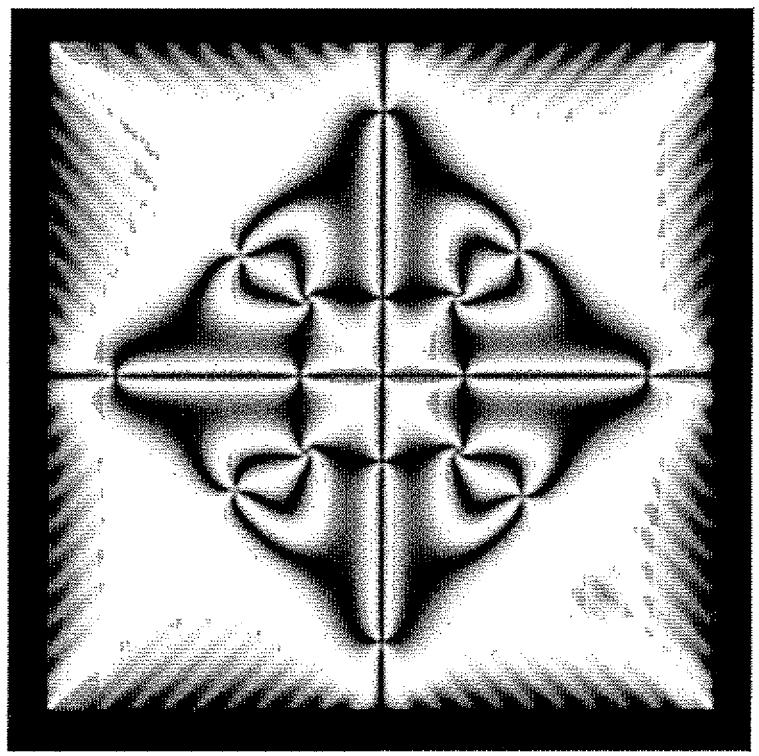
Figure 12:
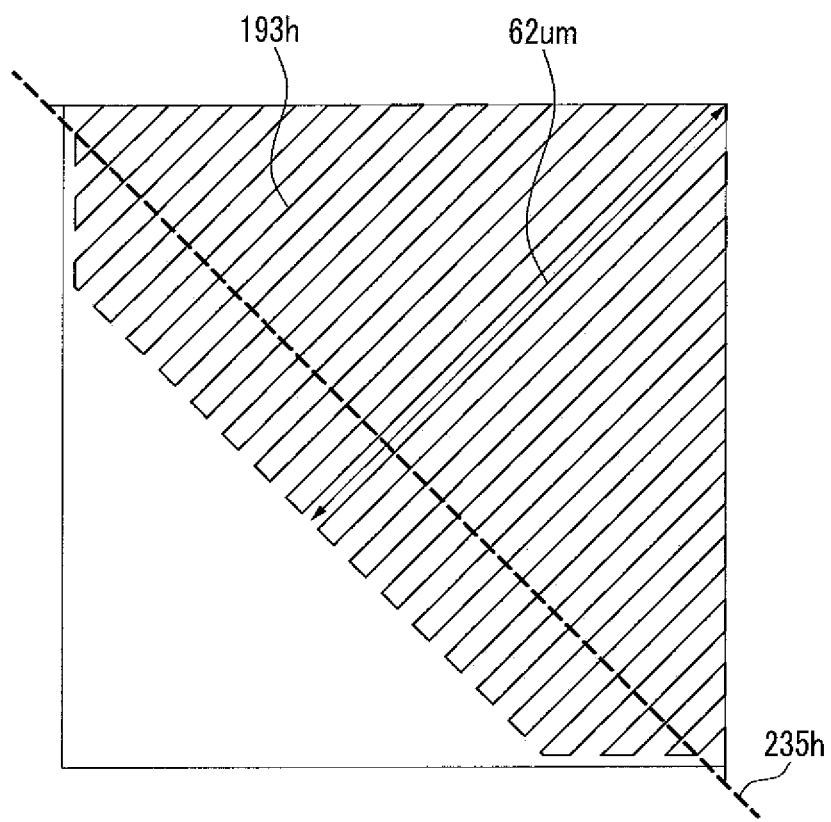
Figure 13:
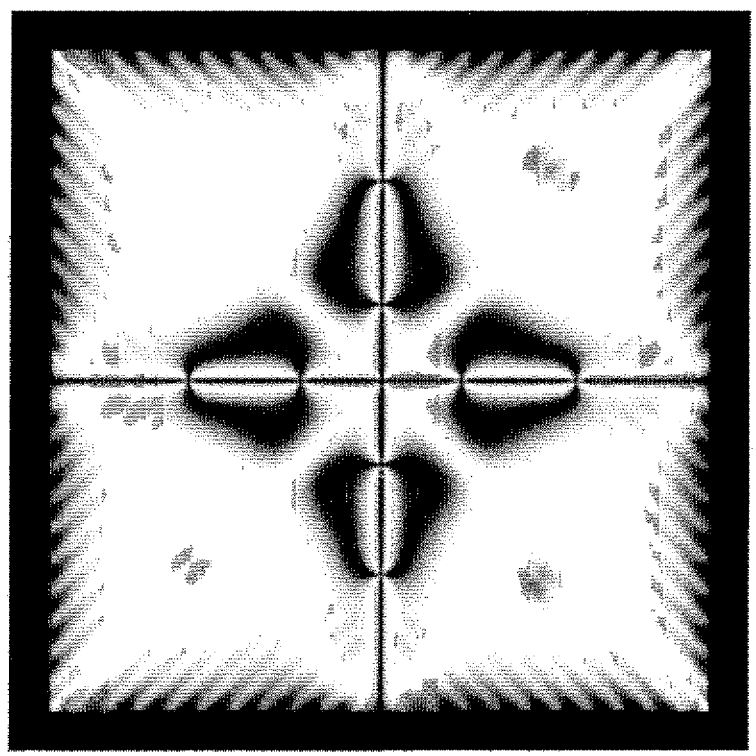
Figure 14:
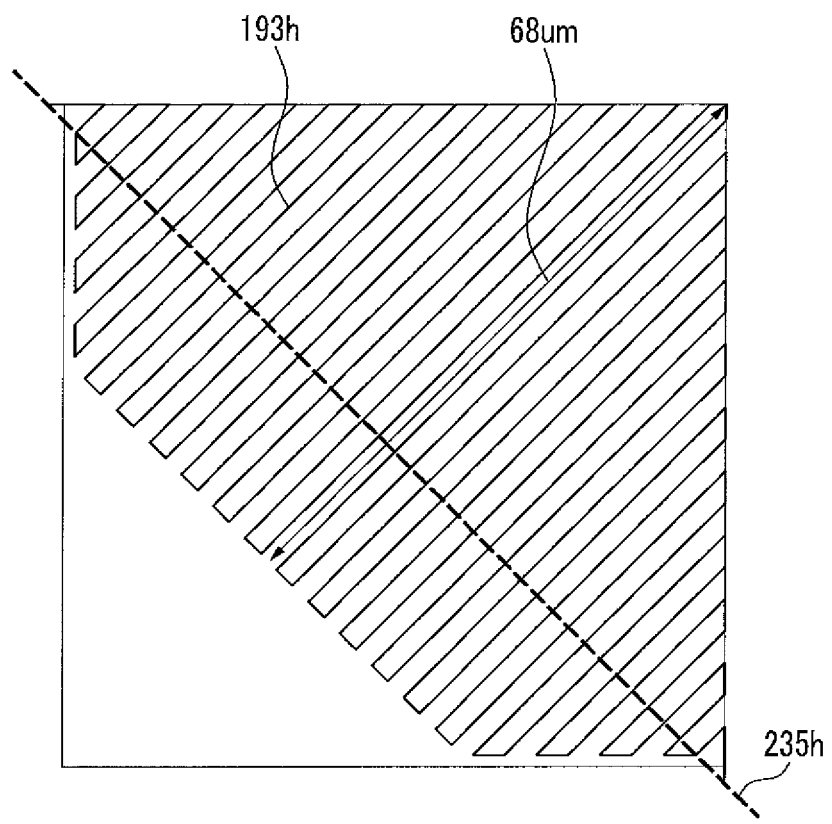
Figure 15:
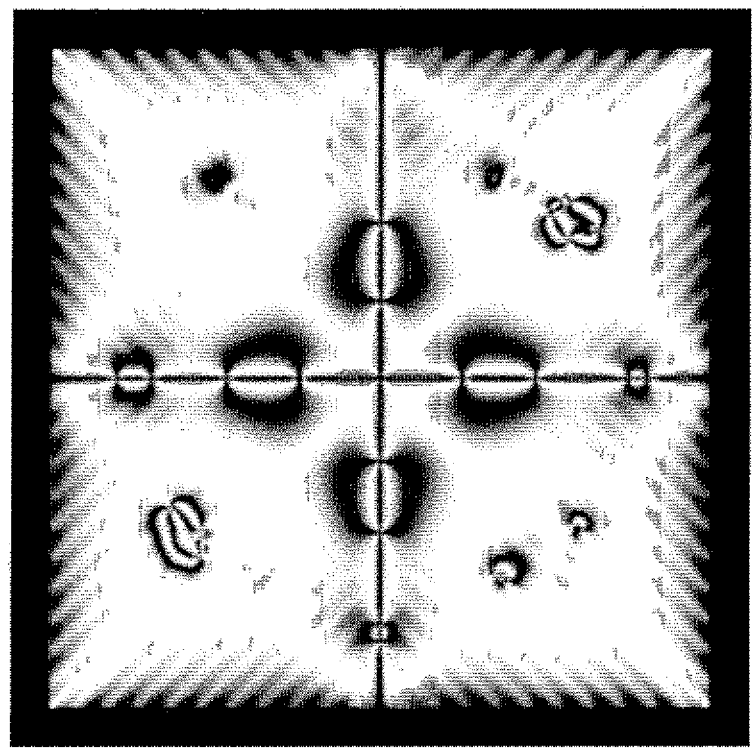
Figure 16:
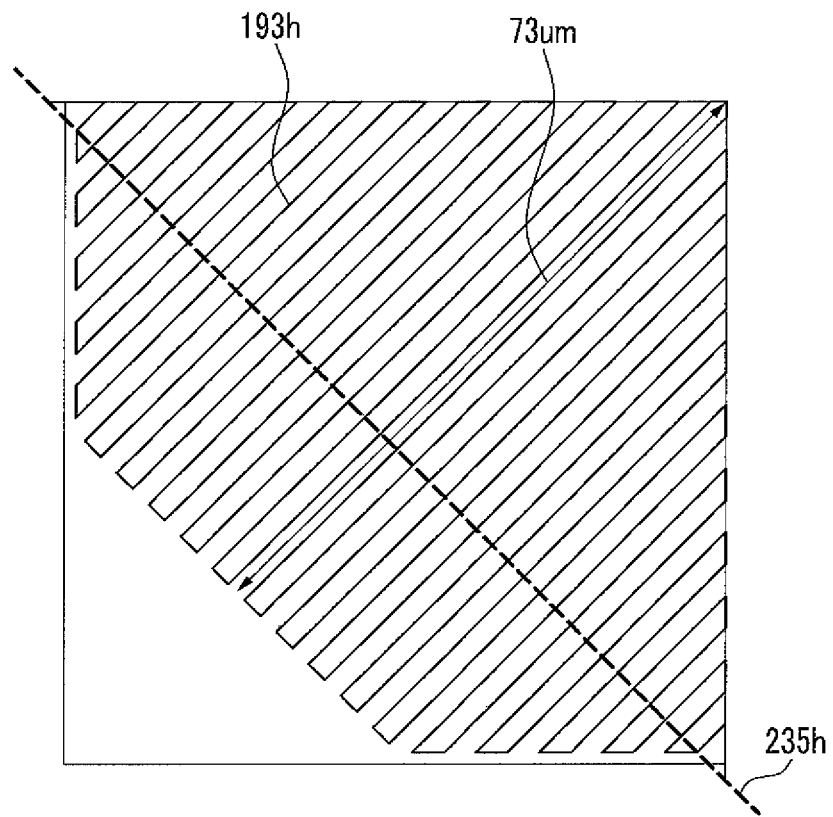
Figure 17:
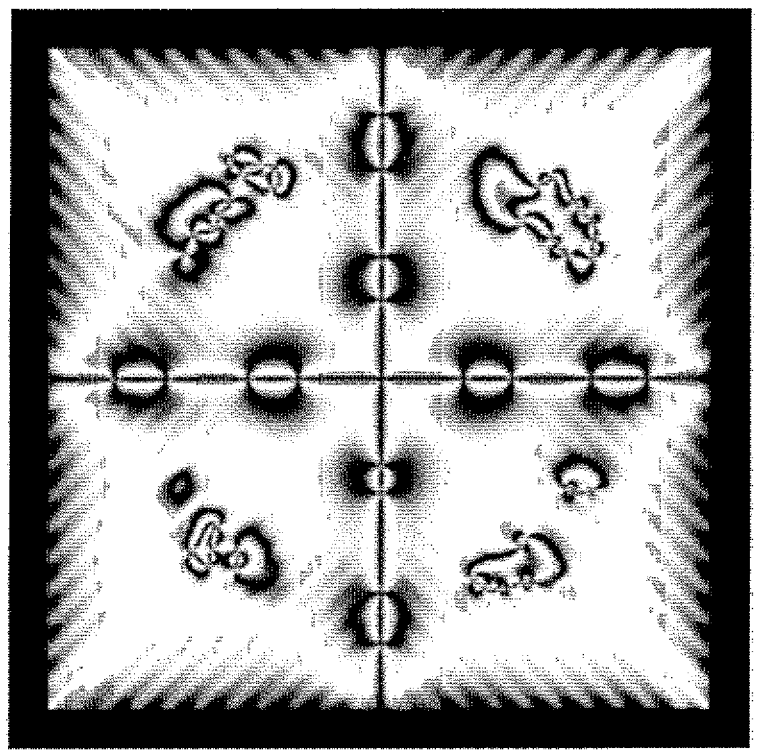

FIGS. 10 to 17 are diagrams illustrating textures according to Example embodiments of the present invention, FIGS. 10 and 11 illustrate the case where a length of the longest electrode of the minute branch electrodes is 50 μm. FIGS. 12 and 13 illustrate the case where a length of the longest electrode of the minute branch electrodes is 62 μm. FIGS. 14 and 15 illustrate the case where a length of the longest electrode of the minute branch electrodes is 68 μm. FIGS. 16 and 17 illustrate the case where a length of the longest electrode of the minute branch electrodes is 73 μm.

First, FIGS. 10 and 11 will be described.

FIGS. 10 and 11 illustrate the case where the length of the longest electrode of the minute branch electrodes is 50 μm, and an end of the first minute branch electrode 193*h* and one side of the first inclined portion 235*h* coincide with each other. As a result, the texture occurred in a portion corresponding to each side of the first inclined portion 235*h*.

However, as illustrated in FIGS. 12 to 15, in the case where the length of the longest electrode of the first minute branch electrodes 193*h* is 62 μm or 68 μm, the liquid crystal control force was increased due to the first minute branch electrodes 193*h* at the portion corresponding to each side of the first inclined portion 235*h* and thus the texture was removed in the corresponding portion.

However, in FIGS. 14 and 15 in which the length of the longest electrode of the first minute branch electrodes 193*h* is 68 μm, the texture started to occur again at the portion corresponding to each side of the first inclined portion 235*h*.

When the overlapped length of the first minute branch electrode 193*h* and the first inclined portion 235*h* was increased as illustrated in FIGS. 16 and 17, a significant amount of textures occurred at the portion corresponding to each side of the first inclined portion 235*h*, and as a result, there is a problem in that transmittance deteriorates.

Therefore, in the exemplary embodiment, the length of the longest electrode of the first minute branch electrodes 193*h* needs to be more than 50 μm and may be 60 μm or less. In this case, a length of one side of the first inclined portion 235*h* is 100 μm, an oblique length of the square region is 200 μm.

Therefore, the length of the longest electrode of the minute branch electrodes may have a value of between 25% and 35% of an oblique length of the entire square region, and a length of the longest electrode of the minute branch electrodes that is overlapped with the inclined portion may have a value of between 0% and 10% of the oblique length of the entire square region.

Hereinafter, various exemplary embodiments of the liquid crystal control means or the additional liquid crystal control means that is formed in the common electrode 270 of the upper panel 200 will be described with reference to FIGS. 18 to 24.

FIGS. 18 to 24 are diagrams illustrating pixel structures and textures depending thereon according to another exemplary embodiment of the present invention.

Figure 18:
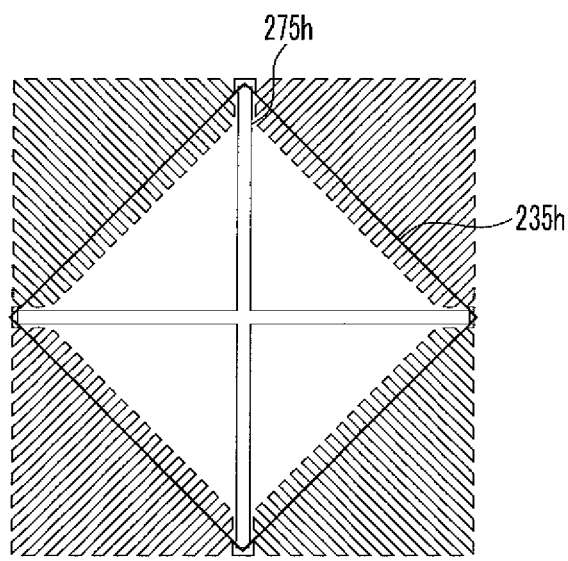
FIGS. 18 to 24 are diagrams illustrating pixel structures and textures depending thereon according to another exemplary embodiment of the present invention.
Figure 19:
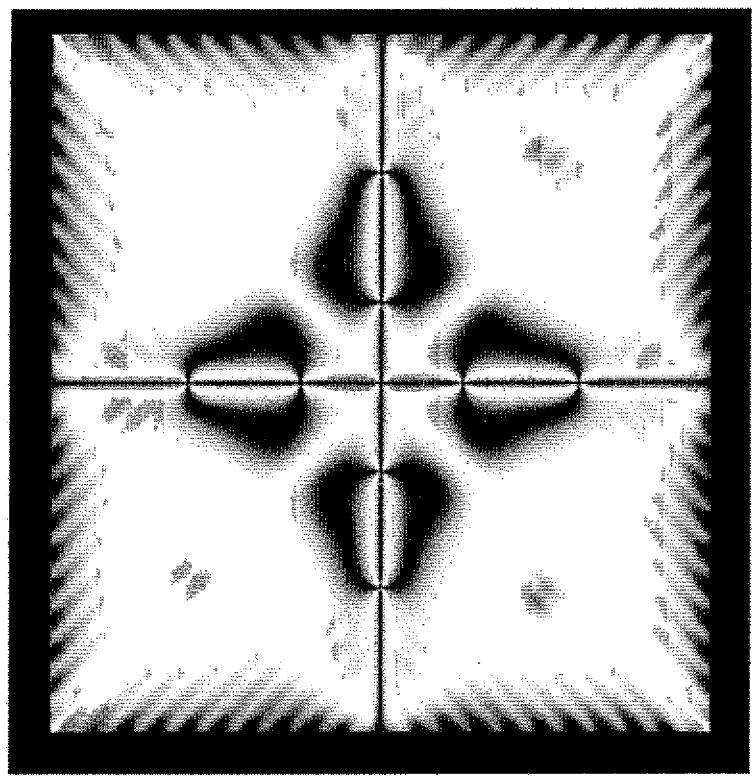

First, FIGS. 18 and 19 illustrate a case where the rhombus cutout patterns 276*h* and 276*l* which are the additional liquid crystal control means are removed from the common electrode 270 of FIG. 1. That is, only the cutouts 275*h*, 275*l* which are the liquid crystal control means and have a cross shape are formed at the common electrode 270.

When comparing FIG. 19 with FIG. 5, in FIG. 19, it is advantageous that light passes through a cross point portion of the cross structure, but a size of the texture occurring in a region where the cutout 275*h* having the cross structure and the first inclined portion 235*h* overlap each other is relatively large.

Hereinafter, the Example embodiment of FIG. 20 will be described.

Figure 20:
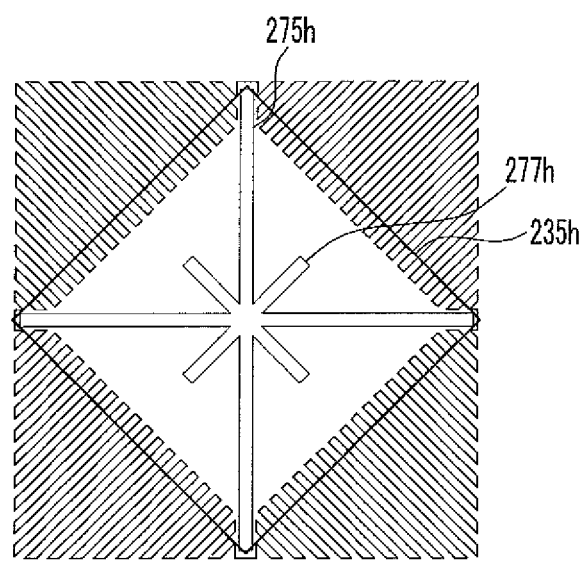

As illustrated in FIG. 20, the common electrode 270 has the cutout having the cross structure as a liquid crystal control means, and an X-shaped cutout pattern 277*h* having an X shape is formed as an additional liquid crystal control means unlike FIG. 1. Herein, a length of one side of the X-shaped cutout pattern 277*h* may have a value of between 0% and 25% of the oblique length of the entire square region. The X-shaped cutout pattern 277*h* may be also referred to as an X-shaped pattern together with a case of being formed by a protrusion.

Figure 21:
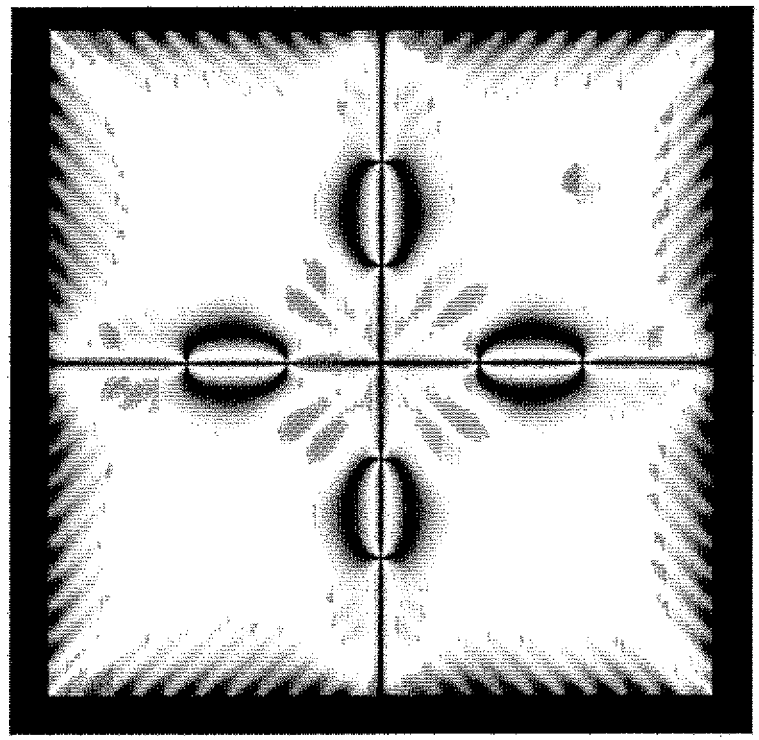

When comparing FIG. 21 with FIGS. 5 and 19, it is advantageous that light passes through a cross point portion of the cross structure and a size of the texture occurring in a region where the cutout 275*h* having the cross structure and the first inclined portion 235*h* overlap each other is not relatively large.

Hereinafter, the Example embodiment of FIG. 22 will be described.

Figure 22:
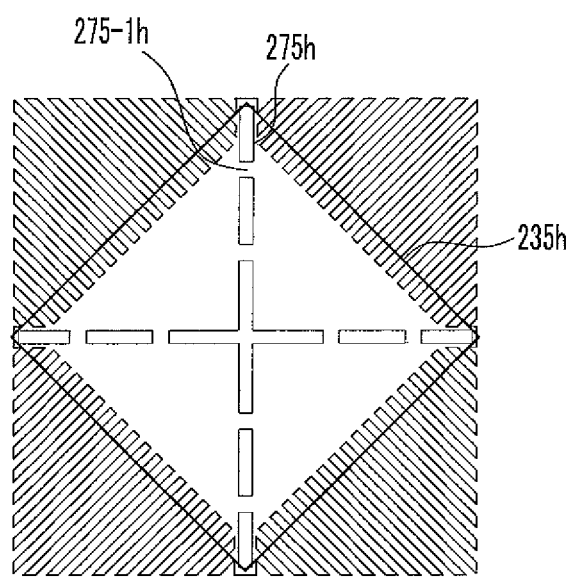

As illustrated in FIG. 22, the common electrode 270 does not have the additional liquid crystal control means, but has a disconnected portion 275-1*h* in the middle of the cutout 275*h* having the cross structure as the liquid crystal control means. The disconnected portion 275-1*h* is formed so that the cutout portion is disconnected by forming the common electrode 270 between the cutouts 275*h*. As a result, the common electrodes 270 positioned in one square region are connected with each other through the disconnected portion 275-1*h*.

Figure 23:
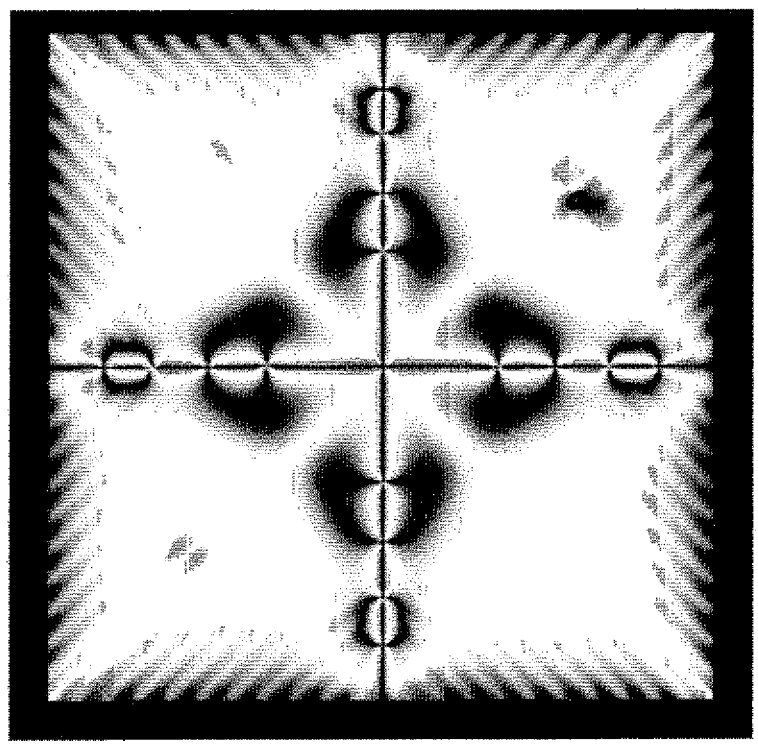

When comparing FIG. 23 with FIGS. 5, 19, and 21, it is advantageous that light passes through a cross point portion of the cross structure, but the texture occurred in the region where the cutout 275*h* having the cross structure and the first inclined portion 235*h* overlap each other and the disconnected portion 275-1*h*.

Figure 24:
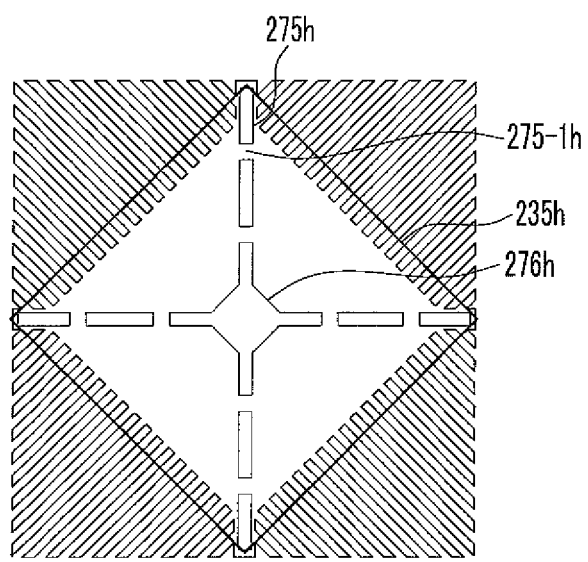

According to an exemplary embodiment, at least two of FIGS. 1, 18, 19, 20, and 22 may be used together, and a structure of FIG. 24 is illustrated as an example.

FIG. 24 illustrates a combined structure of the structures of FIG. 1 and FIG. 22.

That is, as illustrated in FIG. 24, the disconnected portion 275-1*h* in the middle of the first cutout 275*h* having the cross structure as the liquid crystal control means is included in the common electrode 270. Further, a first rhombus cutout pattern 276*h* is included as the additional liquid crystal control means like FIG. 1. As such, in the structure of FIG. 24, the control force of the liquid crystal molecules is improved due to the disconnected portion 275-1*h* in the middle of the first cutout 275*h* and the rhombus cutout pattern 276*h*, and as a result, more rapid response speed of the liquid crystal molecules may be acquired.

As such, Example embodiments of the present invention may also be applied to various pixel structures, and hereinafter, representative examples applied for each pixel structure will be described with reference to FIGS. 25 to 32, respectively.

FIGS. 25 to 32 are circuit diagrams and layout views illustrating a liquid crystal display device according to another exemplary embodiment of the present invention.

First, referring to FIGS. 25 and 26, a structure in which two subpixels are coupled with each other by an auxiliary storage capacitor Cas after receiving data voltage from one transistor Q will be described.

Figure 25:
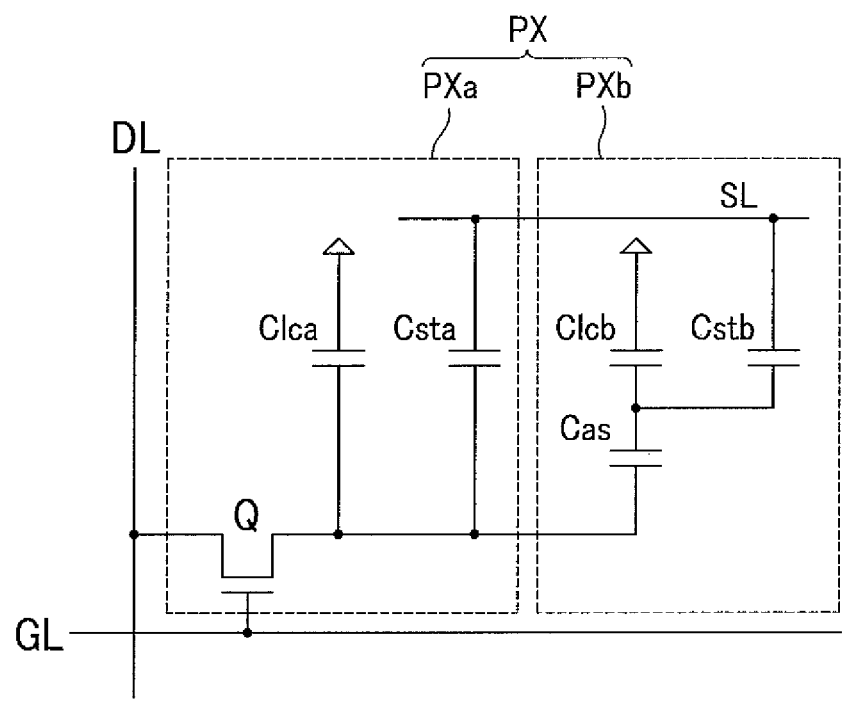
FIGS. 25 to 32 are circuit diagrams and layout views illustrating a liquid crystal display device according to another exemplary embodiment of the present invention.
Figure 26:
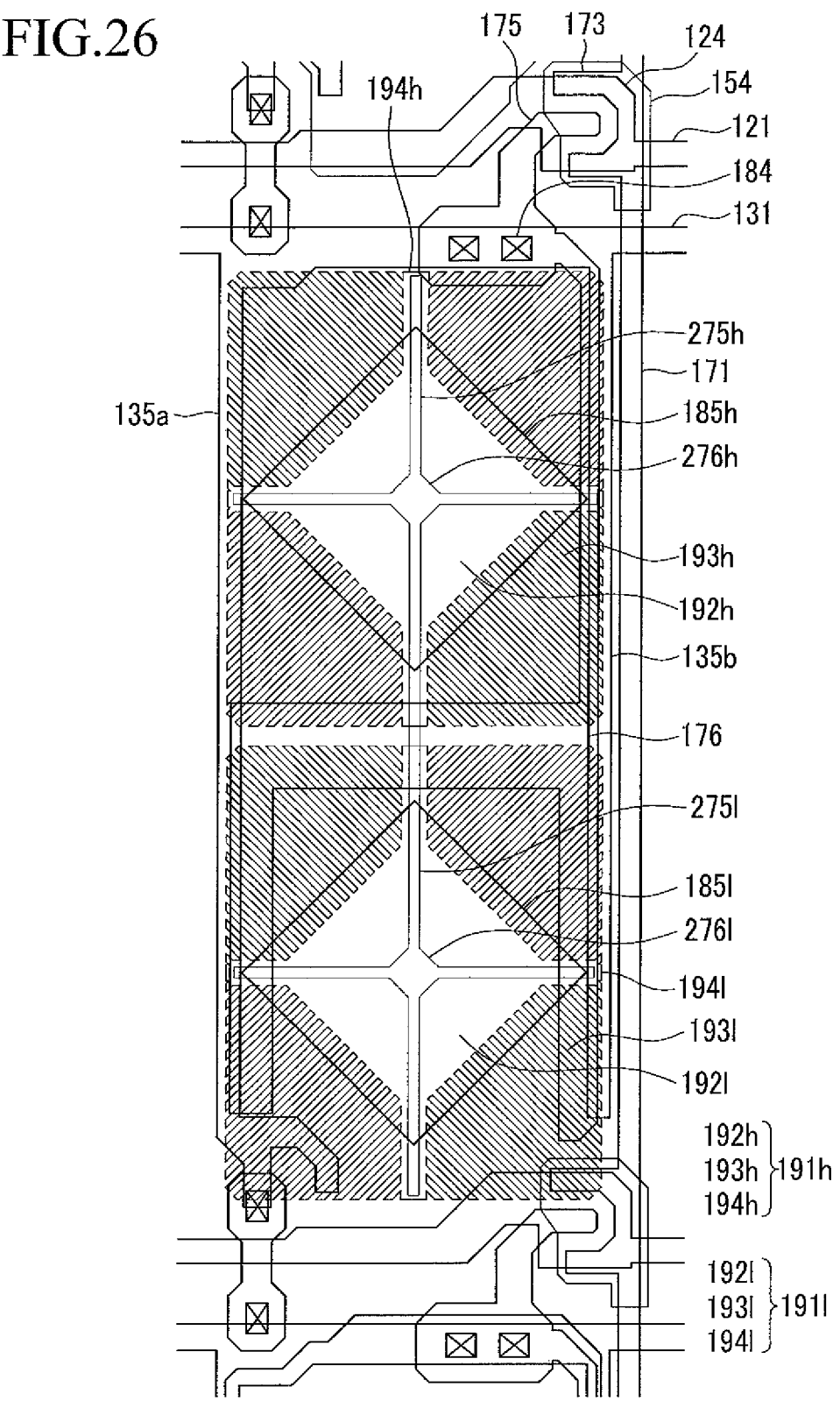

FIG. 25 is an equivalent circuit diagram of one pixel of a liquid crystal display device according to the another exemplary embodiment of the present invention, and FIG. 26 is a layout view of a lower panel of the liquid crystal display device according to another exemplary embodiment of the present invention.

The liquid crystal display device according to the exemplary embodiment of the present invention includes signal lines including a plurality of gate lines GL, a plurality of data lines DL, and a plurality of storage electrode lines SL, and a plurality of pixels PX connected thereto. Each pixel PX includes a pair of first and second subpixels PXa, PXb, and a first subpixel electrode (191*h* of FIG. 26) is formed in the first subpixel PXa and a second subpixel electrode (191I of FIG. 26) is formed in the second subpixel PXb.

The liquid crystal display device according to the exemplary embodiment of the present invention further includes a switching element Q connected to the gate line GL and the data line DL, a first liquid crystal capacitor Clca and a first storage capacitor Csta which are connected to the switching element Q and formed in the first subpixel PXa, a second liquid crystal capacitor Clcb and a second storage capacitor Cstb which are connected to the switching element Q and formed in the second subpixel PXb, and an auxiliary capacitor Cas formed between the switching element Q and the second liquid crystal capacitor Clcb.

The switching element Q is a three-terminal element such as a thin film transistor provided in the lower panel 100, and a control terminal thereof is connected to the gate line GL, an input terminal is connected to the data line DL, and an output terminal is connected to the first liquid crystal capacitor Clca, the first storage capacitor Csta, and the auxiliary capacitor Cas.

One terminal of the auxiliary capacitor Cas is connected to an output terminal of the switching element Q, and the other terminal thereof is connected to the second liquid crystal capacitor Clcb and the second storage capacitor Cstb.

A charged voltage of the second liquid crystal capacitor Clcb is lower than a charged voltage of the first liquid crystal capacitor Clca by the auxiliary capacitor Cas, thereby improving side visibility of the liquid crystal display device.

In the structure of the liquid crystal display device according to the exemplary embodiment of the present invention, as illustrated in FIG. 26, a plurality of gate conductors including a plurality of gate lines 121 and a plurality of storage electrode lines 131 is formed on an insulation substrate (not illustrated) made of transparent glass or plastic.

The gate lines 121 transfer gate signals and extend mainly in a horizontal direction. Each gate line 121 includes a plurality of gate electrodes 124 protruding upwards.

The storage electrodes lines 131 receive predetermined voltages and extend to be substantially parallel to the gate lines 121. Each storage electrode line 131 is positioned between two adjacent gate lines 121. The storage electrode line 131 includes storage electrodes 135*a*, 135*b* which are expanded downwards. However, shapes and layouts of the storage electrode line 131 and the storage electrodes 135*a*, 135*b* may be varied.

A gate insulating layer (not illustrated) is formed on the gate conductors 121, 131. An island-shaped semiconductor 154 is formed on the gate insulating layer. The semiconductor 154 is positioned on the gate electrode 124.

A data conductor including a plurality of data lines 171 and drain electrodes 175 is formed on the semiconductor 154 and the gate insulating layer.

The data lines 171 transfer data signals and mainly extend in a vertical direction to cross the gate lines 121 and the storage electrode lines 131. Each data line 171 includes a source electrode 173 which extends toward the gate electrode 124.

The drain electrode 175 is separated from the data line 171 and includes a rod-shaped end portion facing the source electrode 173 based upon the gate electrode 124. The rod-shaped end portion is partially surrounded by the curved source electrode 173.

The other end portion of the drain electrode 175 extends to be substantially parallel to the data line 171 to be formed throughout the first subpixel PXa and the second subpixel PXb, and a portion formed in the second subpixel PXb is called an auxiliary electrode 176.

A passivation layer (not illustrated) is formed on the data conductors 171, 175 and the semiconductor 154. The passivation layer is made of an organic insulator or the like and includes inclined portions 185*h*, 185*l*. The surface of the passivation layer except for the inclined portions 185*h*, 185*l* is flat. In the exemplary embodiment of FIG. 26, the inclined portions 185*h*, 185I are formed on the passivation layer, and the exemplary embodiment of FIG. 26 is different from the exemplary embodiment in which the inclined portions are formed on the color filter 230 of FIG. 1.

The inclined portions 185*h*, 185I are positioned in a partial region of a portion overlapped with the first and second subpixel electrodes 191*h*, 191*l* and have a structure in which heights thereof are changed. The inclined portions 185*h*, 185I have rhombus structures as illustrated in FIG. 26. The rhombus structure of the first inclined portion 185*h* may be formed so that a vertex is in contact with a boundary of a quadrangular region occupied by a first partial plate electrode 192*h*, and according to an exemplary embodiment, the vertex may not be in contact with the boundary. Further, the rhombus structure of the second inclined portion 185I may be formed so that a vertex is in contact with a boundary of a quadrangular region occupied by a second partial plate electrode 192I, and according to an exemplary embodiment, the vertex may not be in contact with the boundary. Further, according to an exemplary embodiment, the region in which the rhombus structure is positioned may also have a square or rectangular region. The inclined portions 185*h*, 185*l* have structures in which heights are gradually decreased toward the center from a side of the rhombus structure. The inclined portions 185*h*, 185*l* have structures in which the heights are decreased at a predetermined slope from one side to the center, and as the heights are decreased, the widths are decreased. An organic insulator may not be formed at the centers of the inclined portions 185*h*, 185*l* having the rhombus structure, and according to an exemplary embodiment, an opening in which the organic insulator is not formed may be included in a predetermined region near the center.

A color filter may be formed below the passivation layer, and the color filter may be positioned on the upper panel. Further, unlike FIG. 26, the inclined portions as illustrated in FIG. 1 may be positioned at the color filter positioned below the passivation layer. In this case, the inclined portions may not be formed at the passivation layer.

A plurality of pixel electrodes 191 is formed on the passivation layer. Each pixel electrode 191 includes a first subpixel electrode 191*h* and a second subpixel electrode 191*l* which are formed at a predetermined distance.

The first subpixel electrode 191*h* and the second subpixel electrode 191*l* include partial plate electrodes 192*h*, 192*l* positioned at the centers thereof, extensions 194*h*, 194*l* extending from the partial plate electrodes 192*h*, 192*l* in a vertical or horizontal direction, and a plurality of minute branch electrodes 193*h*, 193*l* protruding from the partial plate electrodes 192*h*, 192*l* and the extensions 194*h*, 194*l* in an oblique direction, respectively.

The first subpixel electrode 191*h* includes the first partial plate electrode 192*h* and the plurality of first minute branch electrodes 193*h*, and is connected with a wide end portion of the drain electrode 175 by a connecting portion extended outside the quadrangular region.

The first partial plate electrode 192*h* has a rhombus shape, a center thereof is positioned at the center of the quadrangular region, and each vertex of the rhombus shape is formed at a predetermined distance from a boundary of the quadrangular region. Further, the first partial plate electrode 192*h* covers a part from the center of the first inclined portion 185*h* of the passivation layer. As a result, the first partial plate electrode 192*h* has an inclination provided by the first inclined portion 185*h* of the passivation layer as it is.

The first subpixel electrode 191*h* has a first extension 194*h* extending from each vertex of the rhombus shape of the first partial plate electrode 192*h* in a vertical or horizontal direction (in a parallel or vertical direction to the gate line 121 or the data line 171). The first extension 194*h* extends in the vertical or horizontal direction to meet a boundary of the quadrangular region occupied by the first subpixel electrode 191*h*. As a result, the first extension 194*h* meets the vertex of the rhombus structure of the first inclined portion 185*h* of the passivation layer on the plan view so as to be vertically overlapped with each other.

The plurality of first minute branch electrodes 193*h* extends from the oblique side of the first partial plate electrode 192*h* and the first extension 194*h*. The plurality of first minute branch electrodes 193*h* fills the rest of the quadrangular region, forms an angle of 45 degrees with the first extension 194*h* (or the gate line 121 or the data line 171), and forms an angle of 90 degrees with the oblique side of the first partial plate electrode 192*h*. Further, ends of the first minute branch electrodes 193*h* are not connected to each other to protrude outwards. However, if the ends of the first minute branch electrodes 193*h* are connected to each other to be closed, directions of liquid crystal molecules of the liquid crystal layer 3 to be aligned by an electric field are different from directions of the liquid crystal molecules to be aligned by the closed ends, and as a result, a response speed of the liquid crystal molecules may be delayed. Therefore, in the exemplary embodiment of the present invention, the ends of the first minute branch electrodes 193*h* are not connected to each other but protrude outwards to have a structure in which opening regions between the first minute branch electrodes 193*h* are opened. As a result, the liquid crystal molecules may be aligned in the directions to be aligned by the electric field without other resistance, and as a result, the response speed of the liquid crystal molecules is improved and textures are decreased.

Further, a connecting terminal connected with the oblique side of the first partial plate electrode 192*h* and the first extension 194*h* is positioned above the first inclined portion 185*h* of the passivation layer to be overlapped with each other in the plurality of first minute branch electrodes 193*h*. That is, the connecting terminal of the first minute branch electrode 193*h* overlaps the first inclined portion 185*h* of the passivation layer by a predetermined distance. Therefore, the vicinity of the connecting terminal of the first minute branch electrode 193*h* has the inclination provided by the first inclined portion 185*h* of the passivation layer as it is, and a flat structure is formed up to the end from the vicinity of the connecting terminal. The end portion of the first minute branch electrode 193*h* and the first inclined portion 185*h* of the passivation layer overlap each other and thus liquid crystal control force of the corresponding portion is further increased, and as a result, the liquid crystal molecules may rapidly operate by the electric field. As a result, the response speed of the liquid crystal molecules is improved. However, when a length of the first minute branch electrode 193*h* is overly increased and thus an overlapped distance is too large, a texture due to a slit structure may occur, and as a result, the overlapped distance needs to be set at a predetermined level or less. In the exemplary embodiment, the longest electrode of the first minute branch electrodes 193*h* may have a length of more than 50 µm and 68 µm or less, and a size of the pixel is determined according to a characteristic of the display device. When a size of the quadrangular region is determined according to the size of the pixel, the length of the longest electrode of the first minute branch electrodes 193*h* may be selected and used in the range of more than 50 µm and 68 µm or less. However, according to an exemplary embodiment, an exemplary embodiment beyond the above range may also exist. The length of the longest electrode of the first minute branch electrodes 193*h* may have a value of between 25% and 35% of an oblique length of the entire quadrangular region, and a length of the longest electrode of the first minute branch electrodes 193*h* that is overlapped with the first inclined portion 185*h* may have a value of between 0% and 10% of the oblique length of the entire square region.

The second partial plate electrode 192*l* of the second subpixel electrode 191I has a rhombus shape, a center thereof is positioned at the center of the quadrangular region, and each vertex of the rhombus shape is formed at a predetermined distance from a boundary of the quadrangular region. Further, the second partial plate electrode 192*l* covers a part from the center of the second inclined portion 185I of the passivation layer. As a result, the second partial plate electrode 192*l* has an inclination provided by the second inclined portion 185*l* of the passivation layer as it is.

The second subpixel electrode 191I has the second extension 194*l* extending from each vertex of the rhombus shape of the second partial plate electrode 192*l* in a vertical or horizontal direction (in a parallel or vertical direction to the gate line 121 or the data line 171). The second extension 194*l* extends in the vertical or horizontal direction to meet a boundary of the two-divided square regions. As a result, the second extension 194*l* meets the vertex of the rhombus structure of the second inclined portion 185I of the passivation layer on the plan view so as to be vertically overlapped with each other.

The plurality of second minute branch electrodes 193I extends from an oblique side of the second partial plate electrode 192*l* and the second extension 194*l*. The plurality of second minute branch electrodes 193I fills the rest of the quadrangular region, forms an angle of 45 degrees with the second extension 194I (or the gate line 121 or the data line 171), and forms an angle of 90 degrees with the oblique side of the second partial plate electrode 192*l*. Further, ends of the second minute branch electrodes 193I are not connected to each other to protrude outwards. However, if the ends of the second minute branch electrodes 193I are connected to each other to be closed, directions of liquid crystal molecules of the liquid crystal layer 3 to be aligned by an electric field are different from directions of the liquid crystal molecules to be aligned by the closed ends, and as a result, a response speed of the liquid crystal molecules may be delayed. Therefore, in the exemplary embodiment of the present invention, the ends of the second minute branch electrodes 193I are not connected to each other but protrude outwards to have a structure in which opening regions between the second minute branch electrodes 193I are opened. As a result, the liquid crystal molecules may be aligned in the directions to be aligned by the electric field without other resistance, and as a result, the response speed of the liquid crystal molecules is improved and textures are decreased.

Further, a connecting terminal connected with the oblique side of the second partial plate electrode 192*l* and the second extension 194I is positioned above the second inclined portion 185I of the passivation layer to be overlapped with the second inclined portion 185I of the passivation layer in the plurality of second minute branch electrodes 193I. That is, the connecting terminal of the second minute branch electrode 193I is overlapped with the second inclined portion 185I of the passivation layer by a predetermined distance. Therefore, the vicinity of the connecting terminal of the second minute branch electrode 193I has the inclination provided by the second inclined portion 185I of the passivation layer as it is, and a flat structure is formed up to the end from the vicinity of the connecting terminal. The end portion of the second minute branch electrode 193I and the second inclined portion 185I of the passivation layer overlap each other and thus liquid crystal control force of the corresponding portion is further increased, and as a result, the liquid crystal molecules may rapidly operate by the electric field. As a result, the response speed of the liquid crystal molecules is improved. However, when lengths of the second minute branch electrodes 193I are overly increased and thus overlapped distances are too large, a texture due to a slit structure may occur, and as a result, the overlapped distances need to be set at a predetermined level or less. In the exemplary embodiment, the longest electrode of the second minute branch electrodes 193I may have a length of more than 50 μm and 68 μm or less, and a size of the pixel is determined according to a characteristic of the display device. When a size of the square region is determined according to the size of the pixel, the length of the longest electrode of the second minute branch electrodes 193I may be selected and used in the range of more than 50 μm and 68 μm or less. However, according to an exemplary embodiment, an exemplary embodiment beyond the above range may also exist. The length of the longest electrode of the second minute branch electrodes 193I may have a value of between 25% and 35% of an oblique length of the entire square region, and a length of the longest electrode of the second minute branch electrodes 193I that is overlapped with the second inclined portion 185I may have a value of between 0% and 10% of the oblique length of the entire square region.

The second subpixel electrode 191I includes the second partial plate electrode 192I and the plurality of second minute branch electrodes 193I, and is overlapped with the auxiliary electrode 176 to form an auxiliary capacitor Cas.

The first and second subpixel electrodes 191*h*, 191*l* form first and second liquid crystal capacitors together with the common electrode of the upper panel and the liquid crystal layer therebetween to maintain the applied voltage even after a thin film transistor (Q of FIG. 25) is turned off.

The first and second subpixel electrodes 191*h*, 191*l* are overlapped with the storage electrodes 135*a*, 135*b* to form the first and second storage capacitors Csta, Cstb, and reinforce voltage maintaining capacity of the first and second liquid crystal capacitors Clca, Clcb.

In the first exemplary embodiment, the auxiliary electrode 176 is formed by extending the drain electrode 175, but the present invention is not limited thereto and the auxiliary electrode 176 may be formed to be separated from the drain electrode 175. In this case, a contact hole is formed in a passivation layer above the first subpixel electrode 191*h*, and the auxiliary electrode 176 is connected with the first subpixel electrode 191*h* through the contact hole to be overlapped with the second subpixel electrode 191I.

A light blocking member and a common electrode may be formed on the upper panel 200. A color filter may be formed on the upper panel 200.

The common electrode formed on the upper panel 200 is made of a transparent conductive material and may include a liquid crystal control means and an additional liquid crystal control means.

Cutouts 275*h*, 275*l* as the liquid crystal control means are formed in a cross shape at the common electrode 270. A cross point in the cross structure of the first cutout 275*h* is overlapped with the center of the rhombus shape of the first partial plate electrode 192*h* of the lower panel 100 or the center of the rhombus shape of the first inclined portion 185*h* of the passivation layer. Further, the cross structure of the second cutout 275I is overlapped with the center of the rhombus shape of the second partial plate electrode 192I of the lower panel 100 or the center of the rhombus shape of the second inclined portion 185I of the passivation layer, respectively. Further, the cutouts 275*h*, 275*l* positioned at the adjacent pixels extend to be connected with each other. The cutouts 275*h*, 275*l* serve to improve the control force of the liquid crystal molecules.

Further, the additional liquid crystal control means is positioned near the cross point of the cross structure of the cutouts 275*h*, 275*l* in the common electrode 270. In the exemplary embodiment of FIG. 26, rhombus cutout patterns 276*h*, 276*l* are formed as the additional liquid crystal control means. The rhombus cutout patterns 276*h*, 276*l* have sides which are parallel to the rhombus shapes of the partial plate electrodes 192*h*, 192I of the lower panel 100 or the rhombus shapes of the inclined portions 185*h*, 185I of the passivation layer on the plan view. The sizes of the rhombus cutout patterns 276*h*, 276*l* may be various according to an exemplary embodiment. If the sizes are too small, a role as the liquid crystal control means is slight, and if the sizes are too large, transmittance deteriorates, and as a result, the rhombus cutout patterns 276*h*, 276*l* may be formed with appropriate sizes according to an exemplary embodiment. According to the rhombus cutout patterns 276*h*, 276*l* which are the additional liquid crystal control means, the cutouts 275*h*, 275*l* positioned at the common electrode 270 extend only in the vertical or horizontal direction, and as a result, the liquid crystal control force of a direction of 45 degrees with the direction may deteriorate. Accordingly, the liquid crystal control force of the direction of 45 degrees is improved by forming an additional rhombus-shaped liquid crystal control means (rhombus cutout patterns 276h, 276l), and as a result, the liquid crystal molecules are rapidly aligned by the electric field and thus the response speed is improved.

An alignment layer (not illustrated) is formed at inner sides of the lower panel 100 and the upper panel. The alignment layer may be a vertical alignment layer and may be an alignment layer photo-aligned by using a photopolymerization material.

Polarizers (not illustrated) are provided on outer sides of the two panels 100, 200, and transmissive axes of the two polarizers are perpendicular to each other and one transmissive axis thereof may be parallel to the gate line 121.

The liquid crystal layer 3 has negative dielectric anisotropy between the lower panel 100 and the upper panel 200, and the liquid crystal molecules of the liquid crystal layer 3 are aligned so that long axes are vertical to the surfaces of the two panels 100, 200 while an electric field is not applied.

A polymer polymerized by light such as ultraviolet light is not included in the liquid crystal layer 3 according to the exemplary embodiment of FIG. 26. However, according to an exemplary embodiment, a polymer polymerized by light such as ultraviolet light may be further included. This will be described with reference to FIG. 34.

Hereinafter, referring to FIGS. 27 and 28, after two subpixels receive the same data voltage from respective transistors Qa, Qb, respectively, an electric charge of the second subpixel electrode (191l of FIG. 28) flows into the auxiliary capacitor Cas by a third switching element Qc and thus the voltage of the second liquid crystal capacitor Clcb drops.

Hereinafter, a liquid crystal display device according to the exemplary embodiment of the present invention will be described below in detail with reference to FIGS. 27 and 28.

Figure 27:
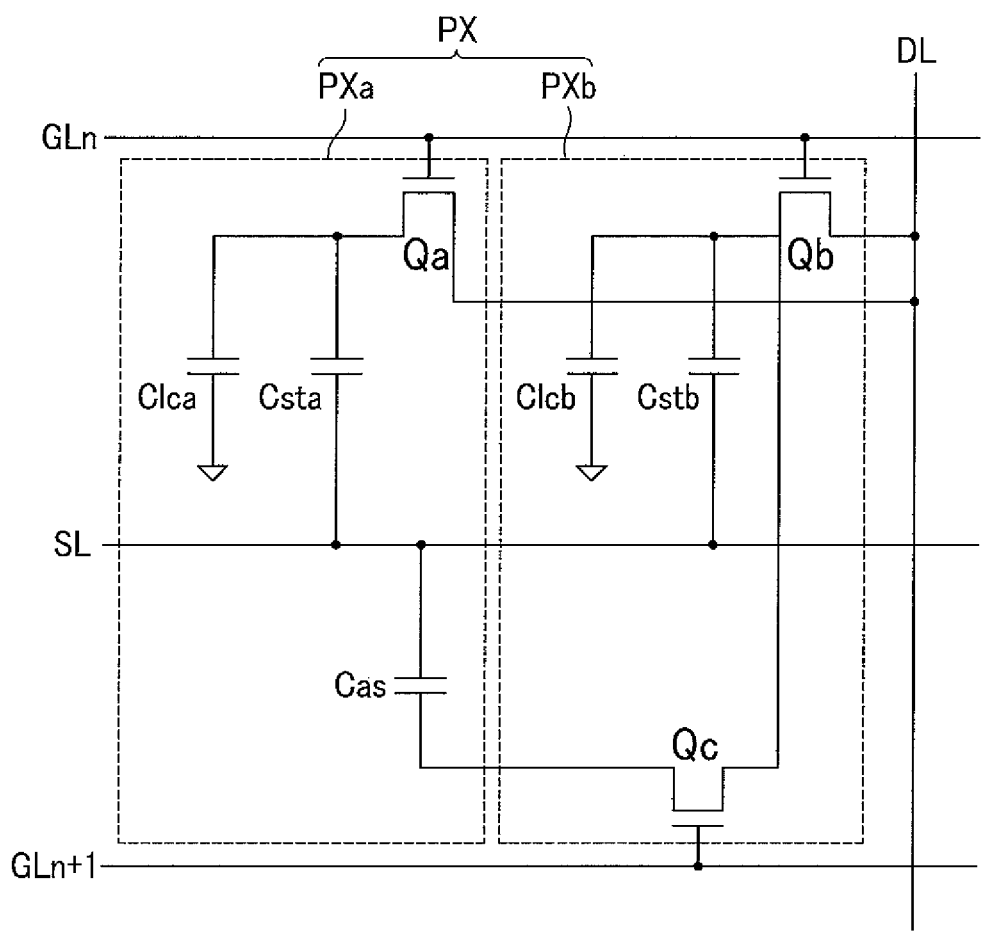
Figure 28:
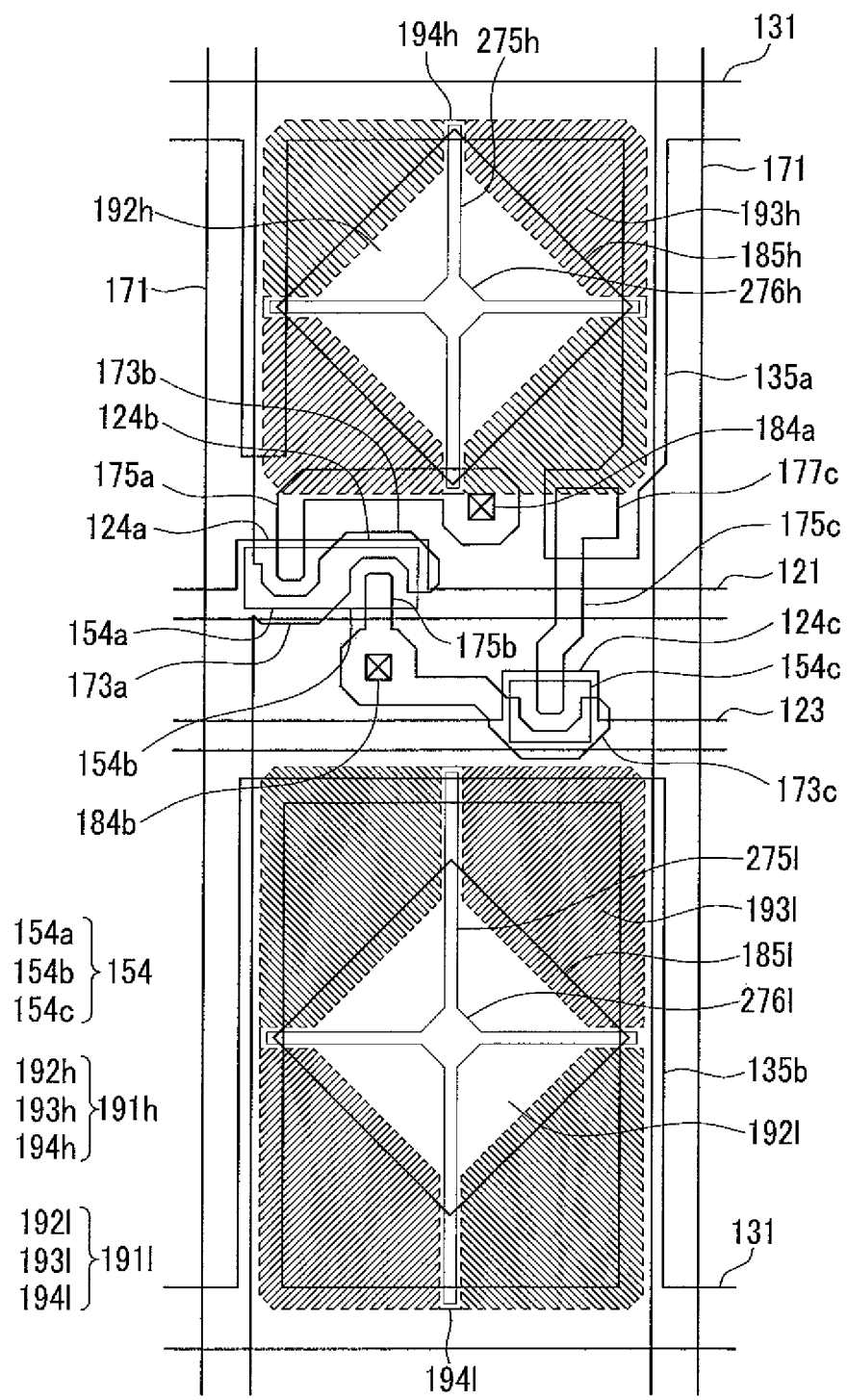

FIG. 27 is an equivalent circuit diagram of one pixel of the liquid crystal display device according to the exemplary embodiment of the present invention, and FIG. 28 is a layout view of a lower panel of the liquid crystal display device according to the exemplary embodiment of the present invention.

The liquid crystal display device according to the exemplary embodiment of the present invention includes signal lines including a plurality of gate lines GLn, GLn+1, a plurality of data lines DL, and a plurality of storage electrode lines SL, and a plurality of pixels PX connected thereto. Each pixel PX includes a pair of first and second subpixels PXa, PXb, and a first subpixel electrode (191h of FIG. 28) is formed in the first subpixel PXa and a second subpixel electrode (191I of FIG. 28) is formed in the second subpixel PXb.

The liquid crystal display device according to the exemplary embodiment of the present invention further includes a first switching element Qa and a second switching element Qb connected to the gate line GLn and the data line DL, a first liquid crystal capacitor Clca and a first storage capacitor Csta which are connected to the first switching element Qa to be formed in the first subpixel PXa, a second liquid crystal capacitor Clcb and a second storage capacitor Cstb which are connected to the second switching element Qb to be formed in the second subpixel PXb, a third switching element Qc that is connected with the second switching element Qb and switched by the next gate line GLn+1, and an auxiliary capacitor Cas connected with the third switching element Qc.

The first switching element Qa and the second switching element Qb are three-terminal elements such as a thin film transistor provided in the lower panel 100, and a control terminal thereof is connected to the gate line GLn, an input terminal is connected to the data line DL, and an output terminal is connected to the first liquid crystal capacitor Clca and the first storage capacitor Csta, and the second liquid crystal capacitor Clcb and the second storage capacitor Cstb, respectively.

The third switching element Qc is also a three-terminal element such as a thin film transistor provided in the lower panel 100, and a control terminal thereof is connected to the next gate line GLn+1, an input terminal is connected to the second liquid crystal capacitor Clcb, and an output terminal is connected to the auxiliary capacitor Cas.

One terminal of the auxiliary capacitor Cas is connected to an output terminal of the third switching element Qc, and the other terminal thereof is connected to the storage electrode line SL.

When describing an operation of the liquid crystal display device according to the exemplary embodiment of the present invention, when a gate-on voltage is applied to the gate line GLn, the first switching element and the second switching elements Qa and Qb which are connected to the gate line GLn are turned on, and a data voltage of the data lien 171 is applied to the first and second subpixel electrodes (191h, 191l of FIG. 28).

Next, when a gate-off voltage is applied to the gate line GLn and the gate-on voltage is applied to the next gate lineGLn+1, the first and second switching elements Qa, Qb are turned off and the third switching element Qc is turned on. As a result, an electric charge of the second subpixel electrode (191l of FIG. 28) connected with an output terminal of the second switching element Qb flows into the auxiliary capacitor Cas and thus the voltage of the second liquid crystal capacitor Clcb drops.

As such, the charged voltages of the first and second liquid crystal capacitors Clca, Clcb are different from each other, thereby improving side visibility of the liquid crystal display device.

In the structure of the liquid crystal display device according to the exemplary embodiment of the present invention, as illustrated in FIG. 28, a plurality of gate conductors including a plurality of first gate lines 121, a plurality of step-down gate lines 123, and a plurality of storage electrode lines 131 is formed on an insulation substrate (not illustrated) made of transparent glass or plastic.

The first gate lines 121 and the step-down gate lines 123 mainly extend in a horizontal direction to transfer gate signals. The first gate line 121 includes a first gate electrode 124a and a second gate electrode 124b protruding upwards, and the step-down gate line 123 includes a third gate electrode 124c protruding upwards. The first gate electrode 124a and the second gate electrode 124b are connected with each other to form one protrusion.

The storage electrode line 131 mainly extends in a horizontal direction to transfer a predetermined voltage such as a common voltage. The storage electrode line 131 includes storage electrodes 135a, 135b which expand upwards and downwards. In this case, shapes and layouts of the storage electrode line 131 and the storage electrodes 135a, 135b may be varied.

A gate insulating layer (not illustrated) is formed on the gate conductors 121, 123, 131.

A plurality of island-shaped semiconductors 154 is formed on the gate insulating layer 140. The semiconductors 154 include a first semiconductor 154a positioned on the first gate electrode 124a, a second semiconductor 154b positioned on the second gate electrode 124b, and a third semiconductor 154c positioned on the third gate electrode 124c. The first semiconductor 154a and the second semiconductor 154b may be connected with each other.

Data conductors including a plurality of data lines 171, a first drain electrode 175a, a second drain electrode 175b, a third source electrode 173c, and a third drain electrode 175c are formed on the semiconductors 154 and the gate insulating layer.

The data lines 171 transfer data signals and mainly extend in a vertical direction to cross the first gate lines 121 and the step-down gate lines 123. Each data line 171 includes a first source electrode 173a and a second source electrode 173b which extend toward the first gate electrode 124a and the second gate electrode 124b. The first source electrode 173a and the second source electrode 173b are connected with each other.

The first drain electrode 175a, the second drain electrode 175b, and the third drain electrode 175c include one wide end portion and the other rod-shaped end portion, respectively. The rod-shaped end portions of the first drain electrode 175a and the second drain electrode 175b are partially surrounded by the first source electrode 173a and the second source electrode 173b, respectively, and the third drain electrode 175c is also partially surrounded by the third source electrode 173c. One wide end portion of the second drain electrode 175b is connected with the third source electrode 173c. A wide end portion 177c of the third drain electrode 175c is partially overlapped with an expansion 137a of the storage electrode line 131 to form an auxiliary capacitor Cas.

The first, second, third gate electrodes 124a, 124b, 124c, the first, second, third source electrodes 173a, 173b, 173c, and the first, second, third drain electrodes 175a, 175b, 175c form first, second, third thin film transistors (TFTs) (Qa, Ql, Qc of FIG. 5) together with the first, second, third semiconductors 154a, 154b, 154c, respectively, and channels of the thin film transistors are formed in the respective semiconductors 154a, 154b, 154c between the respective source electrodes 173a, 173b, 173c and the respective drain electrodes 175a, 175b, 175c.

A passivation layer (not illustrated) is formed on the data conductors 171, 175a, 175b, 175c and the exposed portions of the semiconductors 154a, 154b, 154c. The passivation layer is made of an organic insulator or the like and includes inclined portions 185h, 185l. The surface of the passivation layer except for the inclined portions 185h, 185l is flat. In the exemplary embodiment of FIG. 28, the inclined portions 185h, 185I are formed on the passivation layer, which is different from the exemplary embodiment in which the inclined portions are formed on the color filter 230 of FIG. 1.

The inclined portions 185h, 185I are positioned in a partial region of a portion overlapped with the first and second subpixel electrodes 191h, 191l and have a structure in which heights thereof are changed. The inclined portions 185h, 185I have rhombus structures as illustrated in FIG. 28. The rhombus structure of the first inclined portion 185h may be formed so that a vertex is in contact with a boundary of a quadrangular region occupied by a first partial plate electrode 192h, and according to an exemplary embodiment, the vertex may not be in contact with the boundary. Further, the rhombus structure of the second inclined portion 185I may be formed so that a vertex is in contact with a boundary of a quadrangular region occupied by a second partial plate electrode 192I, and according to an exemplary embodiment, the vertex may not be in contact with the boundary. Further, according to an exemplary embodiment, the region in which the rhombus structure is positioned may also have a square or rectangular region. The inclined portions 185h, 185l have structures in which heights are gradually decreased toward the center from a side of the rhombus structure. The inclined portions 185h, 185l have structures in which the heights are decreased at a predetermined slope from one side to the center, and as the heights are decreased, the widths are decreased. An organic insulator may not be formed at the centers of the inclined portions 185h, 185l having the rhombus structures, and according to an exemplary embodiment, an opening in which the organic insulator is not formed may be included in a predetermined region near the center.

A color filter may be formed below the passivation layer, and the color filter may be positioned on the upper panel. Further, unlike FIG. 28, the inclined portions as illustrated in FIG. 1 may be positioned at the color filter positioned below the passivation layer. In this case, the inclined portions may not be formed at the passivation layer.

A plurality of pixel electrodes 191 is formed on the passivation layer. Each pixel electrode 191 includes a first subpixel electrode 191h and a second subpixel electrode 191l which are formed at a predetermined distance.

The first subpixel electrode 191h and the second subpixel electrode 191l include partial plate electrodes 192h, 192l positioned at the centers thereof, extensions 194h, 194l extending from the partial plate electrodes 192h, 192l in a vertical or horizontal direction, and a plurality of minute branch electrodes 193h, 193l protruding from the partial plate electrodes 192h, 192l and the extensions 194h, 194l in an oblique direction, respectively.

The first subpixel electrode 191h includes the first partial plate electrode 192h and the plurality of first minute branch electrodes 193h, and is connected with a wide end portion of the drain electrode 175 by a connecting portion extended outside the quadrangular region.

The first partial plate electrode 192h has a rhombus shape, a center thereof is positioned at the center of the quadrangular region, and each vertex of the rhombus shape is formed at a predetermined distance from a boundary of the quadrangular region. Further, the first partial plate electrode 192h covers a part from the center of the first inclined portion 185h of the passivation layer. As a result, the first partial plate electrode 192h has an inclination provided by the first inclined portion 185h of the passivation layer as it is.

The first subpixel electrode 191h has a first extension 194h extending from each vertex of the rhombus shape of the first partial plate electrode 192h in a vertical or horizontal direction (in a parallel or vertical direction to the gate line 121 or the data line 171). The first extension 194h extends in the vertical or horizontal direction to meet a boundary of the quadrangular region occupied by the first subpixel electrode 191h. As a result, the first extension 194h meets the vertex of the rhombus structure of the first inclined portion 185h of the passivation layer on the plan view so as to be vertically overlapped with each other.

The plurality of first minute branch electrodes 193h extends from the oblique side of the first partial plate electrode 192h and the first extension 194h. The plurality of first minute branch electrodes 193h fills the rest of the quadrangular region, forms an angle of 45 degrees with the first extension 194h (or the gate line 121 or the data line 171), and forms an angle of 90 degrees with the oblique side of the first partial plate electrode 192h. Further, ends of the first minute branch electrodes 193h are not connected to each other to protrude outwards. However, if the ends of the first minute branch electrodes 193h are connected to each other to be closed, directions of liquid crystal molecules of the liquid crystal layer 3 to be aligned by an electric field are different from directions of the liquid crystal molecules to be aligned by the closed ends, and as a result, a response speed of the liquid crystal molecules may be delayed. Therefore, in the exemplary embodiment of the present invention, the ends of the first minute branch electrodes 193h are not connected to each other but protrude outwards to have a structure in which opening regions between the first minute branch electrodes 193h are opened. As a result, the liquid crystal molecules may be aligned in the directions to be aligned by the electric field without other resistance, thereby improving the response speed of the liquid crystal molecules and reducing textures.

Further, a connecting terminal connected with the oblique side of the first partial plate electrode 192h and the first extension 194h is positioned above the first inclined portion 185h of the passivation layer to be overlapped with the first inclined portion 185h of the passivation layer in the plurality of first minute branch electrodes 193h. That is, the connecting terminal of the first minute branch electrode 193h is overlapped with the first inclined portion 185h of the passivation layer by a predetermined distance. Therefore, the vicinity of the connecting terminal of the first minute branch electrode 193h has the inclination provided by the first inclined portion 185h of the passivation layer as it is, and a flat structure is formed up to the end from the vicinity of the connecting terminal. The end portion of the first minute branch electrode 193h and the first inclined portion 185h of the passivation layer overlap each other and thus liquid crystal control force of the corresponding portion is further increased, and as a result, the liquid crystal molecules may rapidly operate by the electric field. As a result, the response speed of the liquid crystal molecules is improved. However, when a length of the first minute branch electrode 193h is overly increased and thus an overlapped distance is too large, a texture due to a slit structure may occur, and as a result, the overlapped distance needs to be set at a predetermined level or less. In the exemplary embodiment, the longest electrode of the first minute branch electrodes 193h may have a length of more than 50 μm and 68 μm or less, and a size of the pixel is determined according to a characteristic of the display device. When a size of the quadrangular region is determined according to the size of the pixel, the length of the longest electrode of the first minute branch electrodes 193h may be selected and used in the range of more than 50 μm and 68 μm or less. However, according to an exemplary embodiment, an exemplary embodiment beyond the above range may also exist. The length of the longest electrode of the first minute branch electrodes 193h may have a value of between 25% and 35% of an oblique length of the entire quadrangular region, and a length of the longest electrode of the first minute branch electrodes 193h that is overlapped with the first inclined portion 185h may have a value of between 0% and 10% of the oblique length of the entire quadrangular region.

The second partial plate electrode 192l of the second subpixel electrode 191I has a rhombus shape, a center thereof is positioned at the center of the quadrangular region, and each vertex of the rhombus shape is formed at a predetermined distance from a boundary of the quadrangular region. Further, the second partial plate electrode 192l covers a part from the center of the second inclined portion 185I of the passivation layer. As a result, the second partial plate electrode 192l has an inclination provided by the second inclined portion 185I of the passivation layer as it is.

The second subpixel electrode 191I has a second extension 194l extending from each vertex of the rhombus shape of the second partial plate electrode 192l in a vertical or horizontal direction (in a parallel or vertical direction to the gate line 121 or the data line 171). The second extension 194l extends in the vertical or horizontal direction to meet a boundary of the two-divided square regions. As a result, the second extension 194l meets the vertex of the rhombus structure of the second inclined portion 185I of the passivation layer on the plan view so as to be vertically overlapped with each other.

The plurality of second minute branch electrodes 193I extends from an oblique side of the second partial plate electrode 192l and the second extension 194l. The plurality of second minute branch electrodes 193I fills the rest of the quadrangular region, forms an angle of 45 degrees with the second extension 194l (or the gate line 121 or the data line 171), and forms an angle of 90 degrees with the oblique side of the second partial plate electrode 192l. Further, ends of the second minute branch electrodes 193I are not connected to each other to protrude outwards. However, if the ends of the second minute branch electrodes 193I are connected to each other to be closed, directions of liquid crystal molecules of the liquid crystal layer 3 to be aligned by an electric field are different from directions of the liquid crystal molecules to be aligned by the closed ends, and as a result, a response speed of the liquid crystal molecules may be delayed. Therefore, in the exemplary embodiment of the present invention, the ends of the second minute branch electrodes 193I are not connected to each other but protrude outwards to have a structure in which opening regions between the second minute branch electrodes 193I are opened. As a result, the liquid crystal molecules may be aligned in the directions to be aligned by the electric field without other resistance, thereby improving the response speed of the liquid crystal molecules and reducing textures.

Further, a connecting terminal connected with the oblique side of the second partial plate electrode 192I and the second extension 194I is positioned above the second inclined portion 185I of the passivation layer to be overlapped with each other in the plurality of second minute branch electrodes 193I. That is, the connecting terminal of the second minute branch electrode 193I is overlapped with the second inclined portion 185I of the passivation layer by a predetermined distance. Therefore, the vicinity of the connecting terminal of the second minute branch electrode 193I has the inclination provided by the second inclined portion 185I of the passivation layer as it is, and a flat structure is formed up to the end from the vicinity of the connecting terminal. The end portion of the second minute branch electrode 193I and the second inclined portion 185I of the passivation layer overlap each other and thus liquid crystal control force of the corresponding portion is further increased, and as a result, the liquid crystal molecules may rapidly operate by the electric field. As a result, the response speed of the liquid crystal molecules is improved. However, when lengths of the second minute branch electrodes 193I are overly increased and thus overlapped distances are too large, a texture due to a slit structure may occur, and as a result, the overlapped distances need to be set at a predetermined level or less. In the exemplary embodiment, the longest electrode of the second minute branch electrodes 193I may have a length of more than 50 μm and 68 μm or less, and a size of the pixel is determined according to a characteristic of the display device. When a size of the square region is determined according to the size of the pixel, the length of the longest electrode of the second minute branch electrodes 193I may be selected and used in the range of more than 50 μm and 68 μm or less. However, according to an exemplary embodiment, an exemplary embodiment beyond the above range may also exist. The length of the longest electrode of the second minute branch electrodes 193I may have a value of between 25% and 35% of an oblique length of the entire square region, and a length of the longest electrode of the second minute branch electrodes 193I that is overlapped with the second inclined portion 185I may have a value of between 0% and 10% of the oblique length of the entire square region.

A light blocking member and a common electrode may be formed on the upper panel 200. A color filter may be formed on the upper panel 200.

The common electrode formed on the upper panel 200 is made of a transparent conductive material and may include a liquid crystal control means and an additional liquid crystal control means.

Cutouts 275h, 275l as the liquid crystal control means are formed in a cross shape at the common electrode 270. A cross point in the cross structure of the first cutout 275h is overlapped with the center of the rhombus shape of the first partial plate electrode 192h of the lower panel 100 or the center of the rhombus shape of the first inclined portion 185h of the passivation layer. Further, the cross structure of the second cutout 275I is overlapped with the center of the rhombus shape of the second partial plate electrode 192I of the lower panel 100 or the center of the rhombus shape of the second inclined portion 185I of the passivation layer, respectively. Further, the cutouts 275h, 275l positioned at the adjacent pixels extend to be connected with each other. The cutouts 275h, 275l serve to improve the control force of the liquid crystal molecules.

Further, the additional liquid crystal control means is positioned near the cross point of the cross structure of the cutouts 275h, 275l in the common electrode 270. In the exemplary embodiment of FIG. 28, rhombus cutout patterns 276h, 276l are formed as the additional liquid crystal control means. The rhombus cutout patterns 276h, 276l have sides which are parallel to the rhombus shapes of the partial plate electrodes 192h, 192I of the lower panel 100 or the rhombus shapes of the second inclined portions 185h, 185I of the passivation layer on the plan view. The sizes of the rhombus cutout patterns 276h, 276l may be various according to an exemplary embodiment. If the sizes are too small, a role as the liquid crystal control means is slight, and if the sizes are too large, transmittance deteriorates, and as a result, the rhombus cutout patterns 276h, 276l may be formed with appropriate sizes according to an exemplary embodiment. According to the rhombus cutout patterns 276h, 276l which are the additional liquid crystal control means, the cutouts 275h, 275l positioned at the common electrode 270 extend only in the vertical or horizontal direction, and as a result, the liquid crystal control force of a direction of 45 degrees with the direction may deteriorate. Accordingly, the liquid crystal control force of the direction of 45 degrees is improved by forming an additional rhombus-shaped liquid crystal control means (rhombus cutout patterns 276h, 276l), and as a result, the liquid crystal molecules are rapidly aligned by the electric field and thus the response speed is improved.

An alignment layer (not illustrated) is formed at inner sides of the lower panel 100 and the upper panel 200. The alignment layer may be a vertical alignment layer and may be an alignment layer photo-aligned by using a photopolymerization material.

Polarizers (not illustrated) are provided on outer sides of the two panels 100, 200, and transmissive axes of the two polarizers are perpendicular to each other and one transmissive axis thereof may be parallel to the gate line 121.

The liquid crystal layer 3 has negative dielectric anisotropy between the lower panel 100 and the upper panel 200, and the liquid crystal molecules of the liquid crystal layer 3 are aligned so that long axes are vertical to the surfaces of the two panels 100, 200 while an electric field is not applied.

A polymer polymerized by light such as ultraviolet light is not included in the liquid crystal layer 3 according to the exemplary embodiment of FIG. 28. However, according to an exemplary embodiment, a polymer polymerized by light such as ultraviolet light may be further included. This will be described with reference to FIG. 34.

The first and second subpixel electrodes 191h, 191l form first and second liquid crystal capacitors (Clca, Clcb of FIG. 27) together with the common electrode of the upper panel and the liquid crystal layer therebetween to maintain the applied voltage even after the first and second thin film transistors (Qa, Qb of FIG. 27) are turned off.

The first and second subpixel electrodes 191h, 191l are overlapped with the storage electrodes 135a, 135b to form the first and second storage capacitors Csta, Cstb, and reinforce voltage maintaining capacity of the first and second liquid crystal capacitors Clca, Clcb.

Hereinafter, a structure in which two subpixels receive different data voltages from respective transistors Qa, Qb, respectively will be described with reference to FIGS. 29 and 30.

Figure 29:
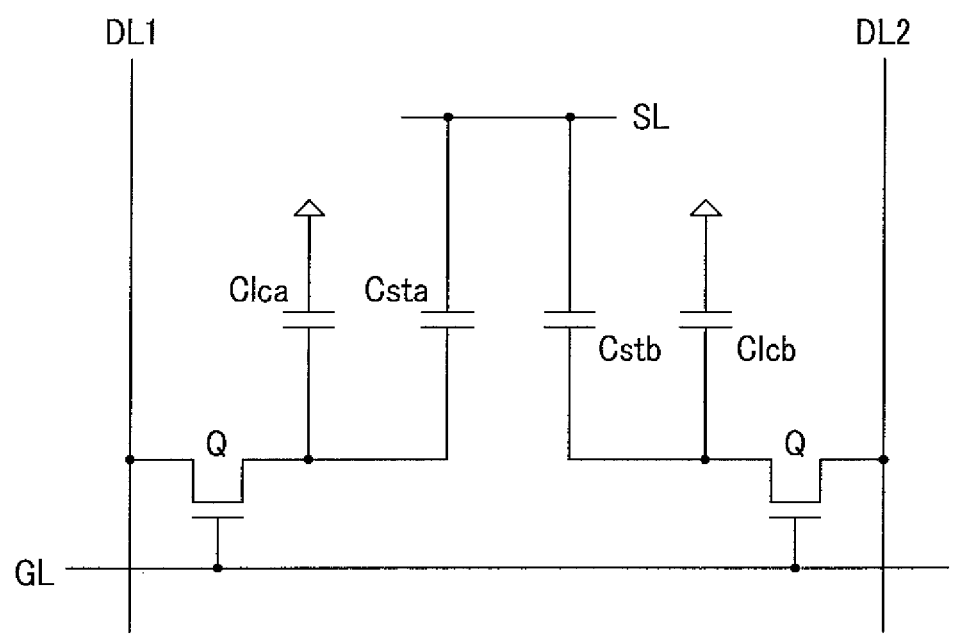
Figure 30:
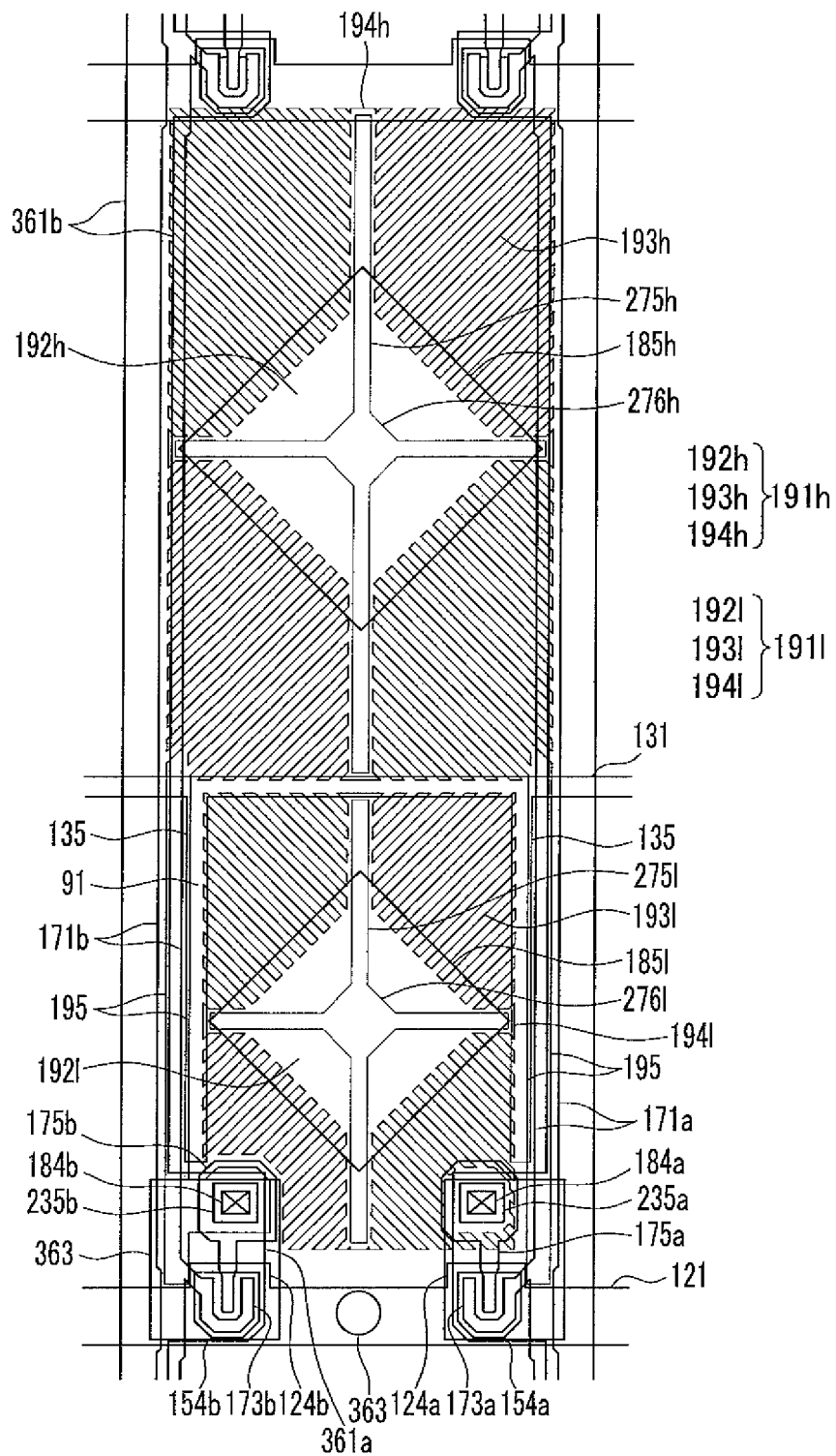

FIG. 29 is an equivalent circuit diagram of one pixel of the liquid crystal display device according to an exemplary embodiment of the present invention, and FIG. 30 is a layout view of a lower panel of the liquid crystal display device according to the exemplary embodiment of the present invention.

Referring to FIGS. 29 and 30, a liquid crystal display device according to an exemplary embodiment of the present invention includes a lower panel 100 and an upper panel 200 facing each other, and a liquid crystal layer 3 interposed between the two panels 100, 200.

First, the lower panel 100 will be described.

A plurality of gate lines 121 and a plurality of storage electrode lines 131, 135 are formed on an insulation substrate 110.

The gate lines 121 transfer gate signals and extend mainly in a horizontal direction. Each gate line 121 includes a plurality of first and second gate electrodes 124a, 124b protruding upwards.

The storage electrode line includes a stem 131 extending to be substantially parallel to the gate line 121 and a plurality of storage electrodes 135 extending from the stem 131.

Shapes and layouts of the storage electrode lines 131, 135 may be varied.

A gate insulating layer 140 is formed on the gate line 121 and the storage electrode lines 131, 135, and a plurality of semiconductors 154a, 154b made of amorphous or crystalline silicon is formed on the gate insulating layer 140.

A plurality of pairs of ohmic contacts is formed on the semiconductors 154a, 154b, and the ohmic contacts may be made of silicide or a material such as n+ hydrogenated amorphous silicon in which n-type impurity is doped at high concentration.

A plurality of pairs of data lines 171a, 171b and a plurality of pairs of first and second drain electrodes 175a, 175b are formed on the ohmic contacts and the gate insulating layer 140.

The data lines 171a, 171b transfer data signals and mainly extend in a vertical direction to cross the gate lines 121 and the stems of the storage electrode lines 131. The data lines 171a, 171b include first and second source electrodes 173a, 173b which extend toward the first and second gate electrodes 124a, 124b to be curved in a U-lettered form, and the first and second source electrodes 173a, 173b face the first and second drain electrodes 175a, 175b based upon the first and second gate electrodes 124a, 124b.

The first and second drain electrodes 175a, 175b extend upwards from ends which are partially surrounded by the first and second source electrodes 173a, 173b, respectively, and the opposite ends may have a wide area for connection with other layers.

However, shapes and layouts of the data lines 171a, 171b in addition to the first and second drain electrodes 175a, 175b may be varied.

The first and second gate electrodes 124a, 124b, the first and second source electrodes 173a, 173b, and the first and second drain electrodes 175a, 175b form first and second thin film transistors (TFTs) Qa, Qb together with the first and second semiconductors 154a, 154b, respectively, and channels of the first and second thin film transistors Qa, Qb are formed in the first and second semiconductors 154a, 154b between the first and second source electrodes 173a, 173b and the first and second drain electrodes 175a, 175b.

The ohmic contacts exist only among the semiconductors 154a, 154b therebelow, the data lines 171a, 171b thereabove, and the drain electrodes 175a, 175b to lower contact resistance therebetween. Exposed portions which are not covered by the data lines 171a, 171b and the drain electrodes 175a, 175b in addition to a space between the source electrodes 173a, 173b, and the drain electrodes 175a, 175b are present at the semiconductors 154a, 154b.

A passivation layer (not illustrated) is formed on the data lines 171a, 171b, the drain electrodes 175a, 175b, and the exposed portions of the semiconductors 154a, 154b. The passivation layer is made of an organic insulator or the like and includes inclined portions 185h, 185l. The surface of the passivation layer except for the inclined portions 185h, 185l is flat. In the exemplary embodiment of FIG. 30, the inclined portions 185h, 185I are formed on the passivation layer, which is different from the exemplary embodiment in which the inclined portions are formed on the color filter 230 of FIG. 1.

The inclined portions 185h, 185I are positioned in a partial region of a portion overlapped with the first and second subpixel electrodes 191h, 191l and have a structure in which heights thereof are changed. The inclined portions 185h, 185I have rhombus structures as illustrated in FIG. 30. The rhombus structure of the first inclined portion 185h may be formed so that a vertex is in contact with a boundary of a quadrangular region occupied by the first partial plate electrode 192h, and according to an exemplary embodiment, the vertex may not be in contact with the boundary. Further, the rhombus structure of the second inclined portion 185I may be formed so that a vertex is in contact with a boundary of a quadrangular region occupied by the second partial plate electrode 192I, and according to an exemplary embodiment, the vertex may not be in contact with the boundary. Further, according to an exemplary embodiment, the region in which the rhombus structure is positioned may also have a square or rectangular region. The inclined portions 185h, 185l have structures in which heights are gradually decreased toward the center from a side of the rhombus structure. The inclined portions 185h, 185l have structures in which the heights are decreased at a predetermined slope from one side to the center, and as the heights are decreased, the widths are decreased. An organic insulator may not be formed at the centers of the inclined portions 185h, 185l having the rhombus structures, and according to an exemplary embodiment, an opening in which the organic insulator is not formed may be included in a predetermined region near the center.

A color filter may be formed below the passivation layer, and the color filter may be positioned on the upper panel. Further, unlike FIG. 30, the inclined portions as illustrated in FIG. 1 may be positioned at the color filter positioned below the passivation layer. In this case, the inclined portions may not be formed at the passivation layer.

A plurality of pixel electrodes 191 is formed on the passivation layer. Each pixel electrode 191 includes a first subpixel electrode 191h and a second subpixel electrode 191l which are formed at a predetermined distance.

The first subpixel electrode 191h and the second subpixel electrode 191l include partial plate electrodes 192h, 192l positioned at the centers thereof, extensions 194h, 194l extending from the partial plate electrodes 192h, 192l in a vertical or horizontal direction, and a plurality of minute branch electrodes 193h, 193l protruding from the partial plate electrodes 192h, 192l and the extensions 194h, 194l in an oblique direction, respectively.

The first subpixel electrode 191h includes the first partial plate electrode 192h and the plurality of first minute branch electrodes 193h, and is connected with a wide end portion of the drain electrode 175 by a connecting portion extended outside the quadrangular region.

The first partial plate electrode 192h has a rhombus shape, a center thereof is positioned at the center of the quadrangular region, and each vertex of the rhombus shape is formed at a predetermined distance from a boundary of the quadrangular region. Further, the first partial plate electrode 192h covers a part from the center of the first inclined portion 185h of the passivation layer. As a result, the first partial plate electrode 192h has an inclination provided by the first inclined portion 185h of the passivation layer as it is.

The first subpixel electrode 191h has a first extension 194h extending from each vertex of the rhombus shape of the first partial plate electrode 192h in a vertical or horizontal direction (in a parallel or vertical direction to the gate line 121 or the data line 171). The first extension 194h extends in the vertical or horizontal direction to meet a boundary of the quadrangular region occupied by the first subpixel electrode 191h. As a result, the first extension 194h meets the vertex of the rhombus structure of the first inclined portion 185h of the passivation layer on the plan view so as to be vertically overlapped with each other.

The plurality of first minute branch electrodes 193h extends from the oblique side of the first partial plate electrode 192h and the first extension 194h. The plurality of first minute branch electrodes 193h fills the rest of the quadrangular region, forms an angle of 45 degrees with the first extension 194h (or the gate line 121 or the data line 171), and forms an angle of 90 degrees with the oblique side of the first partial plate electrode 192h. Further, ends of the first minute branch electrodes 193h are not connected to each other to protrude outwards. However, if the ends of the first minute branch electrodes 193h are connected to each other to be closed, directions of liquid crystal molecules of the liquid crystal layer 3 to be aligned by an electric field are different from directions of the liquid crystal molecules to be aligned by the closed ends, and as a result, a response speed of the liquid crystal molecules may be delayed. Therefore, in the exemplary embodiment of the present invention, the ends of the first minute branch electrodes 193h are not connected to each other but protrude outwards to have a structure in which opening regions between the first minute branch electrodes 193h are opened. As a result, the liquid crystal molecules may be aligned in the directions to be aligned by the electric field without other resistance, thereby improving the response speed of the liquid crystal molecules and reducing textures.

Further, a connecting terminal connected with the oblique side of the first partial plate electrode 192h and the first extension 194h is positioned above the first inclined portion 185h of the passivation layer to be overlapped with each other in the plurality of first minute branch electrodes 193*h*. That is, the connecting terminal of the first minute branch electrode 193*h* is overlapped with the first inclined portion 185*h* of the passivation layer by a predetermined distance. Therefore, the vicinity of the connecting terminal of the first minute branch electrode 193*h* has the inclination provided by the first inclined portion 185*h* of the passivation layer as it is, and a flat structure is formed up to the end from the vicinity of the connecting terminal. The end portion of the first minute branch electrode 193*h* and the first inclined portion 185*h* of the passivation layer overlap each other and thus liquid crystal control force of the corresponding portion is further increased, and as a result, the liquid crystal molecules may rapidly operate by the electric field. As a result, the response speed of the liquid crystal molecules is improved. However, when a length of the first minute branch electrode 193*h* is overly increased and thus an overlapped distance is too large, a texture due to a slit structure may occur, and as a result, the overlapped distance needs to be set at a predetermined level or less. In the exemplary embodiment, the longest electrode of the first minute branch electrodes 193*h* may have a length of more than 50 μm and 68 μm or less, and a size of the pixel is determined according to a characteristic of the display device. When a size of the quadrangular region is determined according to the size of the pixel, the length of the longest electrode of the first minute branch electrodes 193*h* may be selected and used in the range of more than 50 μm and 68 μm or less. However, according to an exemplary embodiment, an exemplary embodiment beyond the above range may also exist. The length of the longest electrode of the first minute branch electrodes 193*h* may have a value of between 25% and 35% of an oblique length of the entire quadrangular region, and a length of the longest electrode of the first minute branch electrodes 193*h* that is overlapped with the first inclined portion 185*h* may have a value of between 0% and 10% of the oblique length of the entire quadrangular region.

The second partial plate electrode 192*l* of the second subpixel electrode 191I has a rhombus shape, a center thereof is positioned at the center of the quadrangular region, and each vertex of the rhombus shape is formed at a predetermined distance from a boundary of the quadrangular region. Further, the second partial plate electrode 192*l* covers a part from the center of the second inclined portion 185I of the passivation layer. As a result, the second partial plate electrode 192*l* has an inclination provided by the second inclined portion 185I of the passivation layer as it is.

The second subpixel electrode 191I has a second extension 194*l* extending from each vertex of the rhombus shape of the second partial plate electrode 192*l* in a vertical or horizontal direction (in a parallel or vertical direction to the gate line 121 or the data line 171). The second extension 194*l* extends in the vertical or horizontal direction to meet a boundary of the two-divided square regions. As a result, the second extension 194*l* meets the vertex of the rhombus structure of the second inclined portion 185I of the passivation layer on the plan view so as to be vertically overlapped with each other.

The plurality of second minute branch electrodes 193I extends from an oblique side of the second partial plate electrode 192*l* and the second extension 194*l*. The plurality of second minute branch electrodes 193I fills the rest of the quadrangular region, forms an angle of 45 degrees with the second extension 194*l* (or the gate line 121 or the data line 171), and forms an angle of 90 degrees with the oblique side of the second partial plate electrode 192*l*. Further, ends of the second minute branch electrodes 193I are not connected to each other to protrude outwards. However, if the ends of the second minute branch electrodes 193I are connected to each other to be closed, directions of liquid crystal molecules of the liquid crystal layer 3 to be aligned by an electric field are different from directions of the liquid crystal molecules to be aligned by the closed ends, and as a result, a response speed of the liquid crystal molecules may be delayed. Therefore, in the exemplary embodiment of the present invention, the ends of the second minute branch electrodes 193I are not connected to each other but protrude outwards to have a structure in which opening regions between the second minute branch electrodes 193I are opened. As a result, the liquid crystal molecules may be aligned in the directions to be aligned by the electric field without other resistance, thereby improving the response speed of the liquid crystal molecules and reducing textures.

Further, a connecting terminal connected with the oblique side of the second partial plate electrode 192I and the second extension 194I is positioned above the second inclined portion 185I of the passivation layer to be overlapped with the second inclined portion 185I of the passivation layer in the plurality of second minute branch electrodes 193I. That is, the connecting terminal of the second minute branch electrode 193I is overlapped with the second inclined portion 185I of the passivation layer by a predetermined distance. Therefore, the vicinity of the connecting terminal of the second minute branch electrode 193I has the inclination provided by the second inclined portion 185I of the passivation layer as it is, and a flat structure is formed up to the end from the vicinity of the connecting terminal. The end portion of the second minute branch electrode 193I and the second inclined portion 185I of the passivation layer overlap each other and thus liquid crystal control force of the corresponding portion is further increased, and as a result, the liquid crystal molecules may rapidly operate by the electric field. As a result, the response speed of the liquid crystal molecules is improved. However, when a length of the second minute branch electrode 193I is overly increased and thus an overlapped distance is too large, a texture due to a slit structure may occur, and as a result, the overlapped distance needs to be set at a predetermined level or less. In the exemplary embodiment, the longest electrode of the second minute branch electrodes 193I may have a length of more than 50 μm and 68 μm or less, and a size of the pixel is determined according to a characteristic of the display device. When a size of the square region is determined according to the size of the pixel, the length of the longest electrode of the second minute branch electrodes 193I may be selected and used in the range of more than 50 μm and 68 μm or less. However, according to an exemplary embodiment, an exemplary embodiment beyond the above range may also exist. The length of the longest electrode of the second minute branch electrodes 193I may have a value of between 25% and 35% of an oblique length of the entire square region, and a length of the longest electrode of the second minute branch electrodes 193I that is overlapped with the second inclined portion 185I may have a value of between 0% and 10% of the oblique length of the entire square region.

A light blocking member and a common electrode may be formed on the upper panel 200. A color filter may be formed on the upper panel 200.

The common electrode formed on the upper panel 200 is made of a transparent conductive material and may include a liquid crystal control means and an additional liquid crystal control means.

Cutouts 275*h*, 275*l* as the liquid crystal control means are formed in a cross shape at the common electrode 270. A cross point in the cross structure of the first cutout 275*h* is overlapped with the center of the rhombus shape of the first partial plate electrode 192*h* of the lower panel 100 or the center of the rhombus shape of the first inclined portion 185h of the passivation layer. Further, the cross structure of the second cutout 275l is overlapped with the center of the rhombus shape of the second partial plate electrode 192l of the lower panel 100 or the center of the rhombus shape of the second inclined portion 185l of the passivation layer, respectively. Further, the cutouts 275h, 275l positioned at the adjacent pixels may be extended to be connected with each other. The cutouts 275h, 275l serve to improve the control force of the liquid crystal molecules.

Further, the additional liquid crystal control means is positioned near the cross point of the cross structure of the cutouts 275h, 275l in the common electrode 270. In the exemplary embodiment of FIG. 30, rhombus cutout patterns 276h, 276l are formed as the additional liquid crystal control means. The rhombus cutout patterns 276h, 276l have sides which are parallel to the rhombus shapes of the partial plate electrodes 192h, 192l of the lower panel 100 or the rhombus shapes of the second inclined portions 185h, 185l of the passivation layer on the plan view. The sizes of the rhombus cutout patterns 276h, 276l may be various according to an exemplary embodiment. If the sizes are too small, a role as the liquid crystal control means is slight, and if the sizes are too large, transmittance deteriorates, and as a result, the rhombus cutout patterns 276h, 276l may be formed with appropriate sizes according to an exemplary embodiment. According to the rhombus cutout patterns 276h, 276l which are the additional liquid crystal control means, the cutouts 275h, 275l positioned at the common electrode 270 extend only in the vertical or horizontal direction, and as a result, the liquid crystal control force of a direction of 45 degrees with the direction may deteriorate. Accordingly, the liquid crystal control force of the direction of 45 degrees is improved by forming an additional rhombus-shaped liquid crystal control means (the rhombus cutout patterns 276h, 276l), and as a result, the liquid crystal molecules are rapidly aligned by the electric field and thus the response speed is improved.

An alignment layer (not illustrated) is formed at inner sides of the lower panel 100 and the upper panel 200. The alignment layer may be a vertical alignment layer and may be an alignment layer photo-aligned by using a photopolymerization material.

Polarizers (not illustrated) are provided on outer sides of the two panels 100, 200, and transmissive axes of the two polarizers are perpendicular to each other and one transmissive axis thereof may be parallel to the gate line 121.

The liquid crystal layer 3 has negative dielectric anisotropy between the lower panel 100 and the upper panel 200, and the liquid crystal molecules of the liquid crystal layer 3 are aligned so that long axes are vertical to the surfaces of the two panels 100, 200 while an electric field is not applied.

A polymer polymerized by light such as ultraviolet light is not included in the liquid crystal layer 3 according to the exemplary embodiment of FIG. 30. However, according to an exemplary embodiment, a polymer polymerized by light such as ultraviolet light may be further included. This will be described with reference to FIG. 34.

The first and second subpixel electrodes 191h, 191l form first and second liquid crystal capacitors together with the common electrode of the upper panel and the liquid crystal layer therebetween to maintain the applied voltage even after a thin film transistor (Q of FIG. 29) is turned off.

The first and second subpixel electrodes 191h, 191l are overlapped with the storage electrodes 135a, 135b to form the first and second storage capacitors Csta, Cstb, and reinforce voltage maintaining capacity of the first and second liquid crystal capacitors Clca, Clcb.

Hereinafter, a structure in which grayscales displayed by each subpixel are changed by capacitors Csa, Csb connected to a power supply line in which a voltage swings after two subpixels receive the same data voltage from transistors Qa, Qb will be described with reference to FIGS. 31 and 32.

Figure 31:
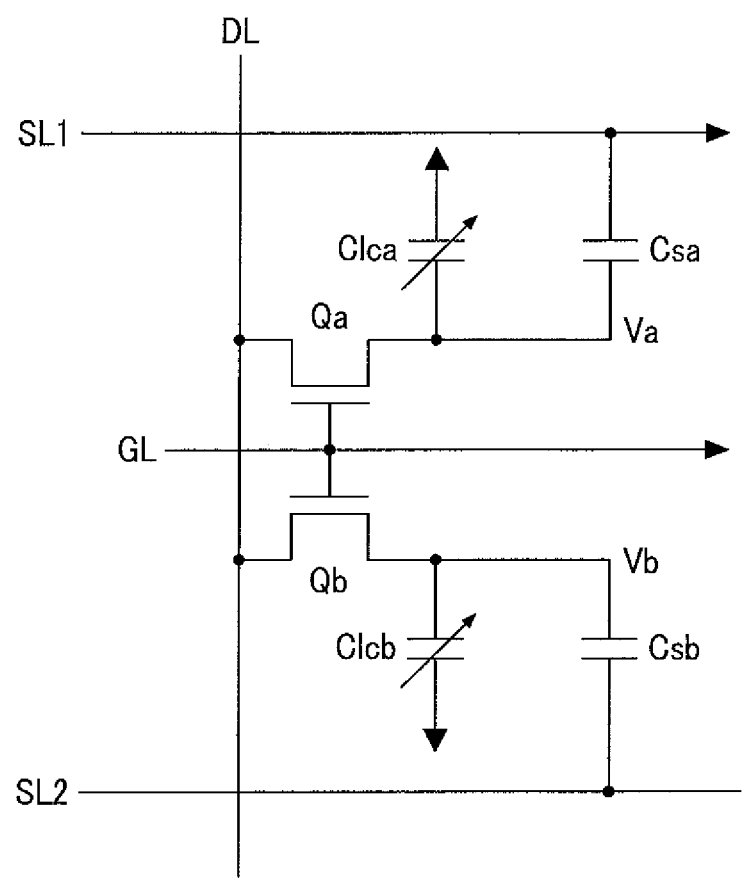
Figure 32:
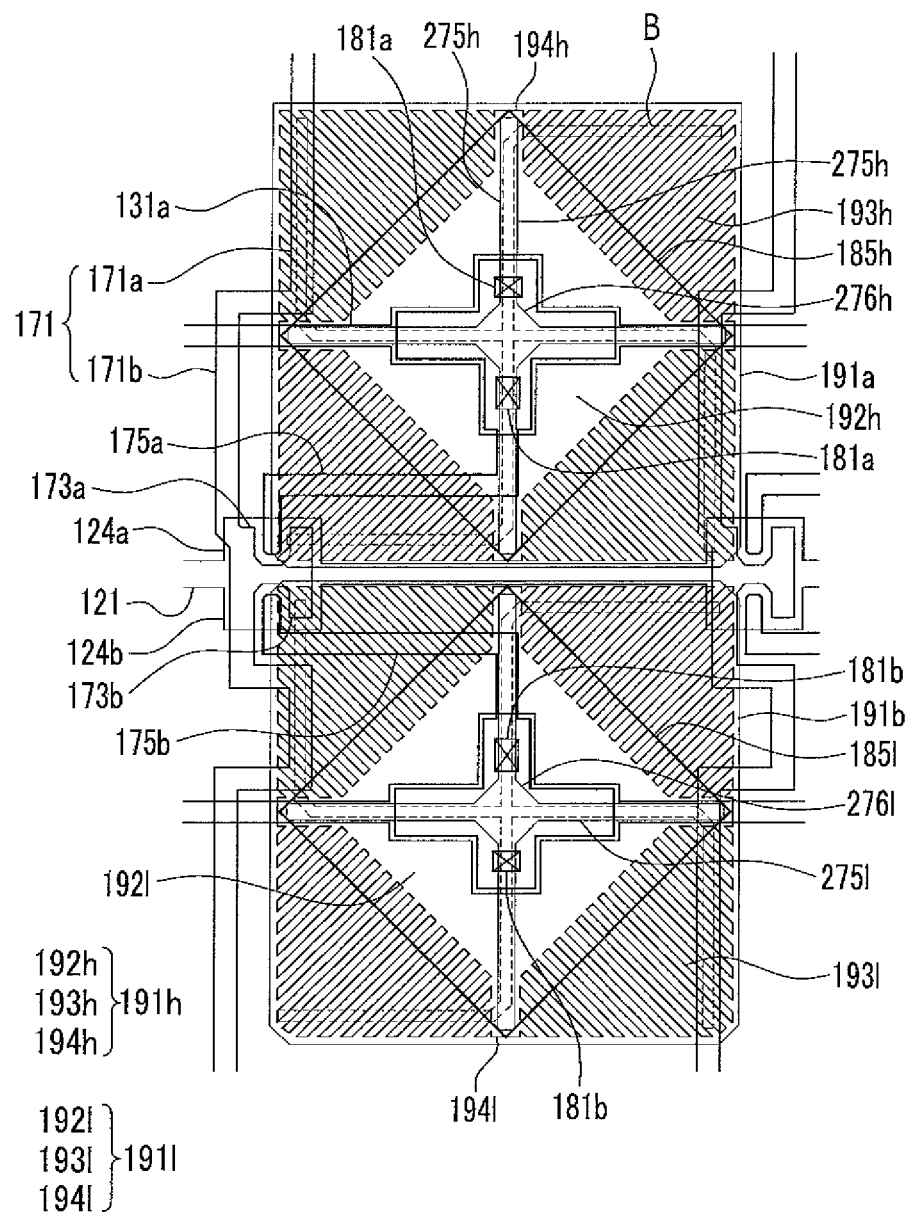

FIG. 31 is an equivalent circuit diagram of one pixel of a liquid crystal display device according to an exemplary embodiment of the present invention, and FIG. 32 is a layout view of a lower panel of the liquid crystal display device according to the exemplary embodiment of the present invention.

The liquid crystal display device according to an exemplary embodiment of the present invention includes a gate line GL, a data line DL, a first power supply line SL1, a second power supply line SL2, and a first switching element Qa and a second switching element Qb which are connected to the gate line GL and the data line DL, as illustrated in FIG. 31.

The liquid crystal display device according to an exemplary embodiment of the present invention further includes an auxiliary step-up capacitor Csa and a first liquid crystal capacitor Clca which are connected to the first switching element Qa, and an auxiliary step-down capacitor Csb and a second liquid crystal capacitor Clcb which are connected to the second switching element Qb.

The first switching element Qa and the second switching element Qb are constituted by three-terminal elements such as a thin film transistor. The first switching element Qa and the second switching element Qb are connected to the same gate line GL and the same data line DL and turned on at the same timing to output the same data signal.

Voltages, which swing at a regular period, are applied to the first power supply line SL1 and the second power supply line SL2. A first low voltage is applied to the first power supply line SL1 for a predetermined period (for example, 1H), and a first high voltage is applied to the first power supply line SL1 for the next predetermined period. A second high voltage is applied to the second power supply line SL2 for a predetermined period, and the second low voltage is applied to second power supply line SL2 for the next predetermined period. In this case, a first period and a second period are repeated many times for one frame and thus the swing voltages are applied to the first power supply line SL1 and the second power supply line SL2. In this case, the first low voltage and the second low voltage are the same as each other, and the first high voltage and the second high voltage may be the same as each other.

The auxiliary step-up capacitor Csa is connected to the first switching element Qa and the first power supply line SL1, and the auxiliary step-down capacitor Csb is connected to the second switching element Qb and the second power supply line SL2.

A voltage Va of a terminal (hereinafter, referred to as a 'first terminal') of a portion where the auxiliary step-up capacitor Csa is connected with the first switching element Qa is decreased when the first low voltage is applied to the first power supply line SL1 and increased when the first high voltage is applied to the first power supply line SL1. Thereafter, as the voltage of the first power supply line SL1 swings, the voltage Va of the first terminal swings.

A voltage Vb of a terminal (hereinafter, referred to as a 'second terminal') of a portion where the auxiliary step-down capacitor Csb is connected with the second switching element Qb is increased when the second high voltage is applied to the second power supply line SL2 and decreased when the second low voltage is applied to the second power supply line SL2. Thereafter, as the voltage of the second power supply line SL2 swings, the voltage Vb of a second terminal swings.

As such, even though the same data voltage is applied to the two subpixels, the voltages Va, Vb of the pixel electrode of the two subpixels are changed according to magnitudes of the swing voltages in the first and second power supply lines SL1, SL2, and as a result, transmittances of two subpixels may be different from each other and side visibility may be improved.

Hereinafter, a structure of a liquid crystal display device according to another exemplary embodiment of the present invention will be described with reference to FIG. 32.

A plurality of gate lines 121, a first power supply line 131a, and a second power supply line 131b are formed on a first substrate (not illustrated) made of transparent glass or plastic.

The gate lines 121 transfer gate signals and extend mainly in a horizontal direction. The gate line 121 includes a first gate electrode 124a protruding upward and a second gate electrode 124b protruding downward.

Voltages which swing at a regular period are applied to the first power supply line 131a and the second power supply line 131b.

A first low voltage is applied to the first power supply line 131a for a predetermined period (for example, 1H), and a first high voltage is applied to the first power supply line 131a for the next predetermined period. A second high voltage is applied to the second power supply line 131b for a predetermined period, and a second low voltage is applied to the second power supply line 131b for the next predetermined period. In this case, a first period and a second period are repeated many times for one frame and thus the swing voltages are applied to the first power supply line 131a and the second power supply line 131b. In this case, the first low voltage and the second low voltage are the same as each other, and the first high voltage and the second high voltage may be the same as each other.

The first power supply line 131a may be formed above the gate line 121, and the second power supply line 131b may be formed below the gate line 121.

A gate insulating layer (not illustrated) is formed on the gate line 121, the first power supply line 131a, and the second power supply line 131b. An island-shaped semiconductor (not illustrated) is formed on the gate insulating layer. The semiconductors are positioned on the first and second gate electrodes 124a, 124b, respectively.

A plurality of data lines 171, a first source electrode 173a, a second source electrode 173b, a first drain electrode 175a, and a second drain electrode 175b are formed on the semiconductor and the gate insulating layer.

The data lines 171 transfer data signals and mainly extend in a vertical direction to cross the gate lines 121 and the power supply lines 131a, 131b. The data line 171 illustrated in FIG. 32 is not formed in a straight line form. The data line 171 is constituted by a first sub data line 171a and a second sub data line 171b which are connected to each other, and the first sub data line 171a and the second sub data line 171b are placed on different lines. The first sub data line 171a is formed along an edge of the pixel electrode 191 adjacent to the right of the data line 171, and the second sub data line 171b is formed along an edge of the pixel electrode 191 adjacent to the left of the data line 171.

The first source electrode 173a and the second source electrode 173b are formed to protrude above the first gate electrode 124a and the second gate electrode 124b from the data line 171, respectively. The first source electrode 173a and the second source electrode 173b are formed to protrude from the same data line 171 to receive the same data voltage. The first source electrode 173a and the second source electrode 173b may be formed in a U-lettered form.

The first drain electrode 175a is spaced apart from the first source electrode 173a, and includes a rod-shaped end portion facing the first source electrode 173a based upon the first gate electrode 124a and an expansion expanded so as to be partially overlapped with the first power supply line 131a. The rod-shaped end portion of the first drain electrode 175a is partially surrounded by the U-shaped first source electrode 173a. Further, the expansion of the first drain electrode 175a has a cross shape.

The second drain electrode 175b is spaced apart from the second source electrode 173b, and includes a rod-shaped end portion facing the second source electrode 173b based upon the second gate electrode 124b and an expansion expanded so as to be partially overlapped with the second power supply line 131b. The rod-shaped end portion of the second drain electrode 175b is partially surrounded by the U-shaped second source electrode 173b. Further, the expansion of the second drain electrode 175b has a cross shape.

The first gate electrode 124a, the first source electrode 173a, and the first drain electrode 175a form the first switching element (Qa of FIG. 31), and the second gate electrode 124b, the second source electrode 173b, and the second drain electrode 175b form the second switching element (Qb of FIG. 31).

A passivation layer (not illustrated) is formed on the data line 171, the first and second source electrodes 173a, 173b, and the first and second drain electrodes 175a, 175b. The passivation layer is made of an organic insulator or the like and includes inclined portions 185h, 185l. The surface of the passivation layer except for the inclined portions 185h, 185l is flat. In the exemplary embodiment of FIG. 30, the inclined portions 185h, 185I are formed on the passivation layer, which is different from the exemplary embodiment in which the inclined portions are formed on the color filter 230 of FIG. 1.

The inclined portions 185h, 185I are positioned in a partial region of a portion overlapped with the first and second subpixel electrodes 191h, 191l and have a structure in which heights thereof are changed. The inclined portions 185h and 185l have rhombus structures as illustrated in FIG. 30. The rhombus structure of the first inclined portion 185h may be formed so that a vertex is in contact with a boundary of a quadrangular region occupied by the first partial plate electrode 192h, and according to an exemplary embodiment, the vertex may not be in contact with the boundary. Further, the rhombus structure of the second inclined portion 185I may be formed so that a vertex is in contact with a boundary of a quadrangular region occupied by the second partial plate electrode 192I, and according to an exemplary embodiment, the vertex may not be in contact with the boundary. Further, according to an exemplary embodiment, the region in which the rhombus structure is positioned may also have a square or rectangular region. The inclined portions 185h, 185l have structures in which heights are gradually decreased toward the center from a side of the rhombus structure. The inclined portions 185h, 185l have structures in which the heights are decreased at a predetermined slope from one side to the center, and as the heights are decreased, the widths are decreased. An organic insulator may not be formed at the centers of the inclined portions 185h, 185l having the rhombus structures, and according to an exemplary embodiment, an opening in which the organic insulator is not formed may be included in a predetermined region near the center.

A color filter may be formed below the passivation layer, and the color filter may be positioned on the upper panel. Further, unlike FIG. 30, the inclined portions as illustrated in FIG. 1 may be positioned at the color filter positioned below the passivation layer. In this case, the inclined portions may not be formed at the passivation layer.

A plurality of pixel electrodes 191 is formed on the passivation layer. Each pixel electrode 191 includes a first subpixel electrode 191*h* and a second subpixel electrode 191*l* which are formed at a predetermined distance.

The first subpixel electrode 191*h* and the second subpixel electrode 191*l* include partial plate electrodes 192*h*, 192*l* positioned at the centers thereof, extensions 194*h*, 194*l* extending from the partial plate electrodes 192*h*, 192*l* in a vertical or horizontal direction, and a plurality of minute branch electrodes 193*h*, 193*l* protruding from the partial plate electrodes 192*h*, 192*l* and the extensions 194*h*, 194*l* in an oblique direction, respectively.

The first subpixel electrode 191*h* includes the first partial plate electrode 192*h* and the plurality of first minute branch electrodes 193*h*, and is connected with a wide end portion of the drain electrode 175 by a connecting portion extended outside the quadrangular region.

The first partial plate electrode 192*h* has a rhombus shape, a center thereof is positioned at the center of the quadrangular region, and each vertex of the rhombus shape is formed at a predetermined distance from a boundary of the quadrangular region. Further, the first partial plate electrode 192*h* covers a part from the center of the first inclined portion 185*h* of the passivation layer. As a result, the first partial plate electrode 192*h* has an inclination provided by the first inclined portion 185*h* of the passivation layer as it is.

The first subpixel electrode 191*h* has a first extension 194*h* extending from each vertex of the rhombus shape of the first partial plate electrode 192*h* in a vertical or horizontal direction (in a parallel or vertical direction to the gate line 121 or the data line 171). The first extension 194*h* extends in the vertical or horizontal direction to meet a boundary of the quadrangular region occupied by the first subpixel electrode 191*h*. As a result, the first extension 194*h* meets the vertex of the rhombus structure of the first inclined portion 185*h* of the passivation layer on the plan view so as to be vertically overlapped with each other.

The plurality of first minute branch electrodes 193*h* extends from the oblique side of the first partial plate electrode 192*h* and the first extension 194*h*. The plurality of first minute branch electrodes 193*h* fills the rest of the quadrangular region, forms an angle of 45 degrees with the first extension 194*h* (or the gate line 121 or the data line 171), and forms an angle of 90 degrees with the oblique side of the first partial plate electrode 192*h*. Further, ends of the first minute branch electrodes 193*h* are not connected to each other to protrude outwards. However, if the ends of the first minute branch electrodes 193*h* are connected to each other to be closed, directions of liquid crystal molecules of the liquid crystal layer 3 to be aligned by an electric field are different from directions of the liquid crystal molecules to be aligned by the closed ends, and as a result, a response speed of the liquid crystal molecules may be delayed. Therefore, in the exemplary embodiment of the present invention, the ends of the first minute branch electrodes 193*h* are not connected to each other but protrude outwards to have a structure in which opening regions between the first minute branch electrodes 193*h* are opened. As a result, the liquid crystal molecules may be aligned in the directions to be aligned by the electric field without other resistance, thereby improving the response speed of the liquid crystal molecules and reducing textures.

Further, a connecting terminal connected with the oblique side of the first partial plate electrode 192*h* and the first extension 194*h* is positioned above the first inclined portion 185*h* of the passivation layer to be overlapped with each other in the plurality of first minute branch electrodes 193*h*. That is, the connecting terminal of the first minute branch electrode 193*h* is overlapped with the first inclined portion 185*h* of the passivation layer by a predetermined distance. Therefore, the vicinity of the connecting terminal of the first minute branch electrode 193*h* has the inclination provided by the first inclined portion 185*h* of the passivation layer as it is, and a flat structure is formed up to the end from the vicinity of the connecting terminal. The end portion of the first minute branch electrode 193*h* and the first inclined portion 185*h* of the passivation layer overlap each other and thus liquid crystal control force of the corresponding portion is further increased, and as a result, the liquid crystal molecules may rapidly operate by the electric field. As a result, the response speed of the liquid crystal molecules is improved. However, when a length of the first minute branch electrode 193*h* is overly increased and thus an overlapped distance is too large, a texture due to a slit structure may occur, and as a result, the overlapped distance needs to be set at a predetermined level or less. In the exemplary embodiment, the longest electrode of the first minute branch electrodes 193*h* may have a length of more than 50 µm and 68 µm or less, and a size of the pixel is determined according to a characteristic of the display device. When a size of the quadrangular region is determined according to the size of the pixel, the length of the longest electrode of the first minute branch electrodes 193*h* may be selected and used in the range of more than 50 µm and 68 µm or less. However, according to an exemplary embodiment, an exemplary embodiment beyond the above range may also exist. The length of the longest electrode of the first minute branch electrodes 193*h* may have a value of between 25% and 35% of an oblique length of the entire quadrangular region, and a length of the longest electrode of the first minute branch electrodes 193*h* that is overlapped with the first inclined portion 185*h* may have a value of between 0% and 10% of the oblique length of the entire quadrangular region.

The second partial plate electrode 192*l* of the second subpixel electrode 191l has a rhombus shape, a center thereof is positioned at the center of the quadrangular region, and each vertex of the rhombus shape is formed at a predetermined distance from a boundary of the quadrangular region. Further, the second partial plate electrode 192*l* covers a part from the center of the second inclined portion 185I of the passivation layer. As a result, the second partial plate electrode 192*l* has an inclination provided by the second inclined portion 185I of the passivation layer as it is.

The second subpixel electrode 191l has a second extension 194*l* extending from each vertex of the rhombus shape of the second partial plate electrode 192*l* in a vertical or horizontal direction (in a parallel or vertical direction to the gate line 121 or the data line 171). The second extension 194*l* extends in the vertical or horizontal direction to meet a boundary of the two-divided square regions. As a result, the second extension 194*l* meets the vertex of the rhombus structure of the second inclined portion 185I of the passivation layer on the plan view so as to be vertically overlapped with each other.

The plurality of second minute branch electrodes 193I extends from an oblique side of the second partial plate electrode 192*l* and the second extension 194*l*. The plurality of second minute branch electrodes 193I fills the rest of the quadrangular region, forms an angle of 45 degrees with the second extension 194*l* (or the gate line 121 or the data line 171), and forms an angle of 90 degrees with the oblique side of the second partial plate electrode 192*l*. Further, ends of the second minute branch electrodes 193I are not connected to each other to protrude outwards. However, if the ends of the second minute branch electrodes 193I are connected to each other to be closed, directions of liquid crystal molecules of the liquid crystal layer 3 to be aligned by an electric field are different from directions of the liquid crystal molecules to be aligned by the closed ends, and as a result, a response speed of the liquid crystal molecules may be delayed. Therefore, in the exemplary embodiment of the present invention, the ends of the second minute branch electrodes 193I are not connected to each other but protrude outwards to have a structure in which opening regions between the second minute branch electrodes 193I are opened. As a result, the liquid crystal molecules may be aligned in the directions to be aligned by the electric field without other resistance, thereby improving the response speed of the liquid crystal molecules and reducing textures.

Further, a connecting terminal connected with the oblique side of the second partial plate electrode 192I and the second extension 194I is positioned above the second inclined portion 185I of the passivation layer to be overlapped with the second inclined portion 185I of the passivation layer in the plurality of second minute branch electrodes 193I. That is, the connecting terminal of the second minute branch electrode 193I is overlapped with the second inclined portion 185I of the passivation layer by a predetermined distance. Therefore, the vicinity of the connecting terminal of the second minute branch electrode 193I has the inclination provided by the second inclined portion 185I of the passivation layer as it is, and a flat structure is formed up to the end from the vicinity of the connecting terminal. The end portion of the second minute branch electrode 193I and the second inclined portion 185I of the passivation layer overlap each other and thus liquid crystal control force of the corresponding portion is further increased, and as a result, the liquid crystal molecules may rapidly operate by the electric field. As a result, the response speed of the liquid crystal molecules is improved. However, when a length of the second minute branch electrode 193I is overly increased and thus an overlapped distance is too large, a texture due to a slit structure may occur, and as a result, the overlapped distance needs to be set at a predetermined level or less. In the exemplary embodiment, the longest electrode of the second minute branch electrodes 193I may have a length of more than 50 μm and 68 μm or less, and a size of the pixel is determined according to a characteristic of the display device. When a size of the square region is determined according to the size of the pixel, the length of the longest electrode of the second minute branch electrodes 193I may be selected and used in the range of more than 50 μm and 68 μm or less. However, according to an exemplary embodiment, an exemplary embodiment beyond the above range may also exist. The length of the longest electrode of the second minute branch electrodes 193I may have a value of between 25% and 35% of an oblique length of the entire square region, and a length of the longest electrode of the second minute branch electrodes 193I that is overlapped with the second inclined portion 185I may have a value of between 0% and 10% of the oblique length of the entire square region.

A light blocking member and a common electrode may be formed on the upper panel 200. A color filter may be formed on the upper panel 200.

The common electrode formed on the upper panel 200 is made of a transparent conductive material and may include a liquid crystal control means and an additional liquid crystal control means.

Cutouts 275h, 275l as the liquid crystal control means are formed in a cross shape at the common electrode 270. A cross point in the cross structure of the first cutout 275h is overlapped with the center of the rhombus shape of the first partial plate electrode 192h of the lower panel 100 or the center of the rhombus shape of the first inclined portion 185h of the passivation layer. Further, the cross structure of the second cutout 275l is overlapped with the center of the rhombus shape of the second partial plate electrode 192I of the lower panel 100 or the center of the rhombus shape of the second inclined portion 185I of the passivation layer, respectively. Further, the cutouts 275h, 275l positioned at the adjacent pixels may be extended to be connected with each other. The cutouts 275h, 275l serve to improve the control force of the liquid crystal molecules.

Further, the additional liquid crystal control means is positioned near the cross point of the cross structure of the cutouts 275h, 275l in the common electrode 270. In the exemplary embodiment of FIG. 32, rhombus cutout patterns 276h, 276l are formed as the additional liquid crystal control means. The rhombus cutout patterns 276h, 276l have sides which are parallel to the rhombus shapes of the partial plate electrodes 192h, 192I of the lower panel 100 or the rhombus shapes of the second inclined portions 185h, 185I of the passivation layer on the plan view. The sizes of the rhombus cutout patterns 276h, 276l may be various according to an exemplary embodiment. If the sizes are too small, a role as the liquid crystal control means is slight, and if the sizes are too large, transmittance deteriorates, and as a result, the rhombus cutout patterns 276h, 276l may be formed with appropriate sizes according to an exemplary embodiment. According to the rhombus cutout patterns 276h, 276l which are the additional liquid crystal control means, the cutouts 275h, 275l positioned at the common electrode 270 extend only in the vertical or horizontal direction, and as a result, the liquid crystal control force of a direction of 45 degrees with the direction may deteriorate. Accordingly, the liquid crystal control force of the direction of 45 degrees is improved by forming an additional rhombus-shaped liquid crystal control means (the rhombus cutout patterns 276h, 276l), and as a result, the liquid crystal molecules are rapidly aligned by the electric field and thus the response speed is improved.

An alignment layer (not illustrated) is formed at inner sides of the lower panel 100 and the upper panel 200. The alignment layer may be a vertical alignment layer and may be an alignment layer photo-aligned by using a photopolymerization material.

Polarizers (not illustrated) are provided on outer sides of the two panels 100, 200, and transmissive axes of the two polarizers are perpendicular to each other and one transmissive axis thereof may be parallel to the gate line 121.

The liquid crystal layer 3 has negative dielectric anisotropy between the lower panel 100 and the upper panel 200, and the liquid crystal molecules of the liquid crystal layer 3 are aligned so that long axes are vertical to the surfaces of the two panels 100, 200 while an electric field is not applied.

The first subpixel electrode 191a and the second subpixel electrode 191b form first and second liquid crystal capacitors (Clca, Clcb of FIG. 31) together with the common electrode formed on a second substrate and the liquid crystal layer therebetween to maintain the applied voltage even after the first and second switching elements Qa, Qb are turned off.

Further, the first subpixel electrode 191a forms an auxiliary step-up capacitor (Csa of FIG. 31) together with the first power supply line 131a and the passivation layer therebetween to step-up a voltage of the first liquid crystal capacitor (Clca of FIG. 31). The second subpixel electrode 191b forms an auxiliary step-down capacitor (Csb of FIG. 31) together with the second power supply line 131b and the passivation layer therebetween to step-down a voltage of the second liquid crystal capacitor (Clcb of FIG. 31). According to the voltages applied to the power supply lines 131a, 131b, the auxiliary step-up capacitor (Csa of FIG. 31) steps-down the voltage of the voltage of the first liquid crystal capacitor (Clca of FIG. 31), and the auxiliary step-down capacitor (Csb of FIG. 31) steps-up the voltage of the second liquid crystal capacitor (Clcb of FIG. 31).

Hereinafter, another exemplary embodiment of the present invention will be described with reference to FIG. 33.

Figure 33:
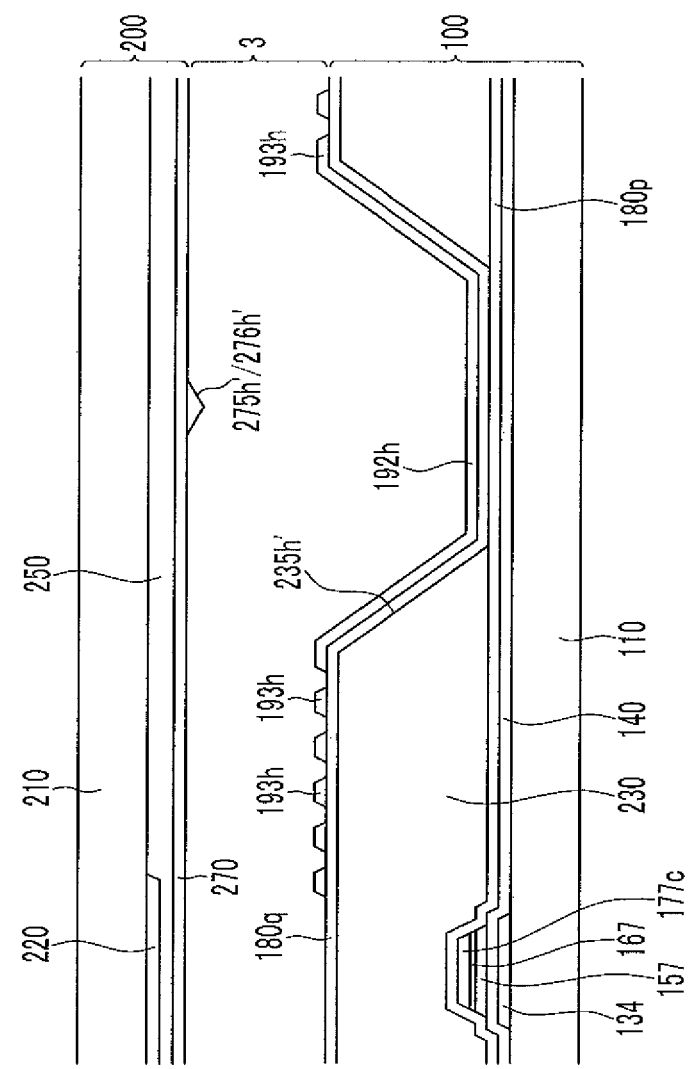
FIG. 33 is a cross-sectional view of the liquid crystal display device according to another exemplary embodiment of the present invention.

FIG. 33 is a cross-sectional view of a liquid crystal display device according to another exemplary embodiment of the present invention.

FIG. 33 corresponds to FIG. 2, and unlike FIG. 2, a liquid crystal control means and an additional liquid crystal control means which are formed in the common electrode 270 are formed by protrusions, not the cutouts.

Further, the inclined portions of the color filter 230 are not entirely formed like the inclined portions of FIG. 2, and the inclined portions are included only in a partial region and a flat structure is formed in the rest portion.

As such, portions different from FIG. 2 will be described below in detail.

The color filter 230 is elongated in a vertical direction along a space between the adjacent data lines 171 and has a partially inclined portion 235h' of which a height is changed in a partial region of a portion of the color filter 230 overlapped with the first and second subpixel electrodes 191h, 191l. The partially inclined portion 235h' has a rhombus structure, and the partially inclined portion 235h' has a portion of which a height is gradually decreased from a side of the rhombus structure and a portion of which a height is flat. Here, the portion of which the height is decreased has a height decreased at a predetermined slope, and as the height is decreased, the width thereof is decreased. Further, the portion of which the height is flat may have a uniform height while the color filter 230 is formed, and the color filter 230 is removed as illustrated in FIG. 33 and the height may be uniform.

The rhombus structure of the first inclined portion 235h is formed so that a vertex is in contact with a boundary of a square region occupied by the first partial plate electrode 192h. However, according to an exemplary embodiment, the boundary of the corresponding region and the vertex may be spaced apart from each other at a predetermined distance. Further, according to an exemplary embodiment, the region in which the rhombus structure is positioned may also have a rectangular region.

The inclined portion of the partially inclined portion 235h' is overlapped with the first minute branch electrode 193h, and the first minute branch electrode 193h may be formed only at the partially inclined portion 235W. According to an exemplary embodiment, the first minute branch electrode 193h may be formed at the portion of the partially inclined portion 235h' where the height is flat.

A protrusion 275h' as the liquid crystal control means is formed in a cross shape at the common electrode 270. A cross point in the cross structure of the protrusion 275h' is overlapped with the center of the rhombus shape of the first partial plate electrode 192h of the lower panel 100 or the center of the rhombus shape of the first inclined portion 235h of the color filter 230. Further, the cutouts 275h, 275l positioned at the adjacent pixels may be extended to be connected with each other. The cutouts 275h, 275l serve to improve the control force of the liquid crystal molecules.

Further, the additional liquid crystal control means is positioned near the cross point of the cross structure of the protrusion 275h' in the common electrode 270. In the exemplary embodiment of FIG. 33, a rhombus protrusion pattern 276h' is formed as the additional liquid crystal control means. The rhombus protrusion pattern 276h' has a side that is parallel to the rhombus shapes of the partial plate electrodes 192h, 192I of the lower panel 100 or the rhombus shapes of the inclined portions 235h, 235I of the color filter 230 on the plan view. The size of the rhombus protrusion pattern 276h' may be various according to an exemplary embodiment. If the size is too small, a role as the liquid crystal control means is slight, and if the size is too large, transmittance deteriorates, and as a result, the rhombus protrusion pattern 276h' may be formed with an appropriate size according to an exemplary embodiment. According to the rhombus protrusion pattern 276h' which is the additional liquid crystal control means, the protrusion 275h' positioned at the common electrode 270 extends only in the vertical or horizontal direction, and as a result, the liquid crystal control force of a direction of 45 degrees with the direction may deteriorate. Accordingly, the liquid crystal control force of the direction of 45 degrees is improved by forming the additional rhombus-shaped liquid crystal control means (rhombus protrusion pattern 276h'), and as a result, the liquid crystal molecules are rapidly aligned by the electric field and thus the response speed is improved.

According to an exemplary embodiment, one of the liquid crystal control means and the additional liquid crystal control means may be formed by the cutout and the other one may be formed by the protrusion.

As illustrated in FIG. 33, in the case where the inclined portion formed at the color filter 230 is the partially inclined portion 235h' in which the inclination is formed only at the partial portion, the liquid crystal control force may be decreased as compared with an exemplary embodiment in which the inclination is entirely formed. In this case, according to an exemplary embodiment, in order to improve the control force of the liquid crystal molecules, a photoreactive material is included in the liquid crystal layer or the alignment layer and a pretilt angle may be provided to the liquid crystal layer or the alignment layer.

Hereinafter, photoalignment will be described with reference to FIG. 34.

FIG. 34 is a diagram illustrating a process through which liquid crystal molecules have pretilts by using prepolymers polymerized by light such as ultraviolet light.

Referring to FIG. 34, first, a prepolymer 330 such as monomers cured by polymerization due to light such as ultraviolet light is injected between two panels 100, 200 together with a liquid crystal material. The prepolymer 330 may be reactive mesogen polymerized by the light such as ultraviolet light.

Next, a data voltage is applied to the first and second subpixel electrodes 191h, 191I and a common voltage is applied to the common electrode 270 of the upper panel 200 to generate an electric field in the liquid crystal layer 3 between two panels 100, 200. Then, liquid crystal molecules 31 of the liquid crystal layer 3 are inclined in a predetermined direction in response to the electric field.

In a state where the liquid crystal molecules 31 of the liquid crystal layer 3 are inclined in the predetermined direction, when the light such as ultraviolet light is irradiated, the prepolymer 330 is polymerized to form a pretilt providing polymer 350 as illustrated in FIG. 34. The pretilt providing polymer 350 is formed by contacting the panels 100, 200. An alignment direction of the liquid crystal molecules 31 is determined by the pretilt providing polymer 350 so that the liquid crystal molecules 31 have pretilts in the direction described above. Accordingly, even in a state where the voltages are not applied to the field generating electrodes 191, 270, the liquid crystal molecules 31 are aligned so as to have pretilts in four different directions.

As a result, the liquid crystal molecules 31 have pretilts in a total of four directions in each region of an upper subpixel or a lower subpixel of one pixel.

The pretilt using the polymer illustrated in FIG. 34 may be subordinately used in the case where the texture is not reduced by controlling the liquid crystal molecules by only a step provided by the inclined portion of the color filter 230.

In FIG. 34, the exemplary embodiment in which a photoreactive material is included in the liquid crystal layer is described, but even in the case where the photoreactive material is included in the alignment layer, the liquid crystal display device is formed based upon the exemplary embodiment.

As described above, the control force of the liquid crystal molecules is improved by various methods such as the protruding structure of the ends of the minute branch electrodes, the overlapped structure of the inclined portion and the minute branch electrode, the formation of the liquid crystal control means of the common electrode, the formation of the additional liquid crystal control means in the common electrode, and the providing of the pretilt due to the photoalignment. However, even though only at least one of the structures is formed, the liquid crystal control force is improved, and as a result, an exemplary embodiment having only at least one thereof belongs to the present invention. The liquid crystal alignment force may be improved by combining and using one or more of the structures according to a liquid crystal alignment characteristic of the exemplary embodiment.

While exemplary embodiments of the present disclosure have been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A liquid crystal display device, comprising:
    a lower panel comprising:
        a lower substrate,
        a pixel electrode disposed on the lower substrate and comprising a partial plate electrode and a plurality of minute branch electrodes extending from the partial plate electrode, and
        a lower layer disposed on the lower substrate and below the pixel electrode and comprising an inclined;
    an upper panel comprising an upper substrate facing the lower substrate and a common electrode formed on the upper substrate; and
    a liquid crystal layer positioned between the lower panel and the upper panel,
    wherein at least two minute branch electrodes of the plurality of minute branch electrodes extend from a same edge of the partial plate electrode,
    wherein a part of the inclined portion overlaps with the at least two minute branch electrodes.

2. The liquid crystal display device of claim 1, wherein the lower layer comprising the inclined portion is a color filter or a passivation layer comprising an organic insulator.

3. The liquid crystal display device of claim 2, wherein:
    the partial plate electrode has a rhombus shape,
    the inclined portion has a rhombus shape, and
    the rhombus shape of the inclined portion is larger than the rhombus shape of the partial plate electrode.

4. The liquid crystal display device of claim 3, further comprising: an extension extending from the partial plate electrode in a vertical or horizontal direction, wherein the plurality of minute branch electrodes protrudes in the extension.

5. The liquid crystal display device of claim 3, wherein the longest electrode of the minute branch electrodes has a length of between 50 μm and 68 μm.

6. The liquid crystal display device of claim 3, wherein the length of the longest electrode of the minute branch electrodes has a value of between 25% and 35% of an oblique length of a region occupied by the pixel electrode.

7. The liquid crystal display device of claim 6, wherein an overlapped length of the inclined portion and the minute branch electrode has a value of between 0% and 10% of the oblique length.

8. The liquid crystal display device of claim 3, wherein the common electrode comprises a cutout or a protrusion and has a liquid crystal control means having a cross structure.

9. The liquid crystal display device of claim 8, wherein a cross point of the cross structure of the liquid crystal control means coincides with the center of the partial plate electrode or the inclined portion.

10. The liquid crystal display device of claim 9, wherein the common electrode further comprises an additional liquid crystal control means comprising a cutout or a protrusion.

11. The liquid crystal display device of claim 10, wherein the additional liquid crystal control means is a rhombus cutout pattern or a rhombus protrusion pattern that is positioned at the cross point portion of the cross structure.

12. The liquid crystal display device of claim 11, wherein the liquid crystal control means comprises a disconnected portion in the middle of the cross structure.

13. The liquid crystal display device of claim 10, wherein the additional liquid crystal control means is an X-shaped pattern that is positioned at the cross point portion of the cross structure.

14. The liquid crystal display device of claim 9, wherein the liquid crystal control means comprises a disconnected portion in the middle of the cross structure.

15. The liquid crystal display device of claim 10, wherein ends of the plurality of minute branch electrodes are not connected to each other to protrude outwards.

16. The liquid crystal display device of claim 15, wherein the inclined portion has an inclination throughout the entire region.

17. The liquid crystal display device of claim 15, wherein the inclined portion has an inclination only in a partial region.

18. The liquid crystal display device of claim 15, wherein:
    the pixel electrode comprises a first subpixel electrode and a second subpixel electrode, and
    the first subpixel electrode and the second subpixel electrode comprise the partial plate electrode and the plurality of minute branch electrodes, respectively.

19. The liquid crystal display device of claim 18, wherein:
    the first subpixel electrode is formed in a square region, and
    the second subpixel electrode is formed in a rectangular region.

20. The liquid crystal display device of claim 19, wherein the second subpixel electrode comprises two partial plate electrodes.

21. The liquid crystal display device of claim 20, wherein:
    the rectangular region is divided into two square regions, and
    the two partial plate electrodes are formed in the two square regions, respectively.

22. The liquid crystal display device of claim 19, wherein the second subpixel electrode comprises one partial plate electrode.

23. The liquid crystal display device of claim 15, further comprising:
    an alignment layer aligning liquid crystal molecules of the liquid crystal layer, wherein the liquid crystal layer or the alignment layer comprises a pretilt providing polymer polymerized by light.

24. A liquid crystal display device, comprising:
a lower panel comprising:
   a lower substrate,
   a pixel electrode formed on the lower substrate and comprising a partial plate electrode and a plurality of minute branch electrodes extending from the partial plate electrode, and
   a lower layer formed on the lower substrate and below the pixel electrode and comprising an inclined portion;
an upper panel comprising:
   an upper substrate facing the lower substrate, and
   a common electrode formed on the upper substrate, wherein the common electrode has a liquid crystal control means comprising a cutout or a protrusion and has a cross structure; and
a liquid crystal layer positioned between the lower panel and the upper panel,
wherein ends of the plurality of minute branch electrodes protrude outwards from the partial plate electrode and are not connected to each other.

25. The liquid crystal display device of claim 24, wherein a part of the inclined portion is overlapped with a part of the minute branch electrode.

26. The liquid crystal display device of claim 25, wherein a cross point of the cross structure of the liquid crystal control means coincides with the center of the partial plate electrode or the inclined portion.

27. The liquid crystal display device of claim 26, wherein the common electrode further comprises an additional liquid crystal control means constituted by a cutout or a protrusion.

28. The liquid crystal display device of claim 27, wherein the additional liquid crystal control means is a rhombus cutout pattern or a rhombus protrusion pattern that is positioned at the cross point portion of the cross structure.

29. The liquid crystal display device of claim 28, wherein the liquid crystal control means comprises a disconnected portion in the middle of the cross structure.

30. The liquid crystal display device of claim 27, wherein the additional liquid crystal control means is an X-shaped pattern that is positioned at the cross point portion of the cross structure.

31. The liquid crystal display device of claim 26, wherein the liquid crystal control means comprises a disconnected portion in the middle of the cross structure.

32. The liquid crystal display device of claim 25, wherein the inclined portion has an inclination throughout the entire region.

33. The liquid crystal display device of claim 25, wherein the inclined portion has an inclination only in a partial region.

34. The liquid crystal display device of claim 25, wherein the lower layer comprising the inclined portion is a color filter or a passivation layer comprising an organic insulator.

35. The liquid crystal display device of claim 34, wherein: the partial plate electrode has a rhombus shape, the inclined portion has a rhombus shape, and the rhombus shape of the inclined portion is larger than the rhombus shape of the partial plate electrode.

36. The liquid crystal display device of claim 35, further comprising: an extension extending from the partial plate electrode in a vertical or horizontal direction, wherein the plurality of minute branch electrodes protrudes in the extension.

37. The liquid crystal display device of claim 25, wherein: the pixel electrode comprises a first subpixel electrode and a second subpixel electrode, and the first subpixel electrode and the second subpixel electrode comprise the partial plate electrode and the plurality of minute branch electrodes, respectively.

38. The liquid crystal display device of claim 37, wherein: the first subpixel electrode is formed in a square region, and the second subpixel electrode is formed in a rectangular region.

39. The liquid crystal display device of claim 38, wherein the second subpixel electrode comprises two partial plate electrodes.

40. The liquid crystal display device of claim 39, wherein: the rectangular region is divided into two square regions, and the two partial plate electrodes are formed in the two square regions, respectively.

41. The liquid crystal display device of claim 38, wherein the second subpixel electrode comprises one partial plate electrode.

42. The liquid crystal display device of claim 25, further comprising: an alignment layer aligning liquid crystal molecules of the liquid crystal layer, wherein the liquid crystal layer or the alignment layer comprises a pretilt providing polymer polymerized by light such as ultraviolet light.

* * * * *